(12) United States Patent
Williams et al.

(10) Patent No.: US 12,453,452 B2
(45) Date of Patent: Oct. 28, 2025

(54) VACUUM CONDUIT ATTACHMENT TOOLS

(71) Applicant: Emerson Electric Co., St. Louis, MO (US)

(72) Inventors: Matthew A. Williams, Bridgeton, MO (US); Jason E. Hill, St. Louis, MO (US); Christopher Burch, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 111 days.

(21) Appl. No.: 18/412,095

(22) Filed: Jan. 12, 2024

(65) Prior Publication Data

US 2024/0324835 A1    Oct. 3, 2024

Related U.S. Application Data

(63) Continuation of application No. 18/193,983, filed on Mar. 31, 2023, now Pat. No. 11,882,984.

(51) Int. Cl.
*A47L 9/24* (2006.01)
*A47L 9/02* (2006.01)
*A47L 5/36* (2006.01)

(52) U.S. Cl.
CPC .............. *A47L 9/242* (2013.01); *A47L 9/02* (2013.01); *A47L 5/36* (2013.01)

(58) Field of Classification Search
CPC ....... F16L 25/00; F16L 25/0036; F16L 25/14; F16L 47/06; F16L 21/00; A47L 9/242
(Continued)

(56) References Cited

U.S. PATENT DOCUMENTS 3,127,227 A    3/1964  Edwards
3,680,896 A *  8/1972  Cupit .................... F16L 21/005
                                                    285/224
(Continued)

FOREIGN PATENT DOCUMENTS

CN    101427895 A    5/2009
CN    106805842 A    6/2017
(Continued)

OTHER PUBLICATIONS

"1-⅞ in. Dust Extraction Adapter for Wet/Dry Shop Vacuums (3-Piece)", Home Depot product webpage, 5 pages, retrieved online on Mar. 30, 2023 at URL: https://www.homedepot.com/p/Milwaukee-1-7-8-in-Dust-Extraction-Adapter-for-Wet-Dry-Shop-Vacuums-3-Piece-49-90-1980/319226245.
(Continued)

*Primary Examiner* — Aaron M Dunwoody
(74) *Attorney, Agent, or Firm* — Armstrong Teasdale LLP

(57) ABSTRACT

A vacuum conduit pipe adapter includes a hollow body extending from a first end to a second end, a vacuum conduit connector positioned at the second end of the hollow body and operable to connect the vacuum conduit pipe adapter to a vacuum system, and a pipe connector positioned at the first end of the hollow body. The pipe connector includes a plurality of cylindrical fitments, where each fitment is formed circumferentially about a respective central axis and includes an inner surface having an inner diameter sized to receive a pipe having a different diameter than the other fitments. The central axis of each fitment is radially offset from the central axis of each other fitment.

20 Claims, 31 Drawing Sheets

(58) Field of Classification Search
USPC .............................. 285/7, 148.27; 15/246.2
See application file for complete search history.

(56) References Cited

U.S. PATENT DOCUMENTS

| | | | |
|---|---|---|---|
| 3,727,953 A * | 4/1973 | Martin | F16L 21/005 285/305 |
| 3,955,237 A | 5/1976 | Chateauneuf | |
| 4,053,962 A | 10/1977 | McDowell | |
| 4,131,441 A | 12/1978 | Randall | |
| 4,266,813 A * | 5/1981 | Oliver | F16L 25/14 285/423 |
| 4,698,861 A * | 10/1987 | Bogusz | A47L 17/02 4/654 |
| D297,043 S * | 8/1988 | Vander Wilt | D23/263 |
| 4,997,209 A | 3/1991 | McGrath et al. | |
| 5,370,425 A | 12/1994 | Dougherty et al. | |
| 5,389,004 A | 2/1995 | Gray et al. | |
| 5,462,311 A | 10/1995 | Cipolla | |
| 5,685,044 A | 11/1997 | Lavis et al. | |
| 5,685,351 A * | 11/1997 | Kazarian | B65D 47/00 220/253 |
| 6,264,248 B1 | 7/2001 | Marbach | |
| 6,279,198 B1 | 8/2001 | Martin et al. | |
| 6,478,342 B1 | 11/2002 | Berfield | |
| 6,581,974 B1 | 6/2003 | Ragner et al. | |
| 6,785,934 B2 | 9/2004 | Bruno et al. | |
| 6,820,305 B2 | 11/2004 | Albert et al. | |
| 6,836,929 B2 | 1/2005 | Kim | |
| 7,159,270 B2 | 1/2007 | Genoa et al. | |
| 7,231,686 B1 | 6/2007 | Matheney | |
| 7,334,503 B1 * | 2/2008 | Newman | A47L 9/244 81/53.11 |
| 7,617,566 B2 * | 11/2009 | Chapman | A47L 9/104 15/397 |
| 7,934,286 B2 | 5/2011 | Yoo et al. | |
| 8,167,337 B2 | 5/2012 | Bruno et al. | |
| 8,555,461 B2 | 10/2013 | Hachtmann | |
| 8,789,854 B2 | 7/2014 | Christian, Jr. et al. | |
| 9,731,053 B2 | 8/2017 | Alai | |
| 10,080,471 B2 | 9/2018 | Reimer et al. | |
| 10,238,256 B2 | 3/2019 | Cole et al. | |
| 10,278,555 B2 | 5/2019 | Rupp et al. | |
| 10,443,768 B1 * | 10/2019 | McConnell | F24F 13/02 |
| 10,702,111 B2 | 7/2020 | Tomasiak et al. | |
| 10,743,734 B2 | 8/2020 | Chavana, Jr. et al. | |
| 10,869,586 B2 | 12/2020 | Bearup et al. | |
| 11,160,426 B1 | 11/2021 | Williamson | |
| 11,214,974 B2 | 1/2022 | Smith | |
| 11,253,125 B1 | 2/2022 | Hoyt | |
| 11,399,683 B2 | 8/2022 | Cleff | |
| 11,585,580 B2 * | 2/2023 | Irons | F25B 49/02 |
| 2004/0025286 A1 | 2/2004 | Boys | |
| 2004/0245771 A1 * | 12/2004 | Tempas | F16L 19/0237 285/354 |
| 2005/0005389 A1 | 1/2005 | Rau et al. | |
| 2008/0216280 A1 | 9/2008 | Marshall et al. | |
| 2012/0104744 A1 | 5/2012 | Petty | |
| 2014/0062077 A1 * | 3/2014 | Hurley | F24F 13/222 285/7 |
| 2014/0070531 A1 | 3/2014 | Inoue et al. | |
| 2015/0198274 A1 * | 7/2015 | Farland | F16L 47/265 285/7 |
| 2016/0319521 A1 * | 11/2016 | Mitchell | F16L 25/14 |
| 2018/0000299 A1 * | 1/2018 | Caldwell | A47L 9/242 |
| 2019/0387936 A1 | 12/2019 | Richey et al. | |
| 2021/0235952 A1 | 8/2021 | Nieschwitz et al. | |
| 2022/0071462 A1 | 3/2022 | Hillard | |
| 2022/0167812 A1 | 6/2022 | Larrain | |
| 2022/0183520 A1 * | 6/2022 | Reeder | A47L 7/0014 |
| 2022/0322899 A1 | 10/2022 | Reeder et al. | |

FOREIGN PATENT DOCUMENTS

| | | |
|---|---|---|
| EP | 0181694 A1 | 5/1986 |
| EP | 1062902 A2 | 12/2000 |
| WO | 2020264183 A1 | 12/2020 |
| WO | 2020264205 A1 | 12/2020 |

OTHER PUBLICATIONS

"3 Pieces Vacuum Hose Adapter, 2-½ Inch to 1-¼ Inch, 1-¼ Inch to 1-⅜ Inch to 1-½ Inch, 1-⅜ Inch to 1-¼ Inch Wet Dry Vacuum Converter Reducer Attachments for Vacuum Cleaner", Amazon product webpage, 10 pages, retrieved online on Mar. 30, 2023 at URL: https://www.amazon.com/Universal-Adapter-Converter-Reducer-Attachments/dp/B08Y8PBKHW/ref=sr_1_8keywords=2+1%2F2+inch+to+1+7%2F8+inch+vacuum+hose+adapter qid=1665389458sprefix=1-7%2F8+2-1%2F2+inch+vacuum+%2Caps%2C346 sr=8-8.

"AIR-TIP 1-¼ in.—2-½ in. Conduit Line Puller Attachment for Wet/Dry Shop Vacuums (3-Piece)", Home Depot product webpage, 6 pages, retrieved online on Mar. 30, 2023 at URL: https://www.homedepot.com/p/Milwaukee-AIR-TIP-1-1-4-in-2-1-2-in-Conduit-Line-Puller-Attachment-For-Wet-Dry-Shop-Vacuums-3-Piece-49-90-2024/319238054.

"Hose and Accessory Adapter Kit for RIDGID Wet/Dry Shop", Home Depot product webpage, 9 pages, retrieved online on Mar. 30, 2023 at URL: https://www.homedepot.com/p/RIDGID-Hose-and-Accessory-Adapter-Kit-for-RIDGID-Wet-Dry-Shop-Vacuums-VT1755/202077239.

"Hose and Accessory Adapter Kit for Wet/Dry Shop Vacuums (3-Piece)", Home Depot product webpage, 5 pages, retrieved online on Mar. 30, 2023 at https://www.homedepot.com/p/Milwaukee-Hose-and-Accessory-Adapter-Kit-for-Wet-Dry-Shop-Vacuums-3-Piece-49-90-1991/319229172#overlay.

* cited by examiner

VACUUM CONDUIT ATTACHMENT TOOLS

CROSS-REFERENCE TO RELATED APPLICATIONS

This application is a continuation of and claims priority to U.S. patent application Ser. No. 18/193,983, filed Mar. 31, 2023, entitled "VACUUM CONDUIT ATTACHMENT TOOLS," the disclosure of which is hereby incorporated by reference in its entirety.

FIELD

The field of the disclosure relates generally to vacuum cleaning systems and, more particularly, to vacuum conduit attachment tools that facilitate connection to vacuum hoses or conduits of different sizes.

BACKGROUND

Vacuum cleaners typically include a suction unit, a conduit (e.g., a flexible hose or tube) connected to the suction unit, and an attachment tool connected to the tube for engaging a surface to be cleaned. Some prior vacuum cleaner attachment tools are generally designed for use with only one size of vacuum hoses or conduits. Thus, prior attachment tools are not readily adaptable for use with vacuum hoses or conduits of varying sizes. Consequently, use of such prior attachment tools with vacuum hoses or conduits of different sizes requires a separate adapter or a separate attachment tool altogether. This, in turn, requires that numerous different vacuum accessories (e.g., attachment tools and adapters) be kept on hand to ensure compatibility across different sizes of vacuum conduits and hoses.

Further, many prior vacuum cleaner attachment tools are generally coupled to a vacuum hose or conduit via a press-fit connection, and do not include locking mechanisms to help retain the attachment tool to the vacuum tube or hose. Consequently, use of such prior attachment tools with vacuum tubes or hoses requires additional attention to ensure that the attachment tool does not decouple from the vacuum tube or hose during use.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum attachment tool includes a hollow body extending from a first end to a second end and defining a flow path, and a conduit connector disposed at the second end of the hollow body. The conduit connector includes an inner collar having an inner diameter sized to receive a first vacuum conduit having a first diameter, and an outer collar having an inner diameter sized to receive a second vacuum conduit having a second diameter greater than the first diameter. The outer collar is formed separately from the inner collar and is coupled to the inner collar.

In some aspects, at least one of the inner collar and the outer collar includes a plurality of teeth operable to engage a locking mechanism of the first or second vacuum conduit.

In some further aspects, the inner collar includes a plurality of teeth operable to engage a locking mechanism of the first vacuum conduit, and the outer collar includes a plurality of teeth operable to engage a locking mechanism of the second vacuum conduit.

In further aspects, the inner collar includes a deflectable tab, and the deflectable tab includes the plurality of teeth.

In some aspects, the outer collar is coupled to the inner collar by a press-fit connection that hermetically seals the flow path.

In other aspects, the inner collar includes an inner surface, the outer collar includes an inner surface, and at least one of the inner surface of the inner collar and the inner surface of the outer collar is radially tapered.

In some further aspects, the outer collar includes an inner surface and at least one rib positioned on the inner surface of the outer collar, and the at least one rib of the outer collar is operable to engage the at least one rib of the inner collar when the outer collar is coupled to the inner collar.

In yet further aspects, at least one rib of the outer collar includes at least one crushing rib that includes a crushing portion operable to engage the at least one rib of the inner collar and deform when the outer collar is coupled to the inner collar.

In yet further aspects, engagement of the crushing portion of the at least one crushing rib of the outer collar with the at least one rib of the inner collar when the outer collar is coupled to the inner collar inhibits movement of the outer collar relative to the inner collar.

In some aspects, the inner collar includes an outer cuff and an inner cuff. The outer cuff has an inner diameter sized to receive the first vacuum conduit having the first diameter, and the inner cuff has an inner diameter sized to receive a third vacuum conduit having a third diameter smaller than the first diameter.

In some aspects, the inner collar includes an outer surface and at least one alignment rib positioned on the outer surface, and the outer collar includes an inner surface and at least one alignment rib positioned on the inner surface.

In some further aspects, the at least one alignment rib of the inner collar and the at least one alignment rib of the outer collar engage one another when the outer collar is coupled to the inner collar to align the outer collar relative to the inner collar and to restrict rotation of the outer collar relative to the inner collar after the outer collar is coupled to the inner collar.

In some aspects, the outer collar is welded to the inner collar via spin welding.

In some aspects, the inner collar includes at least one thread, the outer collar includes at least one thread, and the outer collar is coupled to the inner collar via engagement of the at least one thread of the outer collar with the at least one thread of the inner collar.

In another aspect, a method of assembling a vacuum attachment tool including a hollow body extending from a first end to a second end and including a vacuum conduit connector disposed at the second end includes positioning an outer collar of the conduit connector relative to an inner collar of the conduit connector such that the inner and outer collars are co-axial. The inner collar has an inner diameter sized to receive a first vacuum conduit having a first diameter, and the outer collar has an inner diameter sized to receive a second vacuum conduit having a second diameter greater than the first diameter. The method further includes moving the outer collar relative to the inner collar such that the inner collar is received within the outer collar, and coupling the outer collar to the inner collar.

In yet another aspect, a vacuum attachment tool includes a hollow body formed circumferentially about a central axis. The hollow body extends from a first end to a second end and defines a flow path. The vacuum attachment tool further includes a conduit connector disposed at the second end of the hollow body. The conduit connector includes an inner collar formed about the central axis.

In this aspect, the inner collar includes a radial inner surface having an inner diameter sized to receive a first vacuum conduit having a first diameter, a radial outer surface, and a deflectable tab including a first plurality of teeth operable to engage a locking mechanism of the first vacuum conduit. At least one tooth of the first plurality of teeth includes a first portion and a second portion spaced circumferentially from the first portion by a recess.

In this aspect, the inner collar further includes a first plurality of ribs positioned on the radial outer surface of the inner collar. The first plurality of ribs includes at least one alignment rib.

In this aspect, the conduit connector further includes an outer collar formed separately from and coupled to the inner collar. The outer collar includes a radial inner surface having an inner diameter sized to receive a second vacuum conduit having a second diameter greater than the first diameter, a radial outer surface, a second plurality of teeth positioned on the radial outer surface of the outer collar and operable to engage a locking mechanism of the second vacuum conduit, a plurality of locking fingers operable to engage at least one rib of the first plurality of ribs of the inner collar to couple the outer collar to the inner collar, and a second plurality of ribs positioned on the radial inner surface of the outer collar.

In this aspect, at least one rib of the second plurality of ribs includes a crushing portion operable to engage the first plurality of ribs of the inner collar via the crushing portion when the outer collar is coupled to the inner collar. The second plurality of ribs further includes at least one alignment rib. The at least one alignment rib of the second plurality of ribs is operable to engage the at least one alignment rib of the first plurality of ribs when the outer collar is coupled to the inner collar. Engagement of the alignment ribs aligns the outer collar relative to the inner collar and restricts rotation of the outer collar relative to the inner collar.

In yet another aspect, a vacuum conduit pipe adapter includes a hollow body extending from a first end to a second end and defining a flow path, a vacuum conduit connector disposed at the second end of the hollow body and operable to connect the vacuum conduit pipe adapter to a vacuum system, and a pipe connector disposed at the first end of the hollow body. The pipe connector includes a plurality of cylindrical fitments, where each fitment is formed circumferentially about a respective central axis and includes an inner surface having an inner diameter sized to receive a pipe having a different diameter. The central axis of each fitment is radially offset from the central axis of each other fitment, and a portion of the inner surface of each fitment is axially aligned along a common line.

In some aspects, the plurality of cylindrical fitments includes 5 fitments.

In some aspects, each fitment includes a corresponding stop surface that extends radially inward from the inner surface of the fitment to the next, smallest fitment.

In some aspects, each fitment includes a radial outer surface and the vacuum conduit pipe adapter includes a plurality of reinforcement fins coupled to the outer surface of the fitments and to the vacuum conduit connector.

In some aspects, the inner surface of at least one fitment tapers radially inward towards the central axis.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Embodiments of the attachment tools described herein facilitate improved versatility in appearance, improved compatibility with vacuum hoses or conduits of different sizes, and improved connections between the vacuum attachment tools and vacuum hoses or conduits. For example, embodiments of the vacuum attachment tools described herein include a vacuum conduit connector that includes an outer collar and a hollow body including an inner collar that are formed separately and are later coupled together, which enable the hollow body and the outer collar to be formed separately and made out of the same or different colors and materials.

When the hollow body and outer collar are coupled together (also described herein as coupling together the inner collar and the outer collar), the resulting vacuum conduit connector and the resulting attachment tool may be multi-colored and have an enhanced aesthetic appearance due to the multi-color scheme. Further, once coupled together, the inner collar and the outer collar facilitate compatibility of the attachment tool with vacuum hoses or conduits of different diameters, which reduces the number of vacuum accessories that are needed for compatibility with different sizes of vacuum hoses or conduits. Embodiments of the attachment tools described herein also include at least set of teeth that are operable to engage a locking mechanism of a vacuum hose or conduit, which facilitates enhanced connections between the attachment tool and the vacuum hoses and conduits.

Figure 1:
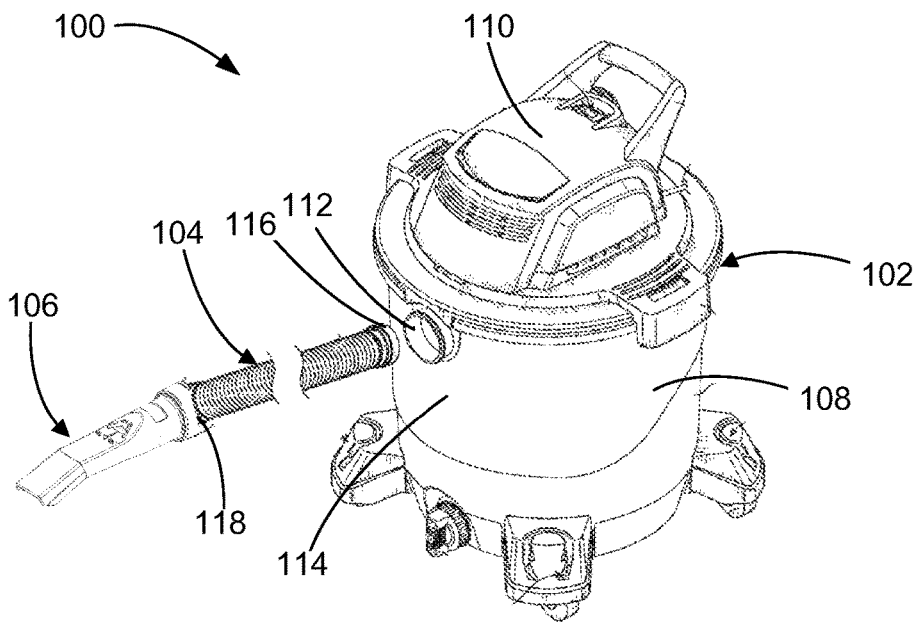
FIG. 1 is a perspective view of an example vacuum cleaning system illustrated as a wet/dry vacuum cleaner.

FIG. 1 is a perspective view of an example vacuum cleaning system 100, illustrated as a wet/dry vacuum cleaner. Although the vacuum cleaning system 100 is shown and described with reference to a wet/dry vacuum cleaner, the vacuum cleaning system 100 and features thereof may be embodied in vacuum cleaners other than wet/dry vacuum cleaners including, for example and without limitation, canister vacuum cleaners, upright vacuum cleaners, and backpack vacuum cleaners. In the example embodiment, the vacuum cleaning system 100 generally includes a suction unit 102, a vacuum conduit 104 connected in fluid communication with the suction unit 102, and a vacuum conduit attachment tool 106 connected to an end of the vacuum conduit 104.

The suction unit 102 generally includes a motor and a fan or impeller assembly (not shown) operatively connected to the motor to drive the fan and generate suction or negative pressure to permit debris and other material to be collected via the conduit 104 and the vacuum conduit attachment tool 106. In the illustrated embodiment, the suction unit includes a collection drum or canister 108 and a powerhead 110 secured to the collection canister 108. The motor and impeller assembly of the vacuum cleaning system 100 are housed within the powerhead 110, and establish a negative pressure or vacuum within the collection canister 108 when activated.

The suction unit 102 also includes a vacuum inlet port 112 for connection to one end of the vacuum conduit 104. When the vacuum conduit 104 is connected to the vacuum inlet port 112, the negative pressure or vacuum established by the motor and impeller assembly is transferred to the vacuum conduit 104 and creates suction along the vacuum conduit 104. In the illustrated embodiment, the vacuum inlet port 112 is defined along an outer cylindrical wall 114 of the collection canister 108. In other embodiments, the vacuum inlet port 112 may be located at any suitable location on the suction unit 102 that enables the vacuum cleaning system 100 to function as described herein. In some embodiments, the suction unit 102 may also include one or more filter or media assemblies interfaced between the vacuum inlet port 112 and the impeller assembly to collect finer particles or media entrained within the suction flow generated by the vacuum cleaning system 100.

The suction unit 102 also includes an exhaust port (not shown) for exhausting or expelling air flow generated by the motor and impeller assembly. The exhaust port may be located at any suitable location on the suction unit 102 that allows air flow generated by the suction unit 102 to be expelled therefrom (e.g., out of the collection canister 108). For example, the exhaust port may be defined on the powerhead 110. Moreover, in some embodiments, the exhaust port may be configured for connection to the vacuum conduit 104 such that the vacuum cleaning system 100 may be used as a blower. In some embodiments, for example, the exhaust port has a configuration similar to the vacuum inlet port 112 for connection to a first end 116 of the vacuum conduit 104.

The vacuum conduit 104 includes the first end 116 that connects to the vacuum inlet port 112 of the suction unit 102, and a second end 118 distal from the first end 116 for connection to a vacuum cleaning accessory, such as the vacuum conduit attachment tool 106. Connection of the first end 116 of the vacuum conduit 104 to the vacuum inlet port 112 permits fluid communication between the suction unit 102 and the vacuum conduit 104 such that the negative pressure or vacuum established by the suction unit 102 creates suction along the vacuum conduit 104. In the illustrated embodiment, the first and second ends 116 and 118 of the vacuum conduit 104 are circular in cross-section and define circular openings for connection to the vacuum inlet port 112 and the attachment tool 106, respectively.

In the illustrated embodiment, the first end 116 of the vacuum conduit 104 is releasably connectable to the vacuum inlet port 112 (e.g., by a friction fit) such that the vacuum conduit 104 may be disconnected from the suction unit 102 and stored when not in use. In other embodiments, the first end 116 of the vacuum conduit 104 may be fixed to the vacuum inlet port 112 such that the vacuum conduit 104 is not detachable from the suction unit 102. In the illustrated embodiment, the vacuum conduit 104 includes a flexible, extendable hose. The hose may be made of a flexible material such as plastic, polypropylene (PP), polyethylene (PE), ethylene vinyl acetate (EVA), rubber, and other flexible materials. Further, in the illustrated embodiment, the first and second ends 116 and 118 of the vacuum conduit 104 include annular rings having a relatively rigid construction as compared to the flexible hose or conduit to facilitate connection to the vacuum inlet port 112 and the attachment tool 106, respectively. In some embodiments, for example, the first end 116 and the second end 118 are constructed of the same materials as the vacuum conduit 104, and have a more rigid construction (e.g., thicker sidewalls). In other embodiments, the ends of the vacuum conduit 104 may be constructed of any suitable semi-rigid or flexible materials that enable the vacuum cleaning system 100 to function as described herein.

In other embodiments, the vacuum conduit 104 may include a rigid tube in addition to or as an alternative to the flexible hose or conduit. In such embodiments, the tube may be constructed from suitably rigid materials including, for example and without limitation, rigid and/or pliable plastics, nylons, rubbers, and metals. In other embodiments, the vacuum conduit 104 may be constructed of any suitable material that enables the vacuum cleaning system 100 to function as described herein.

The vacuum conduit attachment tool 106 is connected to the second end 118 of the vacuum conduit 104 such that the attachment tool 106 can be manipulated to engage surfaces for cleaning (e.g., floors or other surfaces). The attachment tool 106 is releasably connected to the second end 118 of the vacuum conduit 104 such that the attachment tool 106 can be interchanged with other vacuum conduit attachment tools designed for different vacuum cleaning operations. As described in more detail herein, the attachment tool 106 includes a vacuum conduit connector to facilitate coupling different sized (e.g., diameter) vacuum conduits and hoses to the vacuum conduit attachment tool 106.

Figure 2:
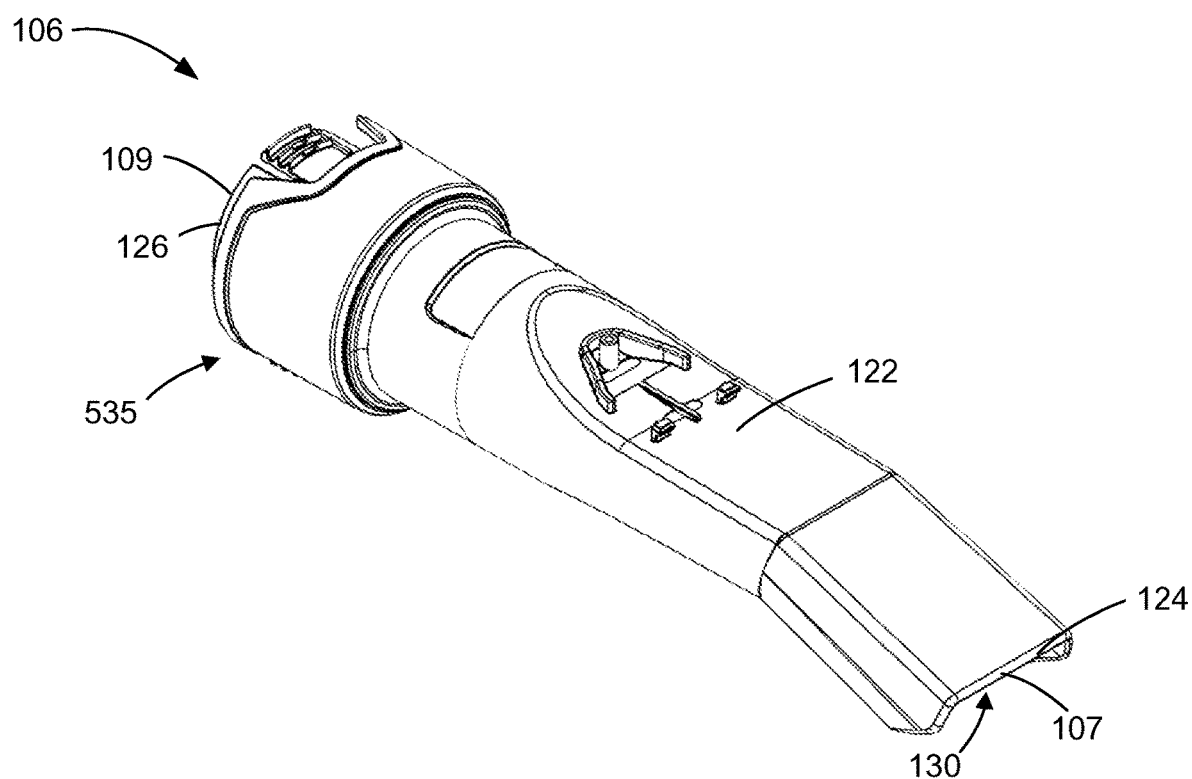
FIG. 2 is a perspective view of an example attachment tool of the vacuum cleaning system of FIG. 1.

FIG. 2 is a perspective view of an example attachment tool 106. The vacuum conduit attachment tool 106 generally extends from a first end 107 to a second end 109 and includes a hollow attachment body 122 extending from a first end 124 to a second end 126.

The attachment tool 106 further includes a vacuum conduit connector 535 disposed at the second end 126 of the hollow attachment body 122 for connection to the second end 118 of the vacuum conduit 104 (or hose). The hollow attachment body 122 defines a suction flow path (generally, a flow path) extending from the first end 107 to the second end 109, and the attachment tool defines a suction inlet 130 (generally, an inlet) for receiving debris therethrough. The vacuum conduit connector 535 is configured (sized, shaped, and made of suitable material) for connection to the vacuum conduit 104 and, as described in more detail below, is designed for connecting to various sizes (e.g., diameters) of vacuum hoses or conduits. The specific configuration of the vacuum conduit connector 535 illustrated in FIG. 2 is described in greater detail herein with reference to FIGS. 19-21. When the attachment tool 106 is connected to the vacuum conduit 104 via the vacuum conduit connector 535, suction generated by the suction unit 102 is transferred to the attachment tool 106, generating airflow through the inlet 130 at the first end 107 of the attachment tool 106 towards the second end 109 of the attachment tool 106.

The attachment tool 106 shown in FIG. 2 is generally a hollow nozzle body configured for vacuuming a surface (e.g., a crevice tool). However, in other embodiments, the attachment tool 106 may include vacuum nozzles of different configurations and/or vacuum nozzles that include brushes and/or squeegees. For example, the attachment tool 106 may be a crevice tool, a dusting brush, a car nozzle, a floor brush, a floor tool, a utility nozzle, or a triangular dusting brush.

The attachment tool 106 may be constructed from a variety of suitable materials depending on the intended use or application of the attachment tool 106. In some embodiments, for example, the attachment tool 106 is constructed of a hard, rigid plastic including, for example and without limitation, polypropylene. In other embodiments, the attachment tool 106 may be constructed of any suitably rigid, semi-rigid, or flexible material that enables the attachment tool 106 to function as described herein including, for example and without limitation, PE, EVA, and rubber. In the illustrated embodiments, the attachment tool 106 has a two-piece construction. That is, the hollow attachment body 122 is formed as one piece, and other portions of the attachment tool 106 are formed as a separate piece (e.g., an outer collar). When the two pieces are coupled together, the attachment tool 106 is formed, as described further herein. Suitable methods for forming individual pieces of the attachment tool 106 include, for example and without limitation, injection molding, precision machining, and casting.

Figure 3:
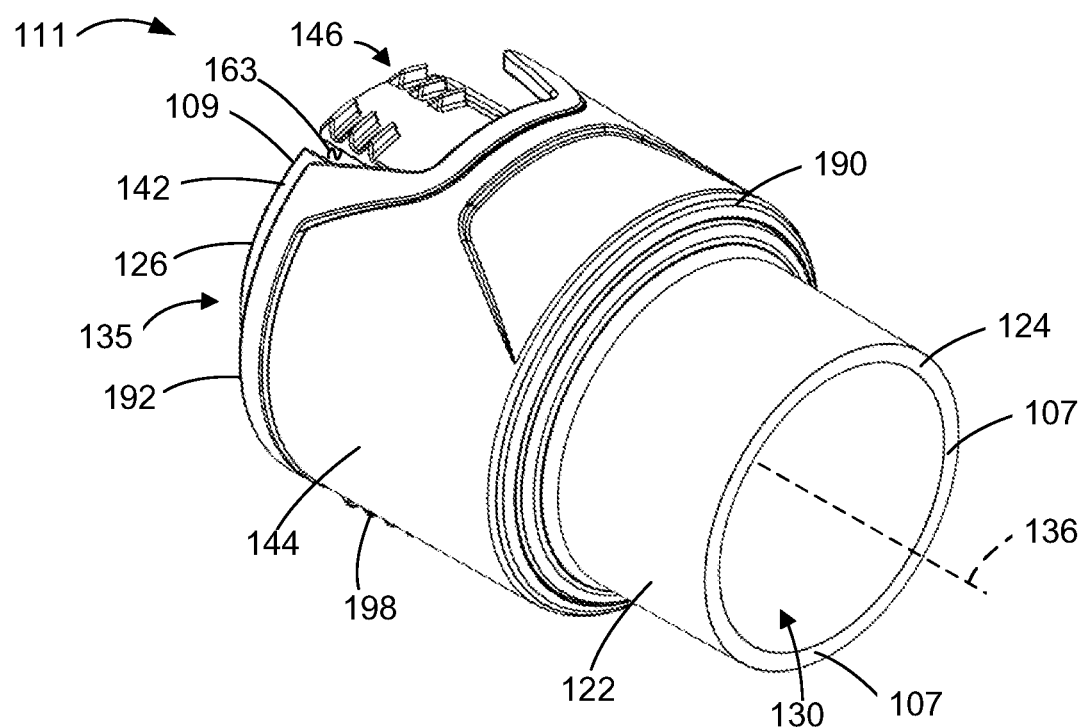
FIG. 3 is a perspective view of another example attachment tool that includes a first example vacuum conduit connector.
Figure 4:
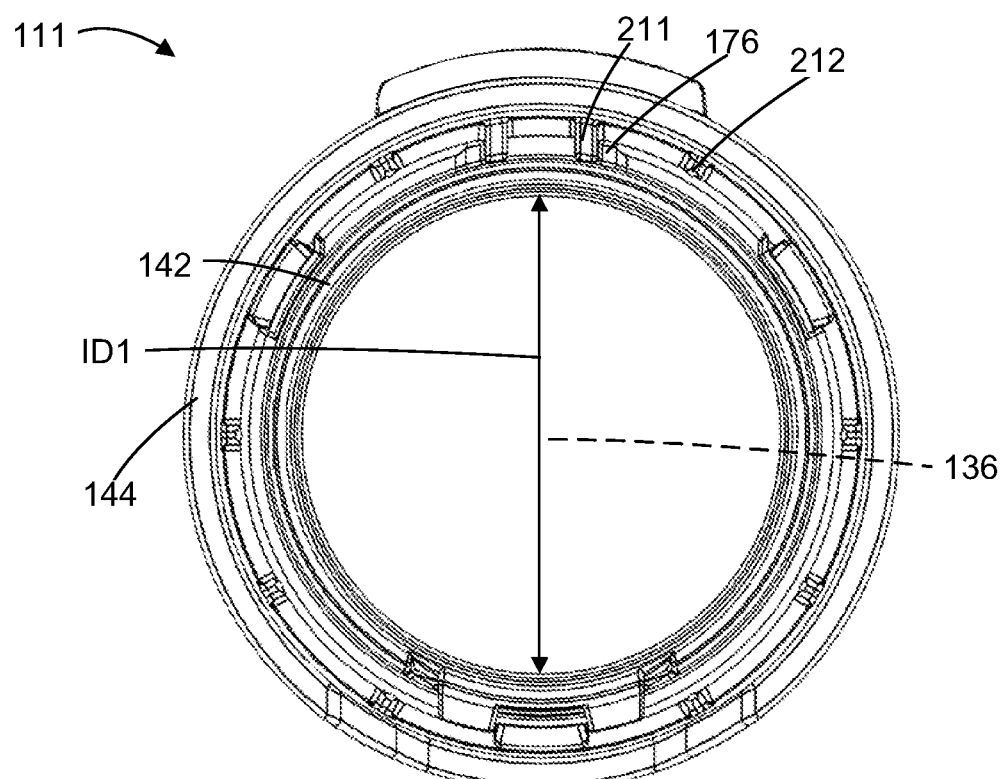
FIG. 4 is a rear view of the attachment tool shown in FIG. 3.
Figure 5:
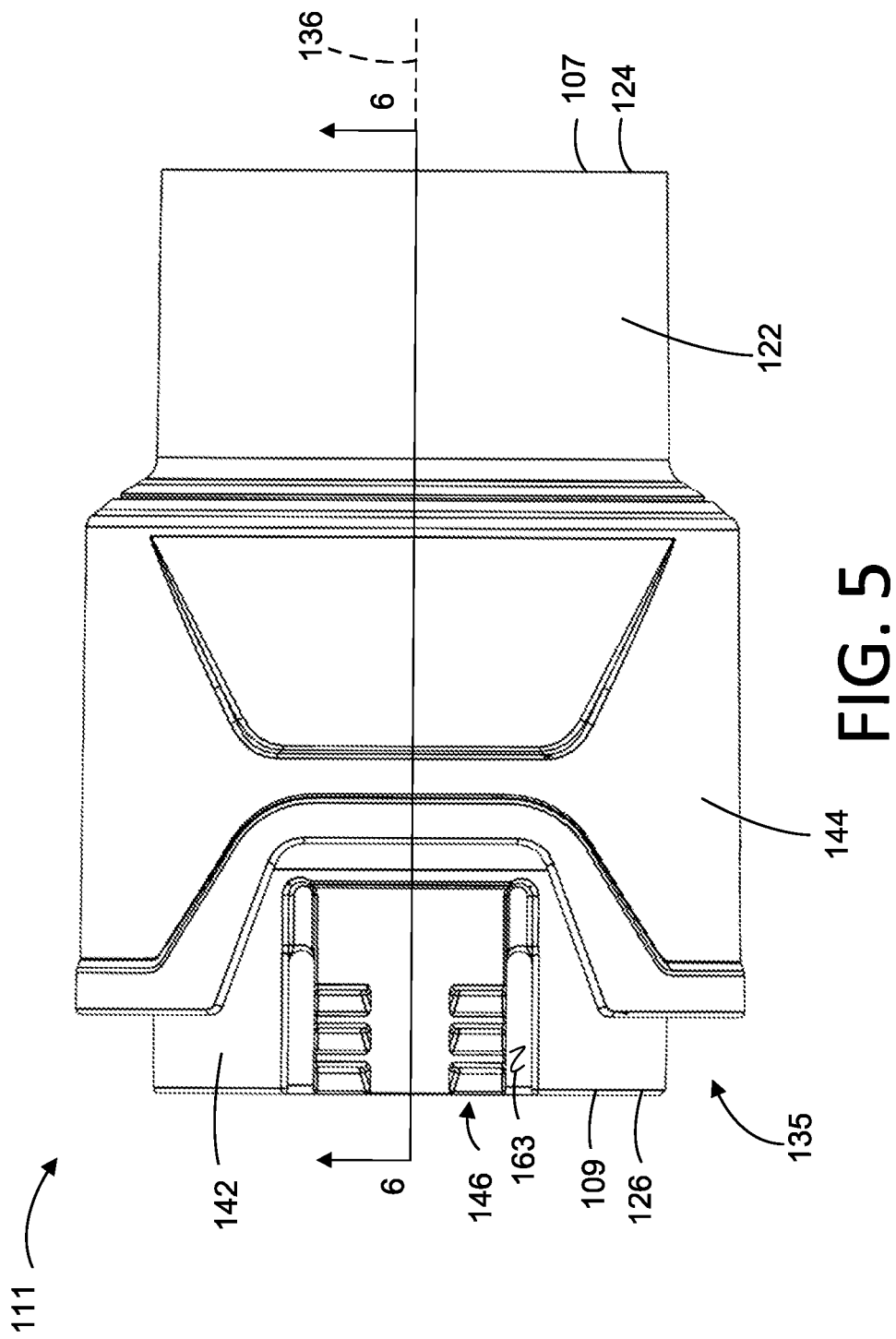
FIG. 5 is a top view of the attachment tool shown in FIG. 3.
Figure 6:
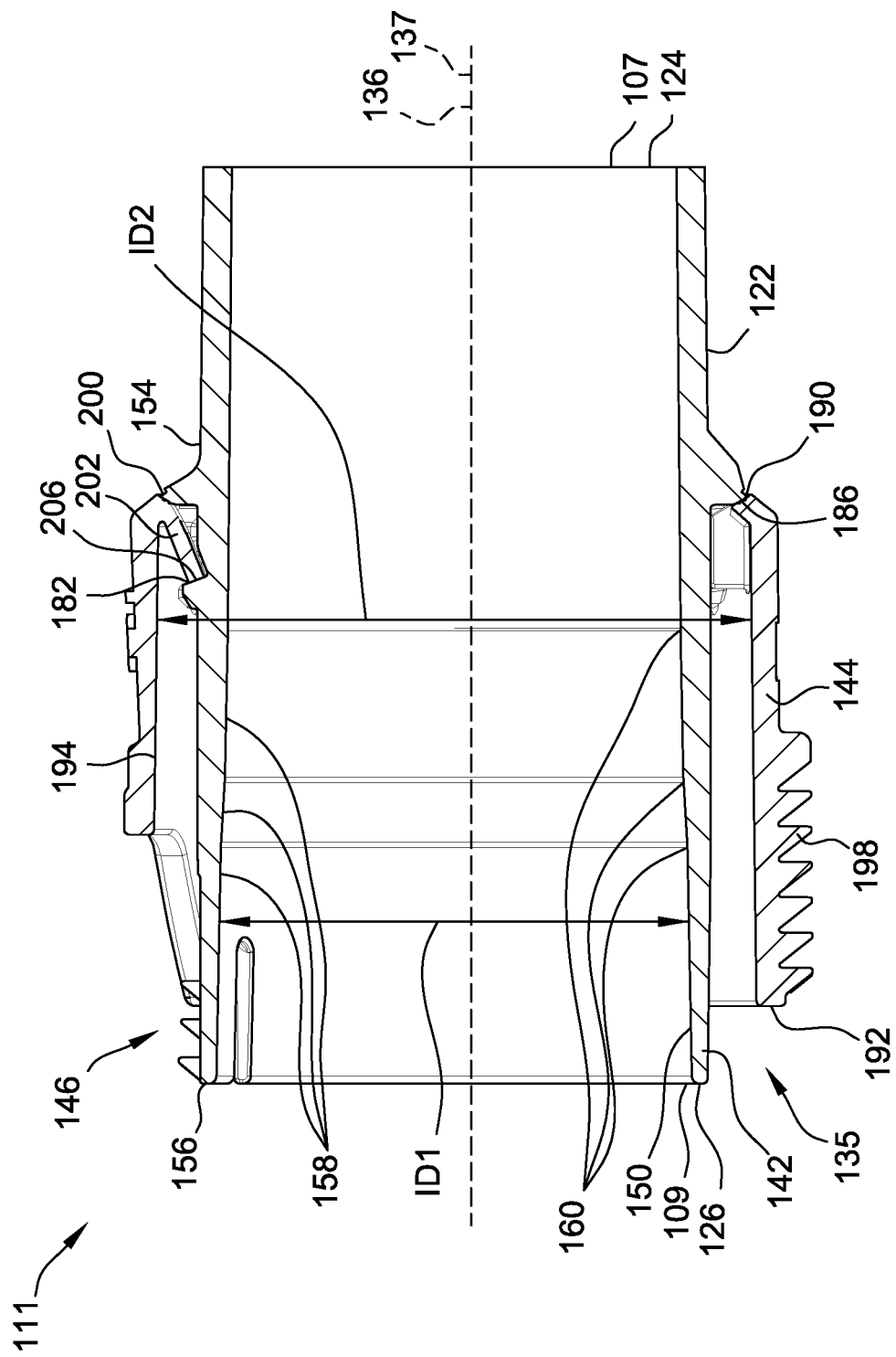
FIG. 6 is sectional view of the attachment tool of FIG. 5, taken along line 6-6.

FIG. 3 is a perspective view of another example attachment tool 111 that includes an example vacuum conduit connector 135 ("vacuum conduit connector" and "conduit connector" are used interchangeably herein). FIG. 4 is a rear view of the attachment tool 111, FIG. 5 is a top view of the attachment tool 111, and FIG. 6 is sectional view of the attachment tool 111 of FIG. 5, taken along line 6-6. The attachment tool 111 shown in FIGS. 3-6 is a wide nozzle tool, although the vacuum conduit connector 135 may be implemented on other attachment tools including, for example and without limitation, the vacuum attachment tools shown and/or described herein.

The attachment tool 111 is similar to the attachment tool 106 described with reference to FIG. 2, except as otherwise noted. Components of the attachment tool 111 include identical numbering to similar components of the attachment tool 106, with different components including different reference numbers. For example, reference numbers 107, 109 are used to denote first and second ends of each attachment tool described herein, reference number 122 is used to denote a hollow body of each attachment tool described herein, and reference number 130 is used to denote a suction inlet of each attachment tool described herein.

With reference to FIGS. 3-6, the attachment tool 111 includes a hollow body 122 and the vacuum conduit connector 135. The vacuum conduit connector 135 is operable to connect vacuum hoses or conduits of different diameters to the attachment tool 111.

In the illustrated embodiment, the hollow body 122 is generally cylindrical and formed circumferentially about a central axis 136 and extends from a first end 124 to a second end 126 defining a flow path. Unlike the attachment tool 106, the first end 107 of the attachment tool 111 includes a wide opening (i.e., the attachment tool 111 is not a crevice tool).

The vacuum conduit connector 135 is disposed at the second end 126 of the hollow body 122 and includes an inner collar 142 and an outer collar 144. The inner collar 142 is formed as part of the hollow body 122 in the illustrated embodiment, and has an inner diameter ID1 (FIG. 4) sized to receive a first vacuum hose or conduit having a first diameter. The outer collar 144 has an inner diameter ID2 (FIG. 6) sized to receive a second vacuum hose or conduit having a second diameter greater than the first diameter. In the illustrated embodiment, the outer collar 144 is formed separately from the inner collar 142 and is coupled to the inner collar 142, as further described herein. At least one of the inner collar 142 and the outer collar 144 may include a plurality of teeth 146, 198 operable to engage a locking mechanism of a vacuum conduit, as described further herein.

Figure 7:
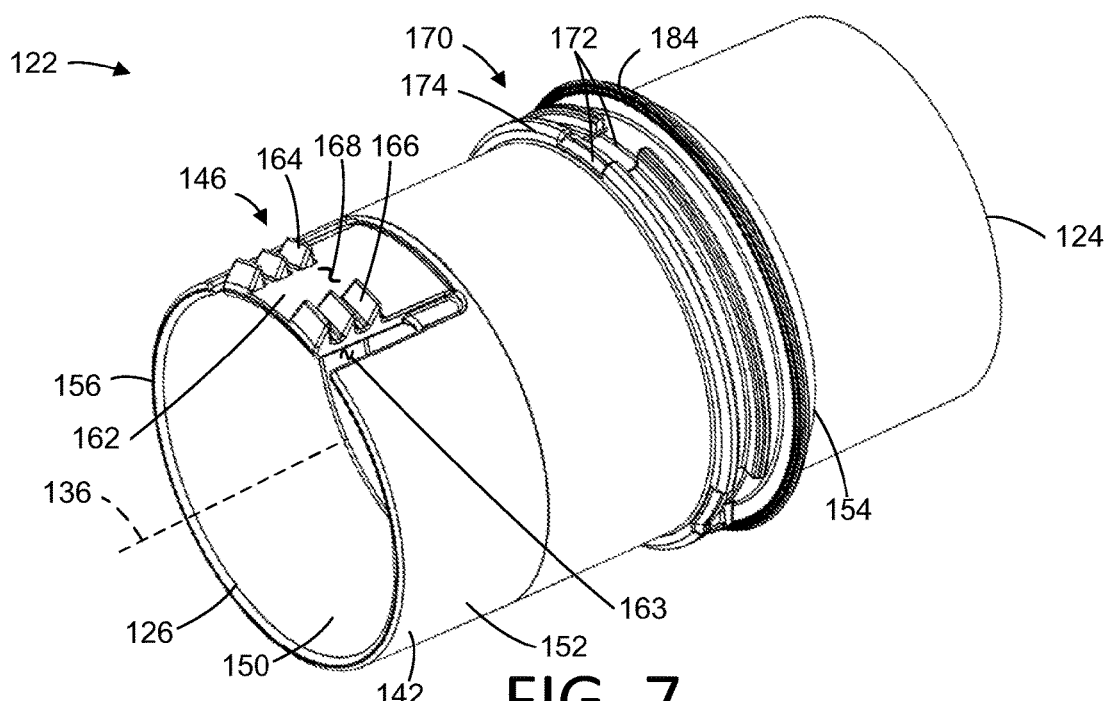
FIG. 7 is a perspective view of an example hollow body of the attachment tool shown in FIG. 3.

FIG. 7 illustrates an example hollow body 122 of the attachment tool 111. As shown in FIG. 7, the hollow body 122 (including the inner collar 142) is generally cylindrical in shape and is formed circumferentially about the central axis 136.

The inner collar 142 includes a radial inner surface 150 and a radial outer surface 152, and extends from a first end 154 to a second end 156. The inner surface 150 has the diameter ID1 (FIG. 4) sized to receive the first vacuum conduit having the first diameter. The outer surface 152 has an outer diameter that is greater than the inner diameter. In the illustrated embodiment, the diameter ID1 of the inner surface 150 is sized to receive a vacuum hose or conduit with a diameter of about 1⅞", which is a standard or nominal diameter that generally refers to an outer diameter of the vacuum hose or conduit. In other embodiments, the diameter ID1 of the inner surface 150 may be any suitable diameter that enables the attachment tool 111 to function as described herein.

With reference to FIG. 6, in the illustrated embodiment, the inner surface 150 tapers radially inward (i.e., is radially tapered), towards the central axis 136, over at least one tapered portion 158 between the second end 156 of the inner collar 142 and the first end 154 of the inner collar 142. The at least one tapered portion 158 of the inner surface 150 facilitates enhanced connection between a vacuum hose or conduit and the inner surface 150. That is, the diameter ID1 of the inner surface 150 decreases between the second end 156 of the inner collar 142 and the first end 154 of the inner collar 142, which helps to ensure a snug press-fit connection between the vacuum hose or conduit and the inner surface 150. In some embodiments, the at least one tapered portion 158 enables vacuum hoses or conduits of different outer diameters to be inserted into the inner collar 142. In the example embodiment, the at least one tapered portion 158 facilitates reception of vacuum hoses or conduits having an outer or nominal diameter of about 1⅞" within the inner collar 142. That is, the at least one tapered portion 158 accommodates variations in the outer or nominal diameters of the vacuum hoses or conduits.

Figure 28:
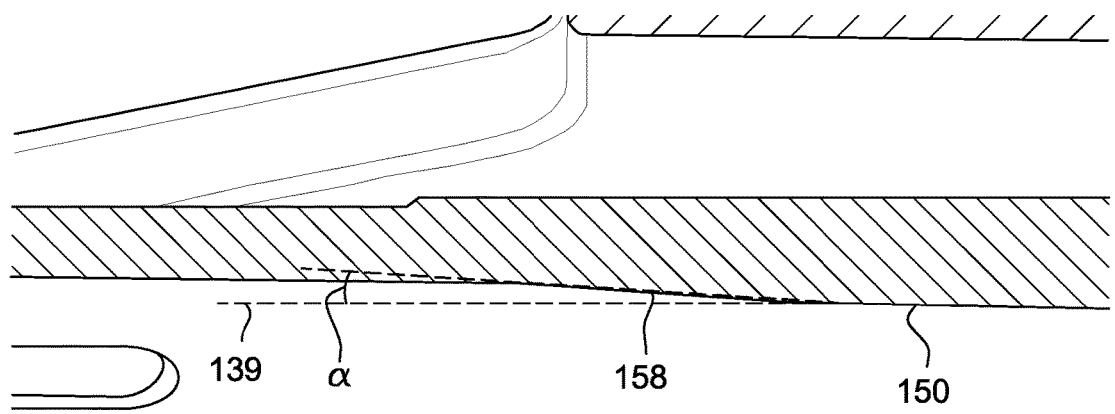
FIG. 28 is an enlarged view of a portion of FIG. 6, illustrating a taper angle of the inner surface of the inner collar.

Further, in the example embodiment, the inner surface 150 includes three tapered portions 158 that each include a different taper angle α (or varying taper angle) of between 0 degrees and 10 degrees with respect to the central axis 136, as shown for example in FIG. 28. In some embodiments, each tapered portion 158 may include the same taper angle α. However, in other embodiments, the inner surface 150 may include any suitable number of tapered portions 158, may be continuously tapered, or have any other suitable configuration that enables the attachment tool 111 to function as described herein. The at least one tapered portion 158 facilitates forming a press-fit connection between the inner surface 150 of the inner collar 142 and an outer surface of the vacuum hose or conduit. The at least one tapered portion 158 also functions as a tapered stopper that helps to inhibit the vacuum hose or conduit from being over inserted within the inner collar 142.

The inner surface 150 may also include at least one taper transition portion 160 that provides a fillet or smooth transition between the tapered portions 158 and/or between the tapered portions 158 and a non-tapered portion (e.g., a portion with no radial taper relative to the central axis 136). In some embodiments, the at least one taper transition portion 160 functions as a tapered stopper that helps to inhibit insertion of a vacuum hose or conduit into the inner collar 142 beyond the location of the at least one taper transition portion 160, which prevents the vacuum hose or conduit from being over inserted within the inner collar 142. In the illustrated embodiment, the inner surface 150 includes three taper transition portions 160. However, in other embodiments, the inner surface 150 may include any suitable number of taper transition portions 160 that enables the attachment tool 111 to function as described herein.

With reference to FIG. 7, the inner collar 142 also includes a deflectable tab 162. The deflectable tab 162 is defined by two axially-extending slots 163 that are positioned on circumferentially opposite sides of the tab 162. The slots 163 extend a suitable axial length from the second end 156 of the inner collar 142 to enable the deflectable tab 162 to deflect radially inward and outward.

The deflectable tab 162 includes a set or plurality of teeth 146 operable to engage a locking mechanism of a vacuum hose or conduit. At least one tooth of the plurality of teeth 146 includes a first portion 164 and a second portion 166, where the second portion 166 is spaced circumferentially or laterally from the first portion 164 by a recess or gap 168. In the illustrated embodiment, the inner collar 142 includes three teeth 146 that each include a first portion 164 and a second portion 166 spaced circumferentially from the corresponding first portion 164 by a corresponding recess or gap 168. In other embodiments, the inner collar 142 may include any suitable number of teeth 146 having any suitable configuration (e.g., number of recesses 168) that enable the attachment tool 111 to function as described herein. In the illustrated embodiment, the recesses 168 that space the first and second portions 164, 166 of teeth 146 from each other enable a locking finger 202 of the outer collar 144 to pass between the first and second portions 164, 166 of the teeth 146 when the outer collar 144 is coupled to the inner collar 142, as described further herein.

The inner collar 142 also includes at least one rib 170 positioned on the outer surface 152. In the illustrated embodiment, the at least one rib 170 includes a plurality of ribs 170 (e.g., a first plurality of ribs 170). The ribs 170 extend radially outward from the outer surface 152 of the inner collar 142 and are operable to engage components of the outer collar 144 (e.g., crushing ribs 212) when the outer collar 144 is coupled to the inner collar 142. In the illustrated embodiment, the ribs 170 include recessed portions 172 that allow the locking fingers 202 of the outer collar 144 to slide over the ribs 170 and also provide clearance around the locking fingers 202 when the outer collar 144 is coupled to the inner collar 142, as described further herein.

Figure 8:
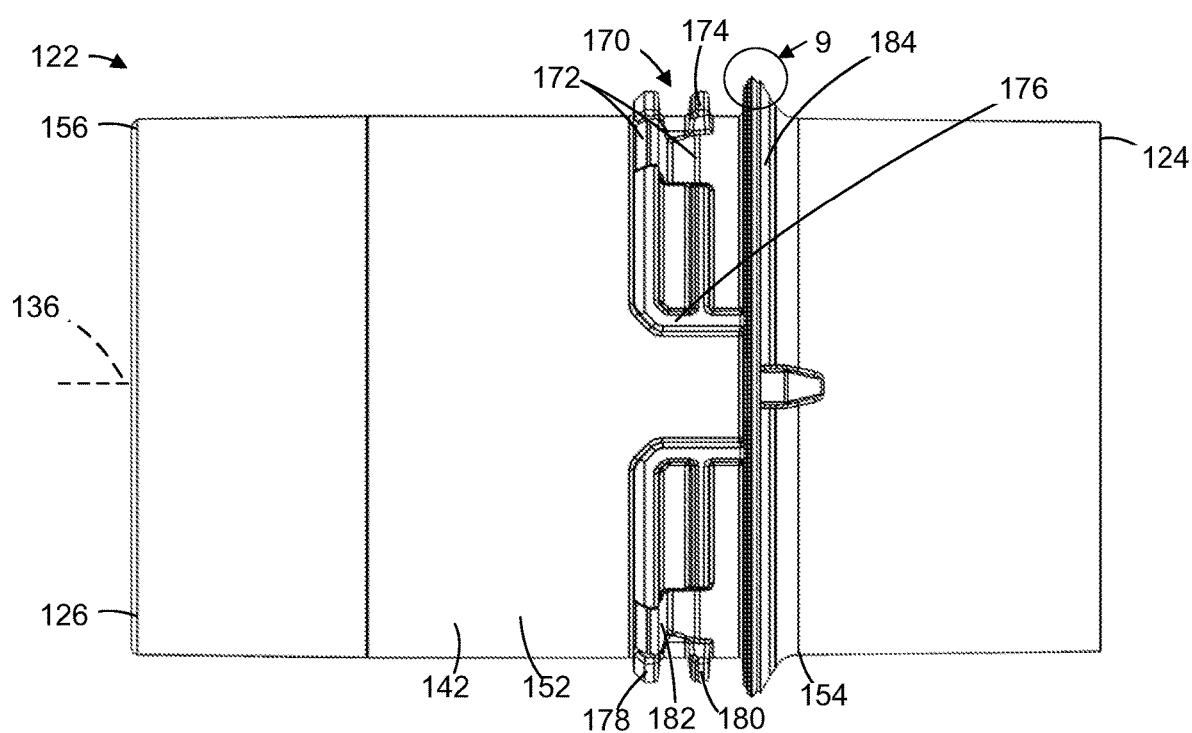
FIG. 8 is a top view of the hollow body shown in FIG. 7.

FIG. 8 is a top view of the hollow body 122 shown in FIG. 7. With additional reference to FIG. 8, the ribs 170 include circumferential ribs 174 that generally extend circumferentially around outer surface 152 of inner collar 142 and alignment ribs 176 that generally extend parallel to the central axis 136 (i.e., axially). That is, the inner collar 142 includes at least one alignment rib 176 positioned on the outer surface 152.

The circumferential ribs 174 are operable to engage locking fingers 202 of the outer collar 144 when the inner collar 142 is coupled to the outer collar 144, as described further herein. The alignment ribs 176 of the inner collar 142 are operable to engage alignment ribs 211 positioned on the outer collar 144, as described further herein. In the illustrated embodiment, the inner collar 142 includes two circumferential ribs 174 and two alignment ribs 176, and each of the circumferential ribs 174 are connected to one of the alignment ribs 176 at each end of the circumferential ribs 174. In other embodiments, the inner collar 142 may include any suitable number of circumferential ribs 174 and alignment ribs 176 arranged in any suitable configuration that enables the attachment tool 111 to function as described herein.

In the illustrated embodiment, circumferential ribs 174 include a first circumferential rib 178 and a second circumferential rib 180. The first and second circumferential ribs 178, 180 each include the recessed portions 172 that enable locking fingers 202 to slide over the circumferential ribs 174 and provide clearance around locking fingers 202 when the outer collar 144 is coupled to the inner collar 142.

With reference to FIGS. 6 and 8, the first circumferential rib 178 includes an engagement surface 182 near each recessed portion 172 that is operable to engage locking fingers 202 of the outer collar 144 when the outer collar 144 is coupled to the inner collar 142, as described further herein.

Figure 9:
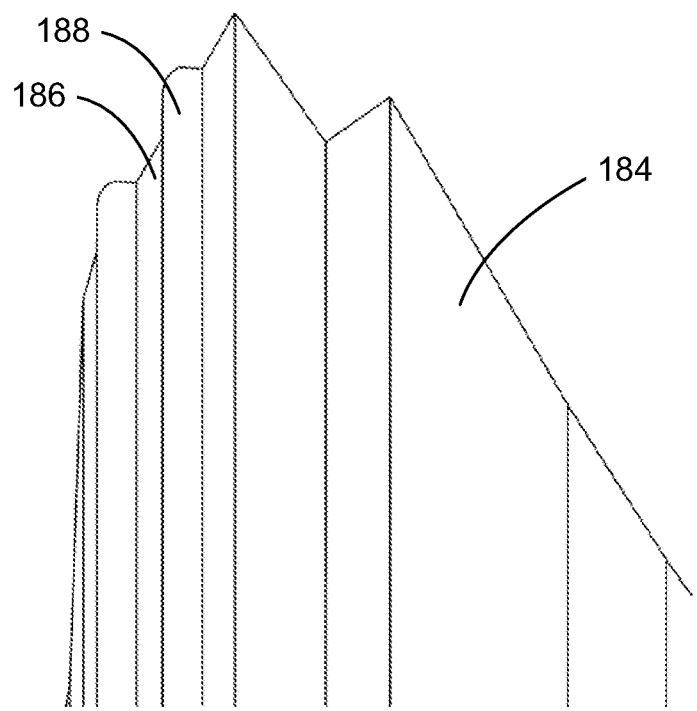
FIG. 9 is an enlarged view of an inner collar of the hollow body shown in FIG. 8, illustrating an example crushing rib of an engagement surface.

With reference to FIGS. 7 and 8, the inner collar 142 also includes a protrusion 184 that extends radially outward from the outer surface 152 and extends circumferentially around outer surface 152. With additional reference to FIG. 9, which shows an enlarged view of a portion of the protrusion 184, the protrusion 184 includes a sealing surface 186 that is operable to form a first part of a press-fit hermetic seal between the inner collar 142 and the outer collar 144 when the outer collar 144 is coupled to the inner collar 142, as described further herein.

In the illustrated embodiment, the sealing surface 186 includes crushing portions 188. The crushing portions 188 are generally malleable and are generally deformed to form the first part of the press-fit hermetic seal between the outer collar 144 and the inner collar 142 when the outer collar 144 is coupled to the inner collar 142. That is, the crushing portions 188 enable a semi-rigid assembly to be formed between the inner collar 142 and the outer collar 144 when the outer collar 144 is coupled to the inner collar 142. In the illustrated embodiment, the crushing portions 188 are shown as continuous beads. In other embodiments, the crushing portions 188 may be of any suitable configuration that enables the attachment tool 111 to function as described herein.

Figure 10:
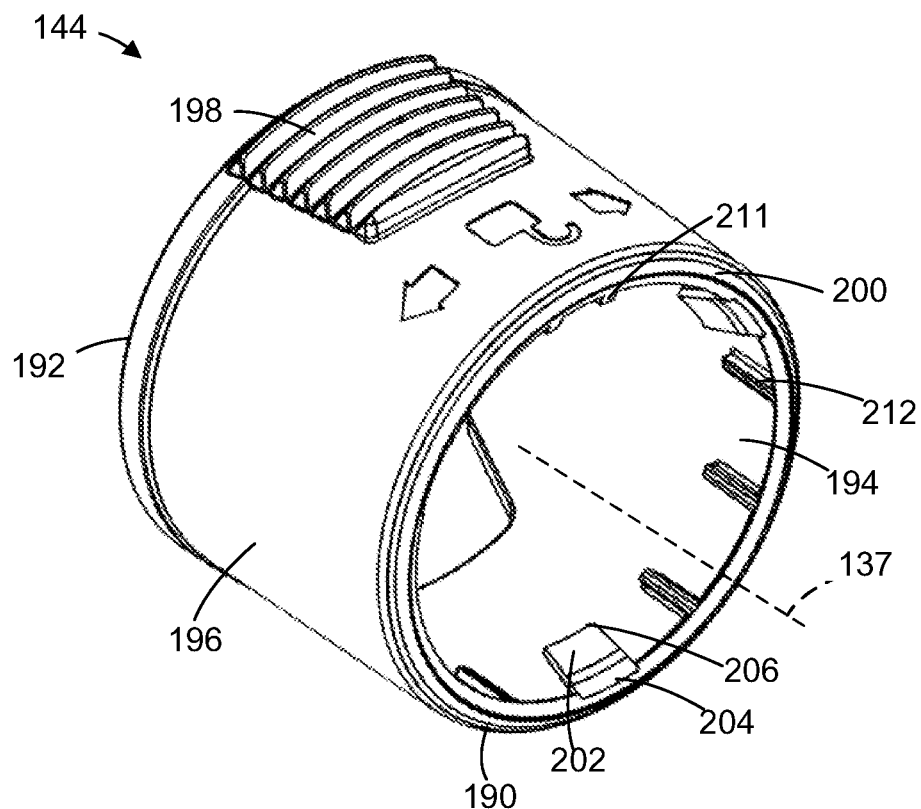
FIG. 10 is a bottom perspective view of an example outer collar of the attachment tool shown in FIG. 3.
Figure 11:
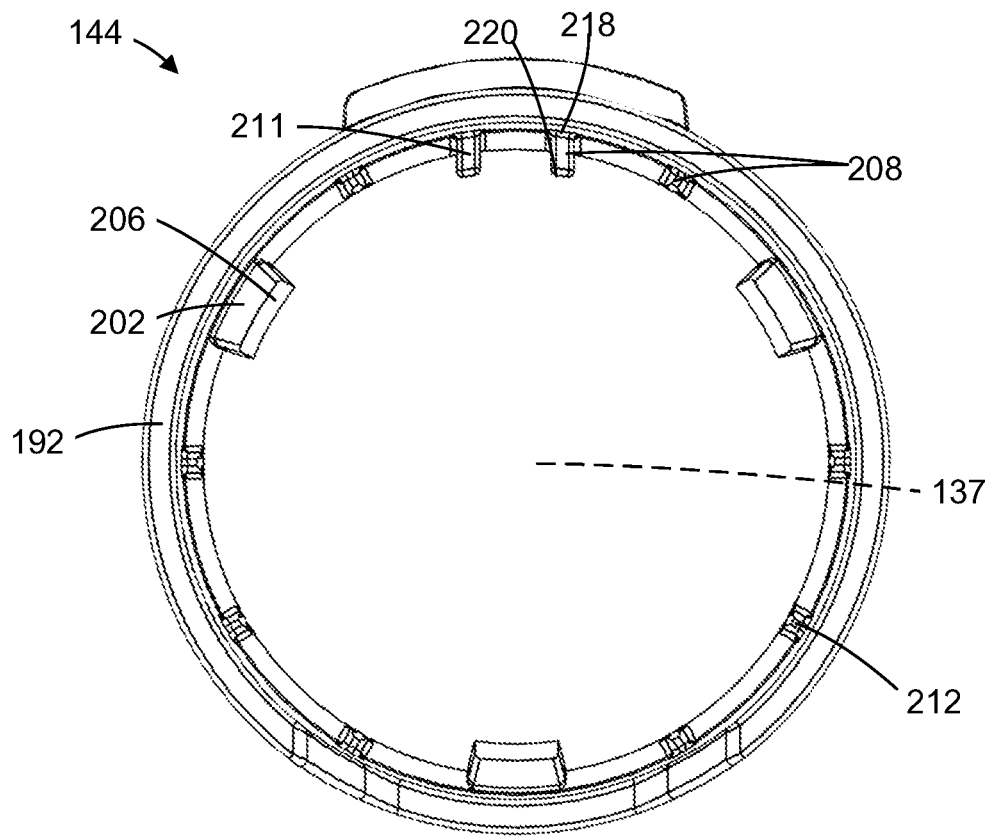
FIG. 11 is a rear view of the outer collar shown in FIG. 10.

FIG. 10 is a bottom perspective view of the outer collar 144, and FIG. 11 is a rear view of the outer collar 144. With reference to FIGS. 3, 10, and 11, the outer collar 144 extends from a first end 190 to a second end 192, and includes a radial inner surface 194 and a radial outer surface 196. The inner surface 194 has an inner diameter ID2 sized to receive a second vacuum hose or conduit having a second diameter greater than the first diameter, and facilitates forming a press-fit connection between the vacuum hose or conduit and the vacuum conduit connector 135. The outer surface 196 has a diameter that is greater than the diameter ID2 of the inner surface 194. In the illustrated embodiment, the diameter ID2 of the inner surface 194 is sized to receive a vacuum hose or conduit with a diameter of about 2½", which is a standard or nominal diameter that generally refers to an outer diameter of the vacuum hose or conduit. In other embodiments, the diameter ID2 of the inner surface 194 may be any suitable diameter such that the vacuum system 100 can function as described herein.

With additional reference to FIG. 6, the inner surface 194 tapers radially inward, towards a central axis 137 of the outer collar 144, from the second end 192 of the outer collar 144 to the first end 190 of the outer collar 144. In the example embodiment, the inner surface 194 tapers radially inward at an angle of between 0 degrees and 10 degrees relative to the central axis 137 (similar to angle x). The radial taper of the inner surface 194 facilitates enhanced connection between a vacuum hose or conduit and the inner surface 194. That is, the diameter ID2 of the inner surface 194 generally decreases between the second end 192 of the outer collar 144 and the first end 190 of the inner collar 142. In other embodiments, the diameter ID2 of the inner surface 194 of the outer collar 144 may include any suitable taper (including an outward taper) between the second end 192 and the first end 190 of the outer collar 144 that enables the attachment tool 111 to function as described herein. In some embodiments, the inner surface 194 may also include at least one tapered portion and at least one taper transition portion similar to tapered portions 158 and taper transition portions 160, respectively, of the inner collar 142. That is, the inner surface 194 may be radially tapered. In some embodiments, at least one of the inner surface 150 of the inner collar 142 and the inner surface 194 of the outer collar 144 is radially tapered.

The outer collar 144 further includes a set or plurality of teeth 198 (e.g., a second plurality of teeth 198) positioned on the outer surface 196 and operable to engage a locking mechanism of the second vacuum conduit. In the illustrated embodiment, the outer collar 144 includes seven teeth 198. In other embodiments, the outer collar 144 may include any suitable number of teeth 198 having any suitable configuration that enables the vacuum system 100 to function as described herein.

With reference to FIGS. 6 and 10, the outer collar 144 further includes a sealing surface 200 positioned near the first end 190. The sealing surface 200 is operable to engage the sealing surface 186 of the protrusion 184 of the inner collar 142 to form a press-fit hermetic seal between the inner collar 142 and the outer collar 144 when the outer collar 144 is coupled to the inner collar 142, as described further herein.

With additional reference to FIG. 11, the outer collar 144 also includes at least one locking finger 202 operable to engage the at least one rib 170 of the inner collar 142 to couple the outer collar 144 to the inner collar 142. That is, the at least one locking finger 202 is operable to couple the outer collar 144 to the inner collar 142 via a snap connection. In the illustrated embodiment, the at least one locking finger 202 includes a plurality of locking fingers 202 operable to engage the at least one rib 170 of the inner collar 142 to couple the outer collar 144 to the inner collar 142. The locking fingers 202 each extend from a first end 204 at the inner surface 194 near the first end 190 of the outer collar 144 to a second, free end 206 that is positioned within the outer collar 144. That is, locking fingers 202 are supported at the first end 204, but are free at the second end 206. In the illustrated embodiment, the outer collar 144 includes three locking fingers 202 spaced circumferentially apart from one another about the central axis 137 by about 120 degrees. However, in other embodiments, the outer collar 144 may include any suitable number of locking fingers 202 having any suitable configuration and arrangement that enable the attachment tool 111 to function as described herein.

FIGS. 10 and 11 illustrate the locking fingers 202 in an initial or undeformed position. The locking fingers 202 may be radially displaced (e.g., bent) when an external force is applied to the locking fingers 202 (e.g., when the locking fingers 202 engage circumferential ribs 174 of the inner collar 142) so that the second ends 206 of the locking fingers 202 are displaced radially inward or outward relative to the position of the second ends 206 of the locking fingers 202 in the undeformed position. When no external force is applied to the locking fingers 202, the locking fingers 202 return to their undeformed positions. That is, the locking fingers 202 are biased to return to their undeformed positions when no external force is applied to the locking fingers 202.

The locking fingers 202 are operable to engage the at least one rib 170 of the inner collar 142 to couple the outer collar 144 to the inner collar 142. More specifically, in the illustrated embodiment, the locking fingers 202 are configured such that the second end 206 of each locking finger 202 engages a separate engagement surface 182 of the first circumferential rib 178 of the inner collar 142.

The outer collar 144 also includes at least one rib 208 positioned on the inner surface 194. The at least one rib 208 of the outer collar 144 is operable to engage the at least one rib 170 of the inner collar 142 when the outer collar 144 is coupled to the inner collar 142. At least one rib of the at least one rib 208 is a crushing rib 212 that includes a crushing portion 216 operable to engage the at least one rib 170 of the inner collar when the outer collar 144 is coupled to the inner collar 142. In the illustrated embodiment, the at least one rib 208 includes a plurality of ribs 208 (e.g., a second plurality of ribs 208). The plurality of ribs 208 includes a plurality of crushing ribs 212 and alignment ribs 211. That is, the outer collar 144 includes at least one alignment rib 211 positioned on the inner surface 194. The at least one alignment rib 176 of the inner collar 142 and the at least one alignment rib 211 of the outer collar 144 are operable to engage one another when the outer collar 144 is coupled to the inner collar 142 to ensure proper alignment of the outer collar 144 relative to the inner collar 142 and to restrict rotation of the outer collar 144 relative to the inner collar 142 after the outer collar 144 is coupled to the inner collar 142, as described further herein.

Figure 12:
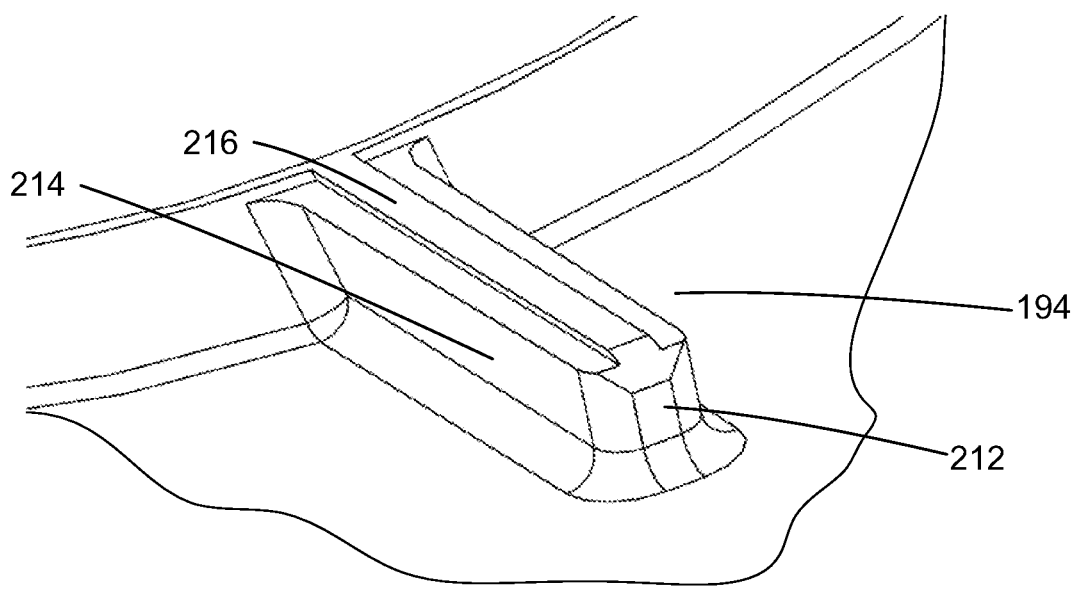
FIG. 12 is an enlarged view of the outer collar shown in FIG. 10 illustrating an example crushing rib.

FIG. 12 is an enlarged view of the outer collar 144 illustrating an example crushing rib 212. With reference to FIGS. 10-12, crushing ribs 212 protrude radially inward from the inner surface 194 of the outer collar 144, and are operable to engage the at least one rib 170 of the inner collar 142 when the outer collar 144 is coupled to the inner collar 142. More specifically, the crushing ribs 212 are operable to engage the first and second circumferential ribs 178, 180 of the inner collar 142 when the outer collar 144 is coupled to the inner collar 142.

Each crushing rib 212 includes a rigid portion 214 and a crushing portion 216. The rigid portion 214 is generally stiff and generally does not deform when crushing ribs 212 engage the first and second circumferential ribs 178, 180 of inner collar 142. The crushing portion 216 of each crushing rib 212 is generally malleable and is generally deformed when crushing ribs 212 of outer collar 144 engage the first and second circumferential ribs 178, 180 of the inner collar 142 when the inner collar 142 is coupled to outer collar 144. The crushing portion 216 of each crushing rib 212 is positioned radially inward (e.g., closer to the central axis 137) of the rigid portion 214 of each crushing rib 212. In the illustrated embodiment, the outer collar 144 includes eight crushing ribs 212. In other embodiments, the outer collar may include any suitable number of crushing ribs 212 having any suitable configuration that enables the attachment tool 111 to function as described herein.

When the crushing portion 216 of each crushing rib 212 engages the first and second circumferential ribs 178, 180 of the inner collar 142, the crushing portion 216 of each crushing rib 212 deforms and enhances the engagement between the outer collar 144 and the inner collar 142. The deforming of the crushing portions 216 also helps to prevent movement (e.g., wobbling or vibration) between the outer collar 144 and the inner collar 142 due to, for example, differences between innermost diameters of the rigid portions 214 of the outer collar 144 and outermost diameters of the first and second circumferential ribs 178, 180 of the inner collar 142. That is, engagement of the crushing portion 216 of the at least one crushing rib 212 of the outer collar 144 with the at least one rib 170 of the inner collar 142 when the outer collar 144 is coupled to the inner collar 142 inhibits movement of the outer collar 144 relative to the inner collar 142.

With reference to FIG. 11, alignment ribs 211 of the outer collar 144 protrude radially inward from the inner surface 194 of the outer collar 144 from a first end 218 to a second end 220. With additional reference to FIG. 4, the alignment ribs 211 are operable to engage alignment ribs 176 of the inner collar 142 to ensure proper alignment of the outer collar 144 relative to the inner collar 142 and to restrict rotation of the outer collar 144 relative to the inner collar 142 after the outer collar 144 is coupled to the inner collar 142. That is, the alignment ribs 176, 211 facilitate correct alignment of the inner collar 142 relative to the outer collar 144. Specifically, before the outer collar 144 is coupled to the inner collar 142, the outer collar 144 is rotated about the central axis 137 such that each alignment rib 211 of the outer collar 144 is circumferentially aligned between two of the alignment ribs 176 of the inner collar 142. When the alignment ribs 211 of the outer collar 144 and the alignment ribs 176 of the inner collar 142 are positioned correctly relative to one another, the teeth 146 of the inner collar 142 are positioned radially opposite (e.g., about 180 degrees apart) from the teeth 198 of the outer collar 144, which ensures that locking mechanisms of the first and second vacuum conduits can be properly engaged by the teeth 146, 198.

With reference to FIGS. 5 and 6, to couple the inner collar 142 to the outer collar 144, the outer collar 144 is rotated or positioned so that the alignment ribs 211 of the outer collar 144 are circumferentially aligned between two of the alignment ribs 176 of the inner collar 142. That is, the outer collar 144 is positioned relative to the inner collar 142 (or vice-versa) such that the inner and outer collars 142, 144 are co-axial (e.g., the central axes 136, 137 coincide).

When the outer collar 144 and the inner collar 142 are arranged as described above, one of the locking fingers 202 of the outer collar 144 will be circumferentially aligned with the recesses 168 in the teeth 146 of the inner collar 142. The outer collar 144 can then be moved along the central axis 136 toward the inner collar 142 such that the second end 156 of the inner collar 142 is positioned within the outer collar 144. That is, the outer collar 144 is moved relative to the inner collar 142 such that the inner collar 142 is received within the outer collar 144. As the second end 156 of the inner collar 142 is moved further within the outer collar 144, one of the locking fingers 202 slides or passes through the recesses 168 of the teeth 146 (i.e., between the first and second portions 164, 166 of the teeth 146) and all of the locking fingers move toward the recessed portions 172 in the first and second circumferential ribs 178, 180 of the inner collar 142.

The locking fingers 202 will engage the recessed portions 172 of the first circumferential ribs 178 as inner collar 142 and the outer collar 144 are moved towards one another. Further movement of the second end 156 of the inner collar 142 within the outer collar 144 will cause the locking fingers 202 to deflect radially outward (i.e., away from the central axis 136), thereby allowing the locking fingers 202 to slide over the recessed portions 172 of the first circumferential rib 178 of the inner collar 142. After the locking fingers 202 slide over the recessed portions 172 of the first circumferential rib 178, the locking fingers 202 return to their undeformed positions, and the second, free end 206 of each locking finger 202 engages the corresponding engagement surface 182 of the first circumferential rib 178. Engagement of the locking fingers 202 with the engagement surfaces 182 secures the outer collar 144 to the inner collar 142, thereby coupling the outer collar 144 to the inner collar 142 and forming the vacuum conduit connector 135 and the attachment tool 111.

When the outer collar 144 is coupled to the inner collar 142, the crushing portions 216 of the crushing ribs 212 of the outer collar 144 engage the first and second circumferential ribs 178, 180 of the inner collar 142, thereby preventing movement (e.g., wobbling or vibration) between the outer collar 144 and the inner collar 142 due to, for example, differences between innermost diameters of the rigid portions 214 of the outer collar 144 and outermost diameters of the first and second circumferential ribs 178, 180 of the inner collar 142. Additionally, when the outer collar 144 is coupled to the inner collar 142, the sealing surface 200 of the outer collar 144 engages the crushing portions 188 of the sealing surface 186 of the protrusion 184 of the inner collar 142, thereby forming a press-fit hermetic seal between the inner collar 142 and the outer collar 144 and sealing the flow path within the hollow body 122 and the attachment tool 111. That is, after the outer collar 144 is coupled to the inner collar 142, the outer collar 144 forms a press-fit connection with the inner collar 142 that hermetically seals the flow path within the hollow body 122 and the attachment tool 11.

When coupling a vacuum hose or conduit to the attachment tool 111 (and similarly to attachment tool 106), the second end 109 of the attachment tool 111 and the vacuum hose or conduit are moved towards one another, and the vacuum hose or conduit is received within and forms a press-fit or friction-fit connection with the inner collar 142 or the outer collar 144. As the vacuum hose or conduit is received within the inner collar 142 or the outer collar 144, a locking mechanism of the corresponding vacuum hose or conduit (if present) engages the teeth 146 of the inner collar 142 or the teeth 198 of the outer collar 144.

Figure 13:
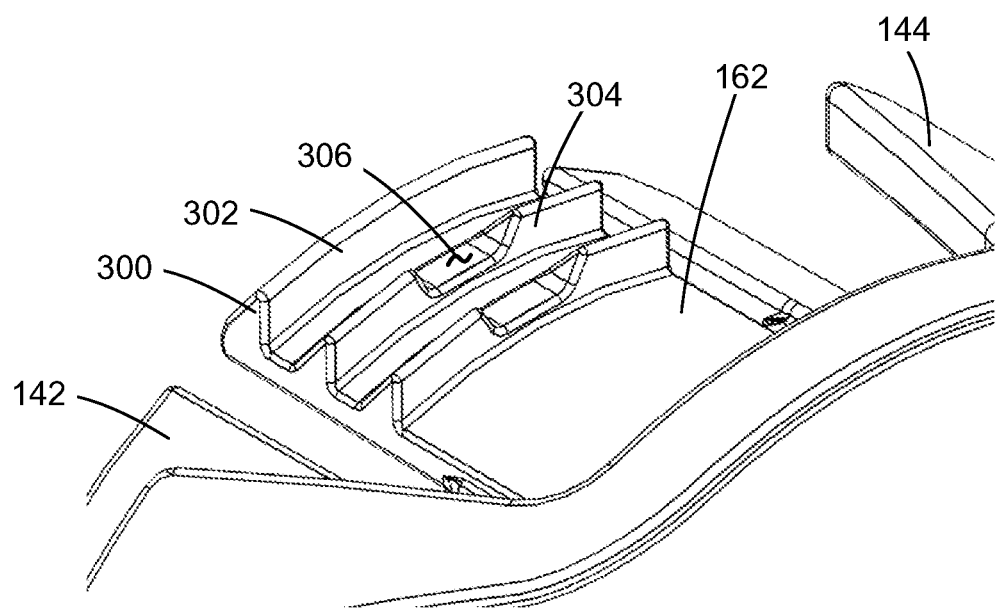
FIG. 13 is a perspective view of teeth positioned on the inner collar of the attachment tool shown in FIG. 3.

FIG. 13 illustrates another example configuration of teeth 300 that may be implemented on the inner collar 142. The teeth 300 are similar to the teeth 146, and are positioned on the deflectable tab 162 of the inner collar 142. In the illustrated embodiment, the teeth 300 include one continuous tooth 302 and two teeth 304 that each include a recessed portion 306. The vacuum conduit connector 135 that includes teeth 300 includes other similar components (e.g., the outer collar 144 and the inner collar 142, with the exception of teeth 300 replacing teeth 146) and functions similarly to the vacuum conduit connector 135 that includes teeth 146. The locking mechanism 222 shown in FIG. 25 may be engaged and disengaged by teeth 300 using similar process described herein with respect to teeth 146.

Figure 14:
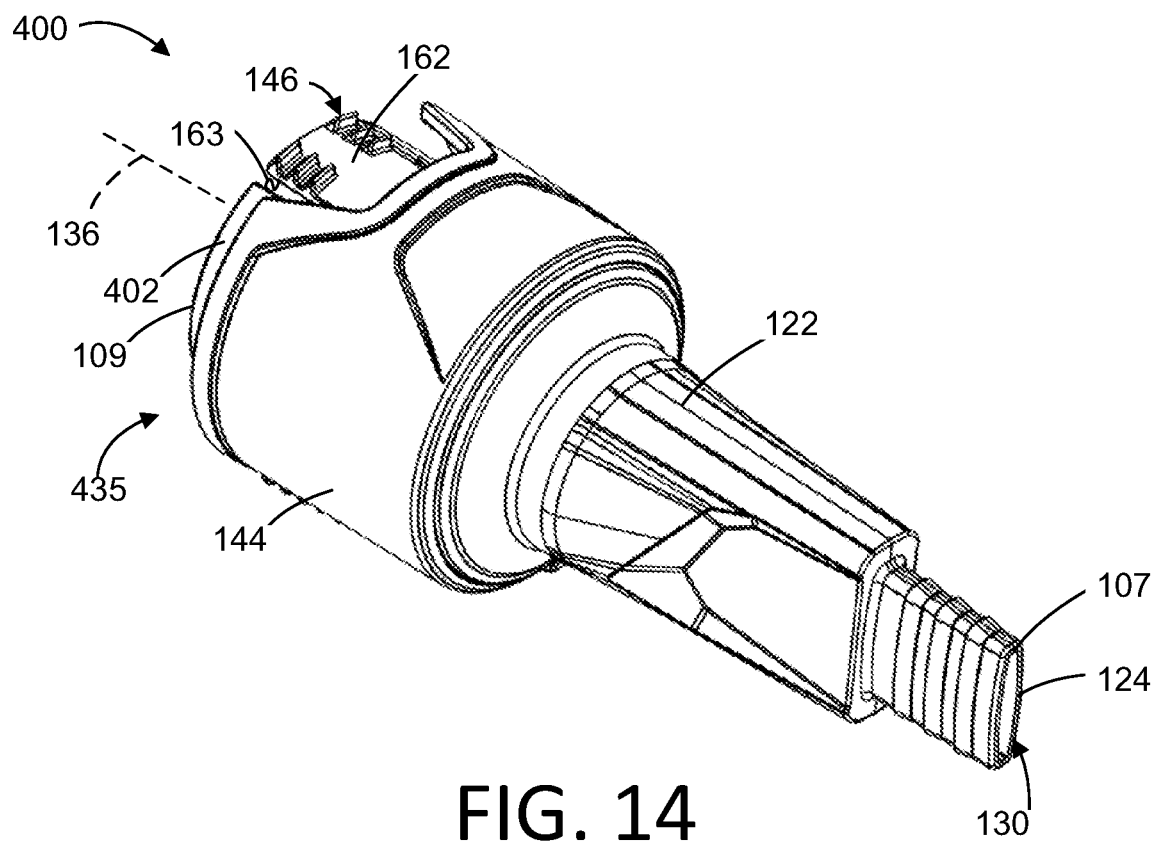
FIG. 14 is a perspective view of another attachment tool that includes another example vacuum conduit connector.
Figure 15:
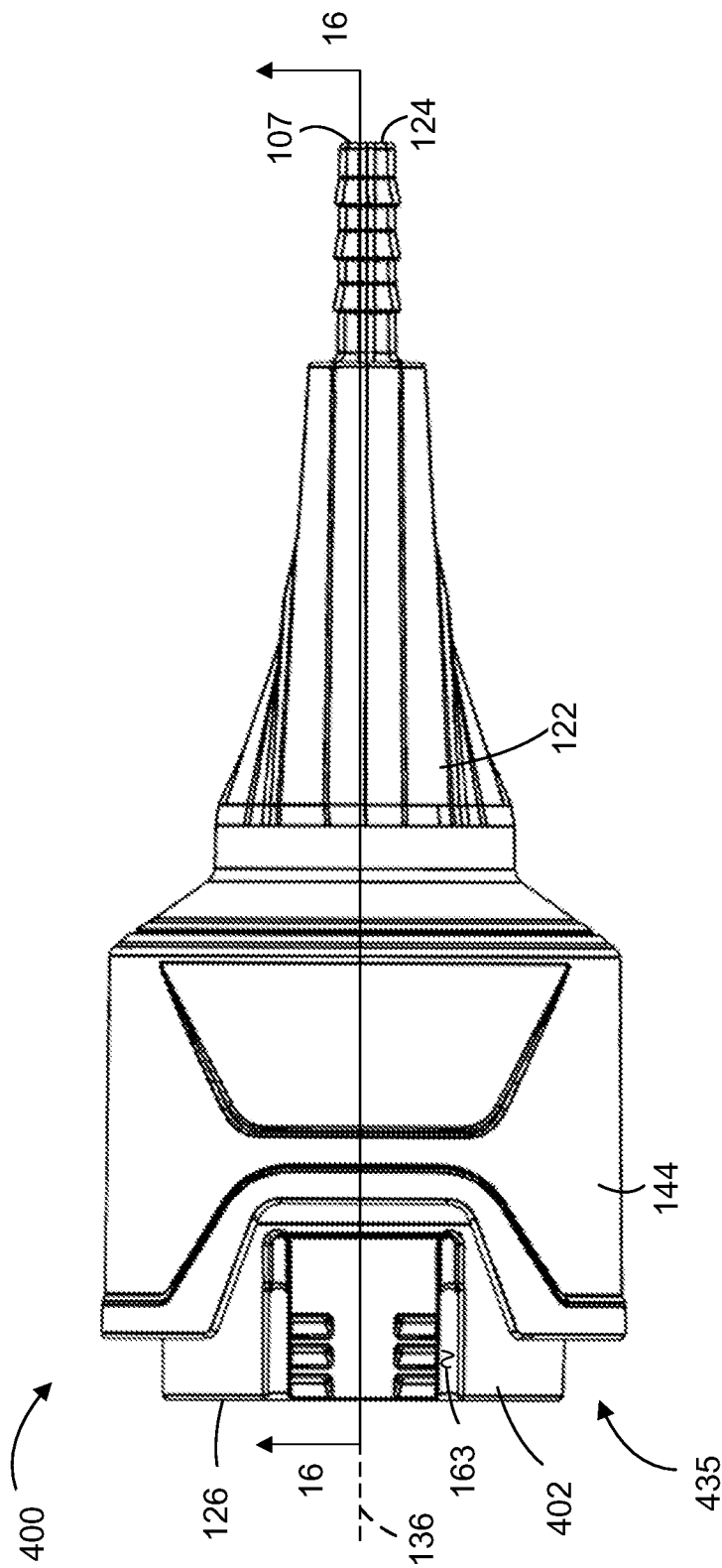
FIG. 15 is a top view of the attachment tool shown in FIG. 14.
Figure 16:
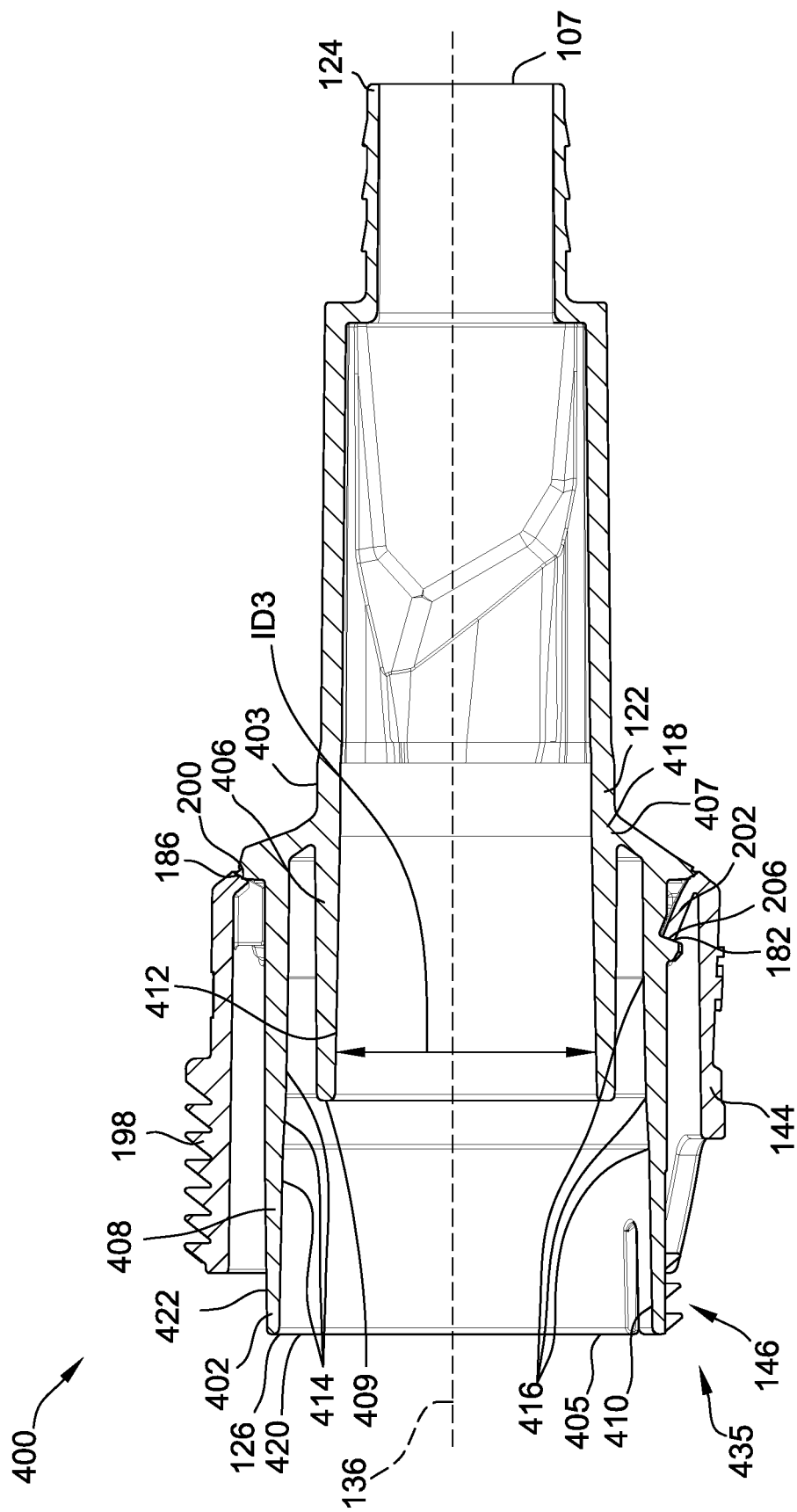
FIG. 16 is sectional view of the attachment tool of FIG. 15, taken along line 16-16.
Figure 17:
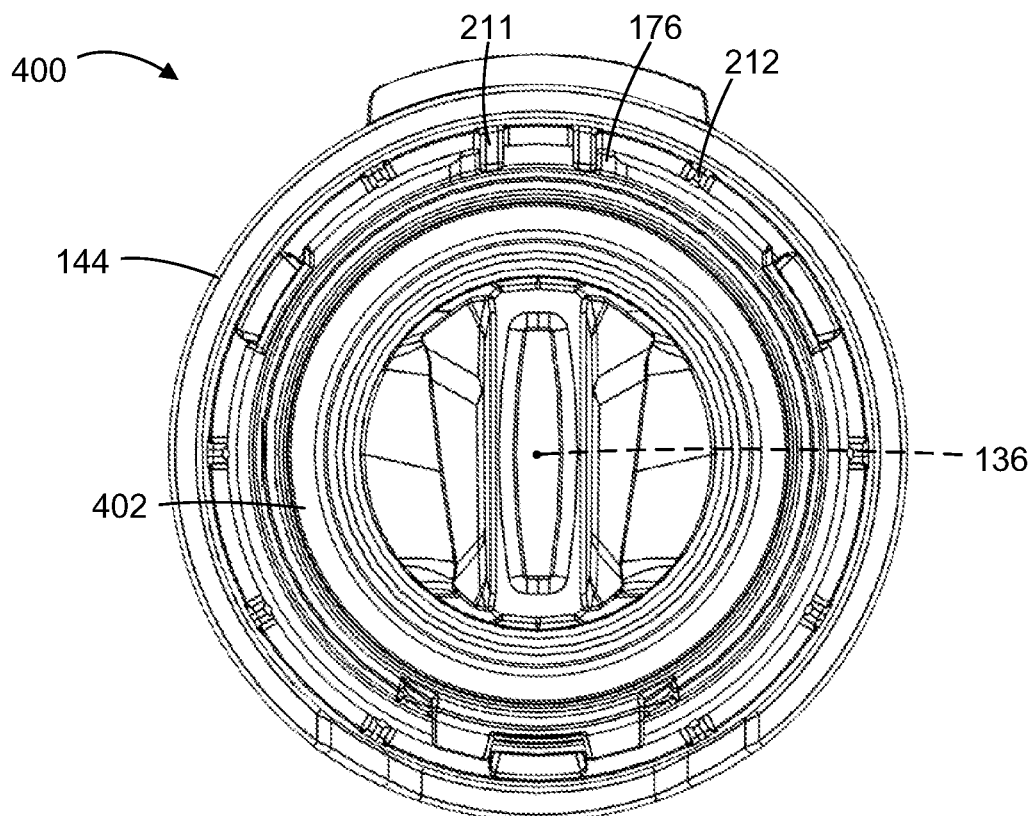
FIG. 17 is a rear view of the attachment tool shown in FIG. 14.
Figure 18:
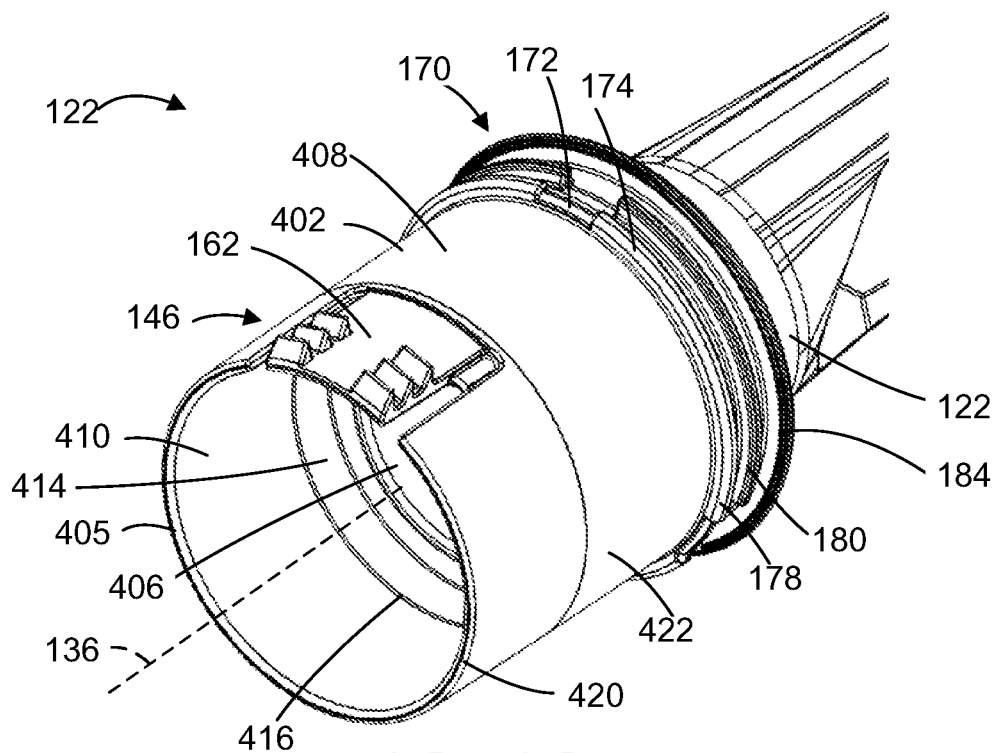
FIG. 18 is a perspective view of an example hollow body of the attachment tool shown in FIG. 14.

FIG. 14 is a perspective view of another attachment tool 400 that includes another example vacuum conduit connector 435. FIG. 15 is a top view of the attachment tool 400 shown in FIG. 14, FIG. 16 is sectional view of the attachment tool 400 of FIG. 15, taken along line 16-16, FIG. 17 is a rear view of the attachment tool 400 shown in FIG. 14, and FIG. 18 is a perspective view of an example hollow body 122 of the attachment tool 400 shown in FIG. 14. The attachment tool 400 illustrated in FIGS. 14-18 is a flexible crevice tool. However, the vacuum conduit connector 435 may be implemented on vacuum attachment tools other than crevice tools including, for example and without limitation, the vacuum attachment tools shown and/or described herein.

The vacuum conduit connector 435 is similar to the vacuum conduit connector 135 described herein, except as otherwise described below. Components of the vacuum conduit connector 435 include identical numbering to components of the vacuum conduit connector 135 that are similar, with different components (e.g., inner cuff 406 and outer cuff 408) including different reference numbers.

The vacuum conduit connector 435 is operable to receive vacuum hoses or conduits of three different diameters. In some embodiments, for example, the attachment tool 400 that includes the vacuum conduit connector 435 is operable to receive vacuum hoses or conduits having the first and second diameters, similar to the vacuum conduit connector 135, and can also receive a third vacuum hose or conduit having a third diameter, smaller than the first diameter.

With reference to FIGS. 14-18, the attachment tool 400 includes the hollow body 122 and the vacuum conduit connector 435 disposed near the second end 109 of the hollow body 122. The vacuum conduit connector 435 includes an inner collar 402 and an outer collar 144. The inner collar 402 is formed as part of the hollow body 122 in the illustrated embodiment, and extends from a first end 403 to a second end 405. The inner collar 402 includes an inner cuff 406 and an outer cuff 408. In the illustrated embodiment, the outer cuff 408 and the inner cuff 406 are generally cylindrical about the central axis 136, and the inner cuff 406 is concentric with and positioned within the outer cuff 408.

The outer cuff 408 has an inner diameter that is similar to the inner diameter ID1 of the inner collar 142. More specifically, the outer cuff 408 includes a radial inner surface 410 with a diameter that is similar to the diameter ID1 of the inner surface 150 of the inner collar 142 of the vacuum conduit connector 135. That is, the inner diameter of the outer cuff 408 is sized to receive the vacuum hose or conduit having the first diameter.

In the illustrated embodiment, the inner surface 410 tapers radially inward, towards the central axis 136 (similar to inner surface 150 of the inner collar 142), over at least one tapered portion 414 between the second end 405 of the inner collar 402 and the first end 403 of the inner collar 402. The at least one tapered portion 414 of the inner surface 410 facilitates enhanced connection between a vacuum hose or conduit and the inner surface 410. That is, the diameter of the inner surface 410 generally decreases between the second end 405 of the inner collar 402 and the first end 403 of the inner collar 402. In the example embodiment, the inner surface 410 includes three tapered portions 414 that each include a different taper angle (similar to angle α) of between 0 degrees and 10 degrees with respect to the central axis 136. However, in other embodiments, the inner surface 410 may include any suitable number of tapered portions 414 (including no tapered portions), may be continuously tapered, or have any other suitable configuration that enables the attachment tool 400 to function as described herein. The at least one tapered portion 414 facilitates forming a press-fit connection between the inner surface 410 of the outer cuff 408 and an outer surface of the vacuum hose or conduit. The at least one tapered portion 414 also functions as a tapered stopper that helps to inhibit the vacuum hose or conduit from being over inserted within the outer cuff 408.

The inner surface 410 also includes at least one taper transition portion 416 (e.g., similar to taper transition portion 160) that separates the tapered portions 414 from each other, or that separates the tapered portions 414 from a non-tapered portion (e.g., a portion with no radial taper relative to the central axis 136). The at least one taper transition portion 416 provide a fillet or smooth transition between the tapered portions 414. In some embodiments, the at least one taper transition portion 416 functions as a tapered stopper that helps to inhibit insertion of a vacuum hose or conduit into the inner cuff 406 beyond the location of the at least one taper transition portion 416, which prevents the vacuum hose or conduit from being over inserted within the inner cuff 406. In the illustrated embodiment, the inner surface 410 includes three taper transition portions 416. However, in other embodiments, the inner surface 410 may include any suitable number of taper transition portions 416 that enables the attachment tool 400 to function as described herein.

The outer cuff 408 extends from the a first end 418 to a second end 420. The first end 418 of the outer cuff 408 is joined to the inner cuff 406, and extends radially outward therefrom. The outer cuff 408 includes a radial outer surface 422 that is similar to the outer surface 152 of the inner collar 142 of the vacuum conduit connector 135. That is, the outer surface 422 of the outer cuff 408 includes a deflectable tab 162, first and second circumferential ribs 178, 180, alignment ribs 176 (not labeled in FIGS. 14-18) and protrusion 184, as described above with reference to FIGS. 3-13. Further, the deflectable tab 162 includes teeth 146 as described above with reference to FIGS. 3-13.

The inner cuff 406 extends from a first end 407 to a second end 409, and includes an inner diameter ID3 sized to receive the third vacuum conduit having a third diameter smaller than the first diameter. More specifically, the inner cuff 406 includes a radial inner surface 412 having the diameter ID3 that is smaller than the inner diameter of the outer cuff 408 and that is sized to receive the vacuum hose or conduit having the third diameter. In the illustrated embodiment, the diameter ID3 of the inner surface 412 is sized to receive a vacuum hose or conduit with a diameter of about 1¼", which is a standard or nominal diameter that generally refers to an outer diameter of the vacuum hose or conduit. In other embodiments, the inner surface 412 may have any suitable diameter ID3 that enables the attachment tool 400 to function as described herein.

In the illustrated embodiment, the inner surface 412 tapers radially inward, towards the central axis 136, from the second end 409 of the inner cuff 406 and the first end 407 of the inner cuff 406 (similar to inner surface 194 of outer collar 144). In the example embodiment, the inner surface 412 tapers radially inward at an angle (similar to angle α) of between 0 degrees and 10 degrees relative to the central axis 136. That is, the diameter ID3 of the inner surface 412 generally decreases between the second end 409 of the inner cuff 406 and the first end 407 of the inner cuff 406. The radial taper of the inner surface 412 facilitates enhanced connection between a vacuum hose or conduit and the inner surface 412. In other embodiments, the diameter ID3 of the inner surface 412 of the inner cuff 406 may include any suitable taper (including an outward taper, away from the central axis 136) between the second end 409 and the first end 407 of the inner cuff 406 that enables the attachment tool 400 to function as described herein. In some embodiments, the inner surface 412 may also include tapered portions and taper transition portions similar to tapered portions 414 and taper transition portions 416, respectively, of the outer cuff 408.

The outer collar 144 is coupled to the inner collar 402 using the same or similar process described above with reference to the vacuum conduit connector 135. However, when coupling the outer collar 144 to the inner collar 402, the outer collar 144 is coupled to the outer cuff 408 of the inner collar 402, as the outer cuff 408 of the inner collar 402 includes the same or similar features as the inner collar 142 of the vacuum conduit connector 135 (e.g., first and second circumferential ribs 178, 180, alignment ribs 176, etc.) that enable the outer collar 144 to be coupled to the inner collar 402 via the outer cuff 408 via the snapping connection process described herein with respect to the vacuum conduit connector 135.

Figure 25:
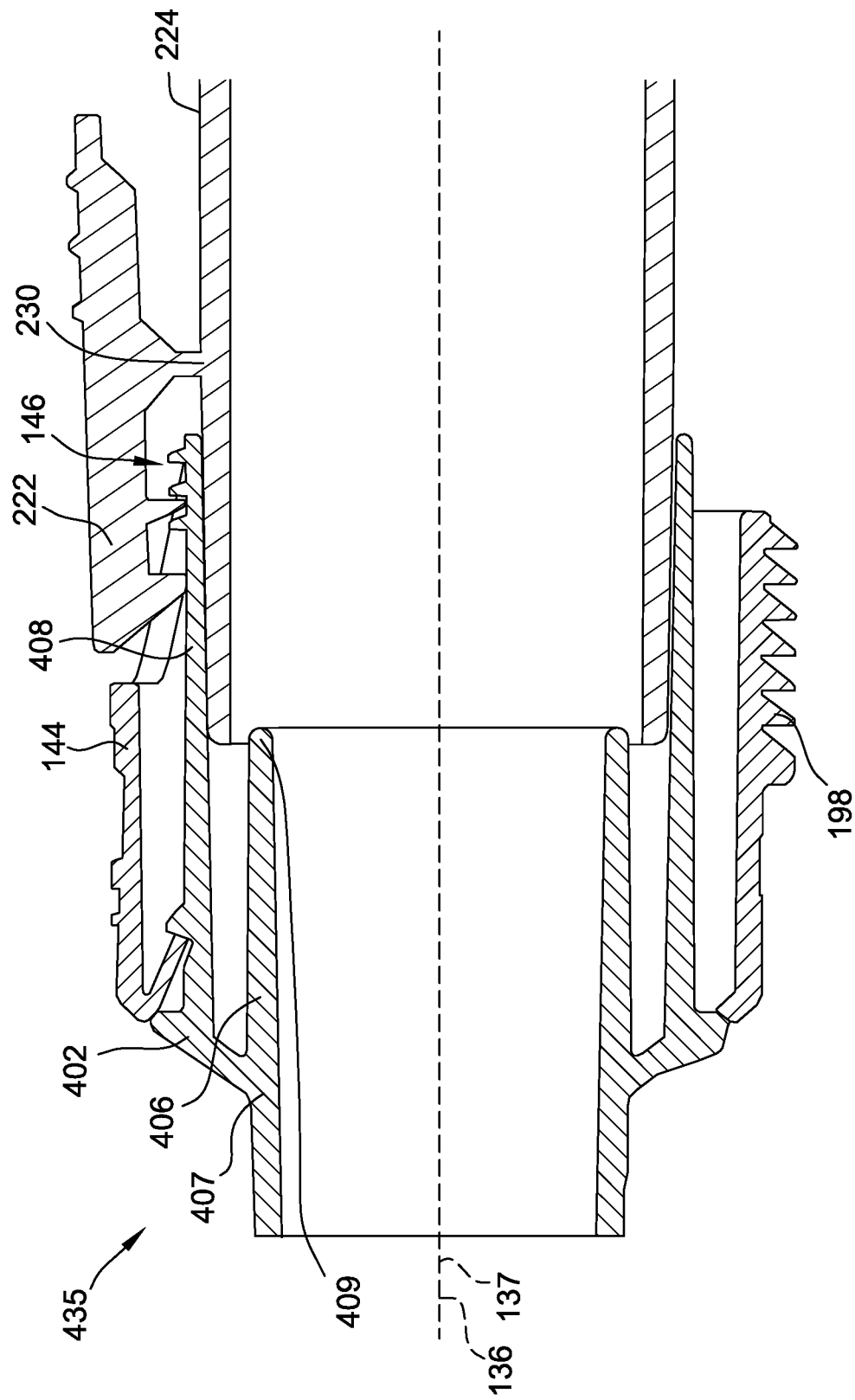
FIG. 25 is a sectional view of the attachment tool shown in FIG. 15, taken along line 16-16, illustrating engagement of teeth of the inner collar of the attachment tool with a locking mechanism of a vacuum hose or conduit.
Figure 26:
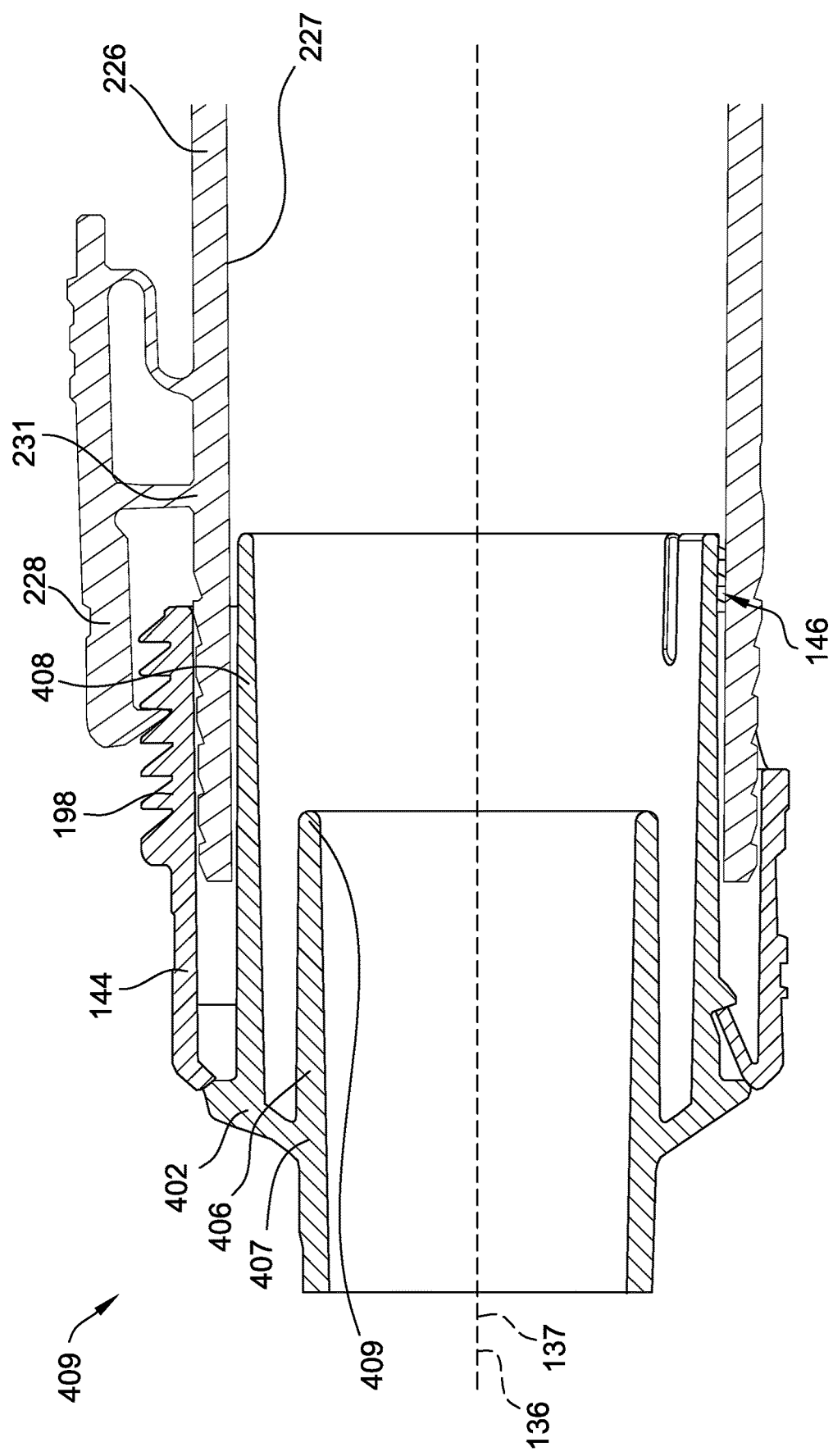
FIG. 26 is a sectional view of the attachment tool shown in FIG. 15, taken along line 16-16, illustrating engagement of teeth of the outer collar of the attachment tool with a locking mechanism of a vacuum hose or conduit.

FIG. 25 illustrates a vacuum hose or conduit 224 connected to the vacuum conduit connector 435, and shows an example of engagement between teeth 146 and a locking mechanism 222 of the vacuum hose or conduit 224. FIG. 26 illustrates the connection of a vacuum hose or conduit 226 to the vacuum conduit connector 435, and shows an example of engagement between (i) teeth 198 and a locking mechanism 228 of the vacuum hose or conduit 226.

Figure 27:
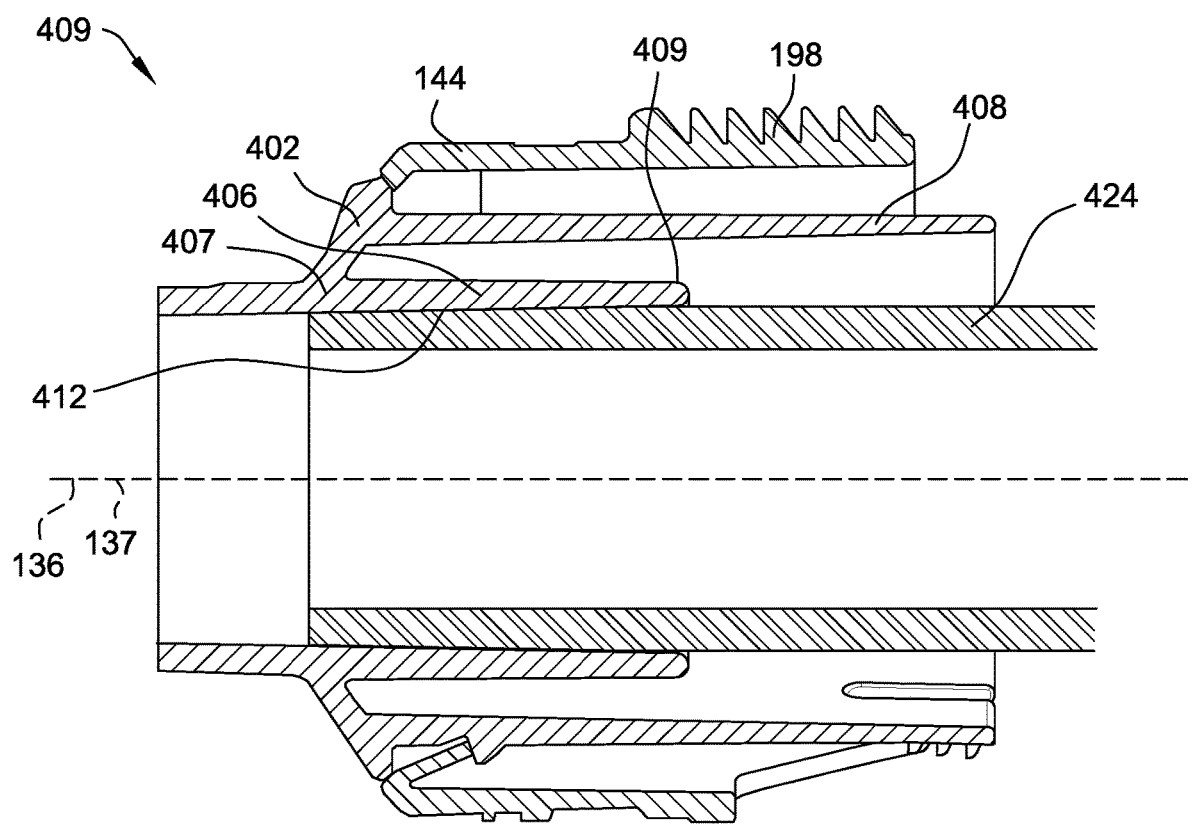
FIG. 27 is a sectional view of the attachment tool shown in FIG. 15, taken along line 16-16, illustrating connection between a vacuum hose or conduit and the attachment tool.

Vacuum conduits and hoses are coupled to attachment tools (e.g., attachment tools 400, 111, 400) including the vacuum conduit connector 435 using a process similar to that described herein for attachment tools including the vacuum conduit connector 135. Specifically, as shown in FIG. 26, the vacuum hose or conduit 226 is coupled to the outer cuff 408 of the inner collar 402 using a similar process described above with respect to coupling vacuum hoses or conduits to inner collar 142. Further, as shown in FIG. 25, the vacuum hose or conduit 224 is coupled to the outer collar 144 using a similar process described above with respect to the outer collar 144 of the vacuum conduit connector 135. As shown in FIG. 27, a vacuum hose or conduit 424 is coupled to the inner cuff 406 of the inner collar 402 by inserting the vacuum hose or conduit 424 within the inner cuff 406 to form a press-fit or friction-fit interface between the vacuum hose or conduit 424 and the inner surface 412 of the inner cuff 406.

The vacuum hose or conduit 224, 226 can be detached or uncoupled from an attachment tool (e.g., attachment tool 106, 111, 400) by disengaging a locking mechanism of the vacuum hose or conduit 224, 226 from the attachment tool and moving the attachment tool and the vacuum hose or conduit away from one another. For example, if the vacuum hose or conduit 224 is coupled to the attachment tool 400 such that the locking mechanism 222 engages the teeth 146 on the inner collar 142 (e.g., as shown in FIG. 25), then the deflectable tab 162 of the inner collar 142 may be deflected radially inward (i.e., toward the central axis 136) in order to disengage the teeth 146 from the locking mechanism 222. The slots 163 between the deflectable tab 162 and the inner collar 142 facilitate deflection of the deflectable tab 162.

Further, if the vacuum hose or conduit 226 is coupled to the attachment tool (e.g., attachment tool 106, 111, 400) such that the locking mechanism 228 engages the teeth 198 on the outer collar 144 (e.g., as shown in FIG. 26), then the attachment tool may be rotated relative to the vacuum hose or conduit 226, or vice versa, until the locking mechanism 228 disengages the teeth 198. Further, with the embodiments of the locking mechanisms 222, 228 shown in FIGS. 25 and 26, the locking mechanism 222, 228 may be pivoted about a pivot point 230, 231, respectively, to disengage the locking mechanism 222, 228 from the teeth 146, 198, respectively, thereby allowing removal of the vacuum hose or conduit 224, 226 from the attachment tool. If the vacuum hose or conduit 424 is connected to the inner cuff 406 via a press-fit or friction-fit connection with the inner surface 412, the vacuum hose or conduit 424 can be removed from the vacuum conduit connector 435 by pulling the vacuum hose or conduit 424 out of the inner cuff 406 of the vacuum conduit connector 435.

Figure 19:
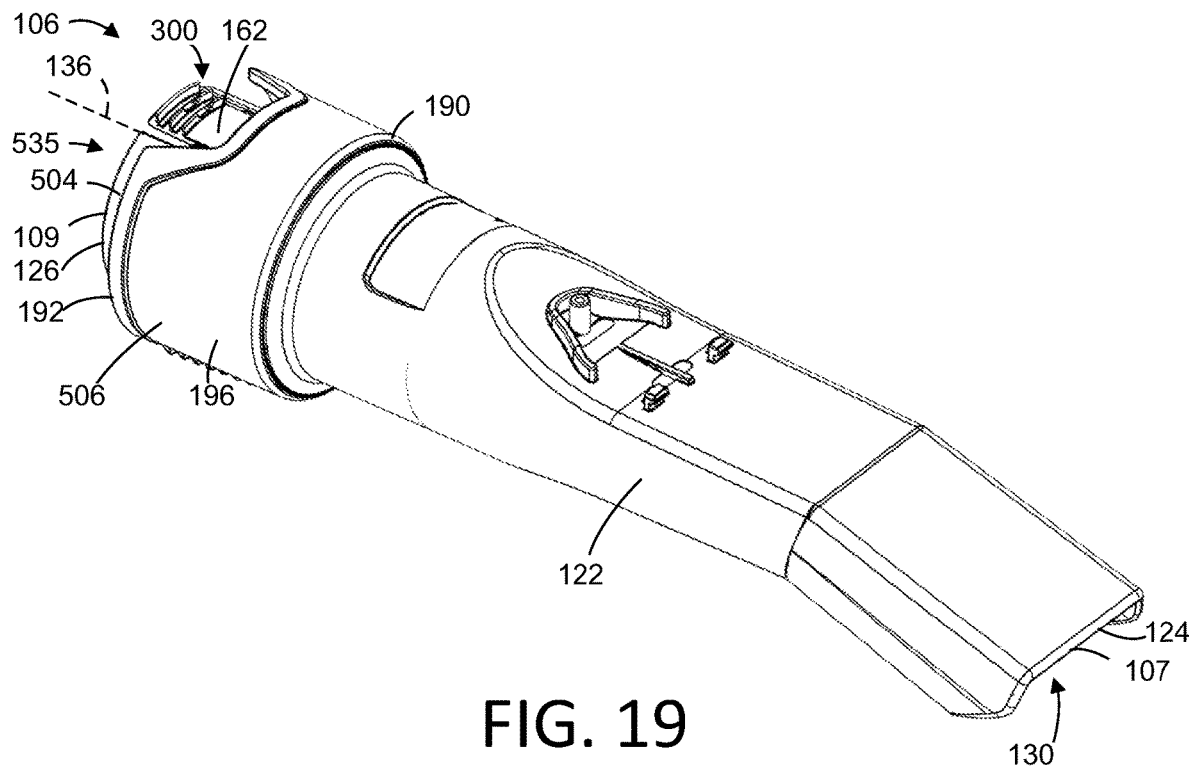
FIG. 19 is a perspective view of a portion of the attachment tool of FIG. 2.
Figure 20:
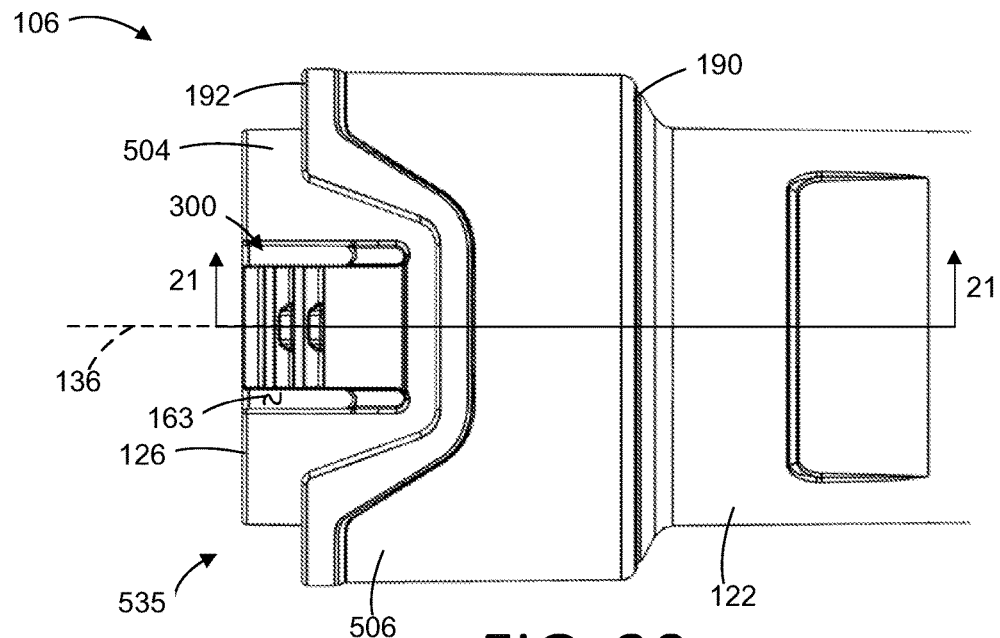
FIG. 20 is a top view of the portion of the attachment tool shown in FIG. 19.
Figure 21:
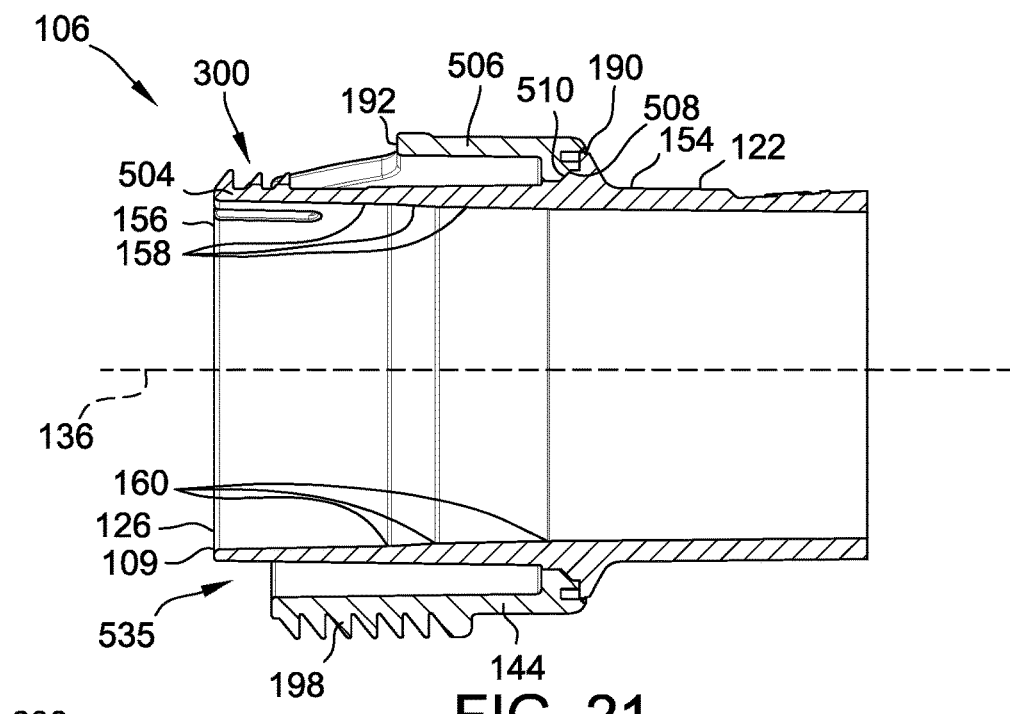
FIG. 21 is sectional view of the portion of the attachment tool of FIG. 20, taken along line 21-21.

FIGS. 19 and 20 illustrate perspective and front views, respectively, of a portion of the attachment tool 106 shown in FIG. 2 with the vacuum conduit connector 535. FIG. 21 is sectional view of the attachment tool 106 of FIG. 20, taken along line 21-21. The vacuum conduit connector 535 may be implemented on attachment tools other than the attachment tool 106, including, for example and without limitation, the vacuum attachment tools shown and/or described herein.

The vacuum conduit connector 535 is similar to the vacuum conduit connector 135 described herein, except as otherwise described below. Components of the vacuum conduit connector 535 include identical numbering to similar components of the vacuum conduit connector 135, with different components (e.g., first and second weld portions 508, 510) including different reference numbers.

With reference to FIGS. 19-21, the vacuum conduit connector 535 includes an inner collar 504 and an outer collar 506. The inner collar 504 is similar to the inner collar 142, except the inner collar 504 does not include a plurality of ribs 170 on the outer surface 152, and includes a first weld portion 508 on the outer surface 152. The outer collar 506 is similar to the outer collar 144, except the outer collar 506 does not include the plurality of ribs 208 on the inner surface 194, and includes a second weld portion 510 on the inner surface 194.

The deflectable tab 162 of the inner collar 504 includes teeth 300 described herein. However, in other embodiments, the inner collar 504 may include teeth 146 described herein or any other suitable configuration of teeth that enables the attachment tool 106 to function as described herein.

The inner collar 504 and the outer collar 506 may also include inner surfaces 150 and 194 respectively, that are tapered. Specifically, the inner surface 150 of the inner collar 504 may include tapered portions 158 and taper transition portions 160 similar to inner collar 142, and the inner surface 194 of outer collar 506 may be tapered similar to outer collar 144.

In this embodiment, the outer collar 506 of the vacuum conduit connector 535 is coupled to the inner collar 504 of the vacuum conduit connector 535 via spin welding. Specifically, when coupling the outer collar 506 to the inner collar 504 via spin welding, the outer collar 506 is spun relative to the inner collar 504, with portions (e.g., weld portions 508, 510) of the inner collar 504 and the outer collar 506 in contact with each other. The heat generated between the inner collar 504 and the outer collar 506 during the spin welding process welds the outer collar 506 to the inner collar 504. The first weld portion 508 includes surfaces of the inner collar 504 that contact the outer collar 506 during the spin weld process, and the second weld portion 510 includes surfaces of the outer collar 506 that contact the inner collar 504 during the spin weld process.

When coupling the outer collar 506 to the inner collar 504, the outer collar 506 is positioned around the inner collar 504, with the first and second weld portions 508, 510 in contact with each other. The outer collar is then rotated about the central axis 136 relative to the inner collar 504, which generates heat between the inner collar 504 and the outer collar 506. The generated heat melts parts of the first and second weld portions 508, 510, and the melted parts of the first and second weld portions 508, 510 mix together. As the melted portions (i.e., the first and second weld portions 508, 510) cool, the melted portions fuse together, thereby coupling the outer collar 506 to the inner collar 504.

Vacuum conduits and hoses are coupled to attachment tools 106 including the vacuum conduit connector 535 using the same or similar processes described herein with reference to the attachment tool 111 including the vacuum conduit connector 135.

Figure 22:
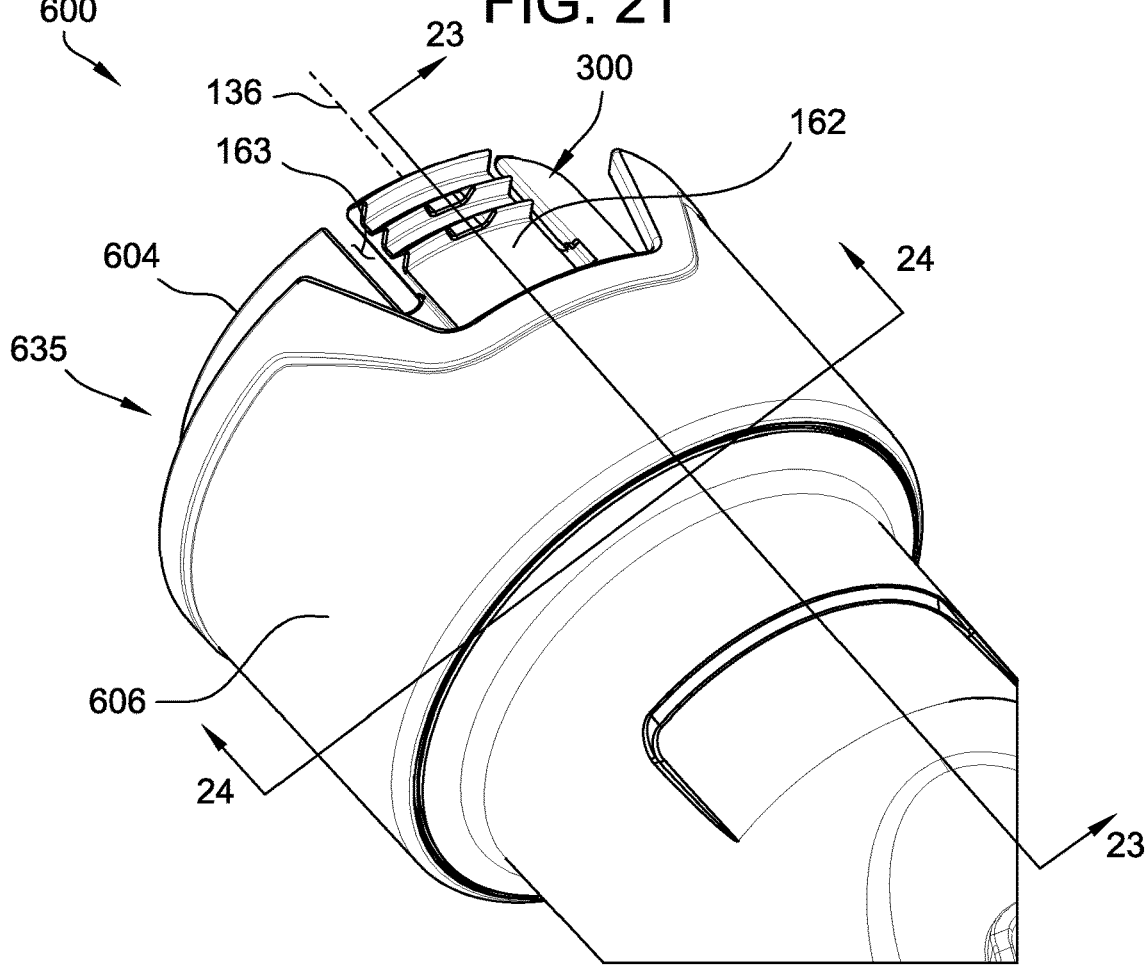
FIG. 22 is a perspective view of another example attachment tool that includes another example vacuum conduit connector.
Figure 23:
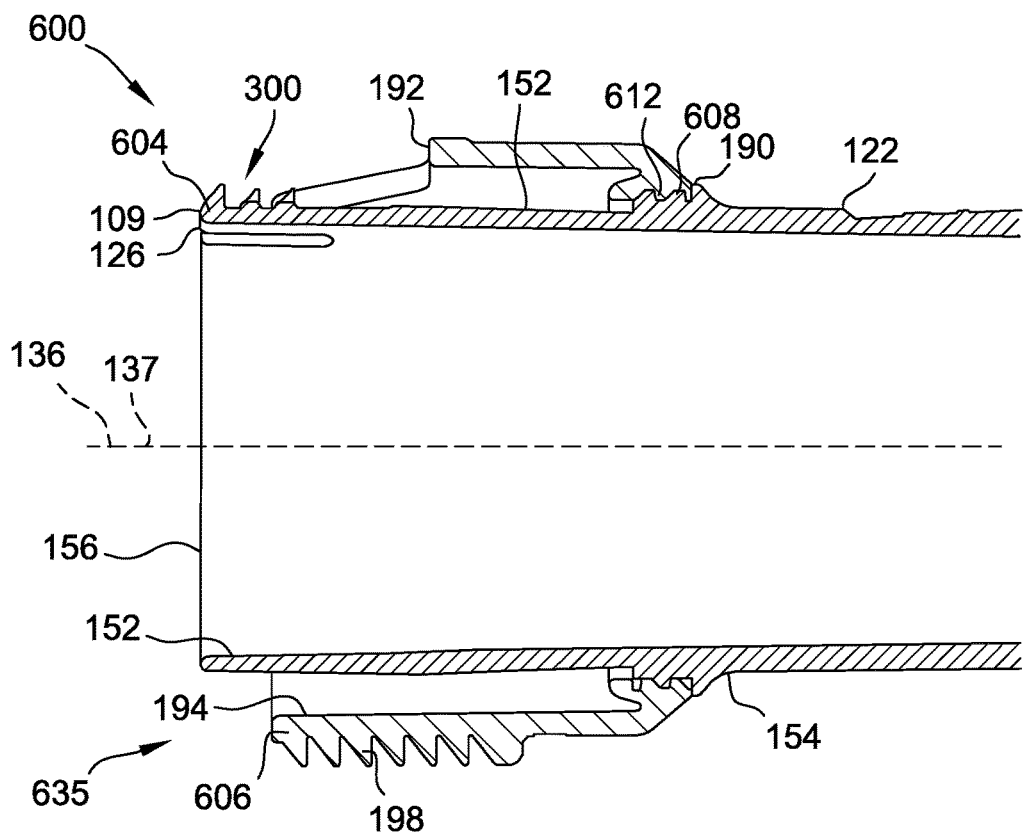
FIG. 23 is a sectional view of the attachment tool of FIG. 22, taken along line 23-23.
Figure 24:
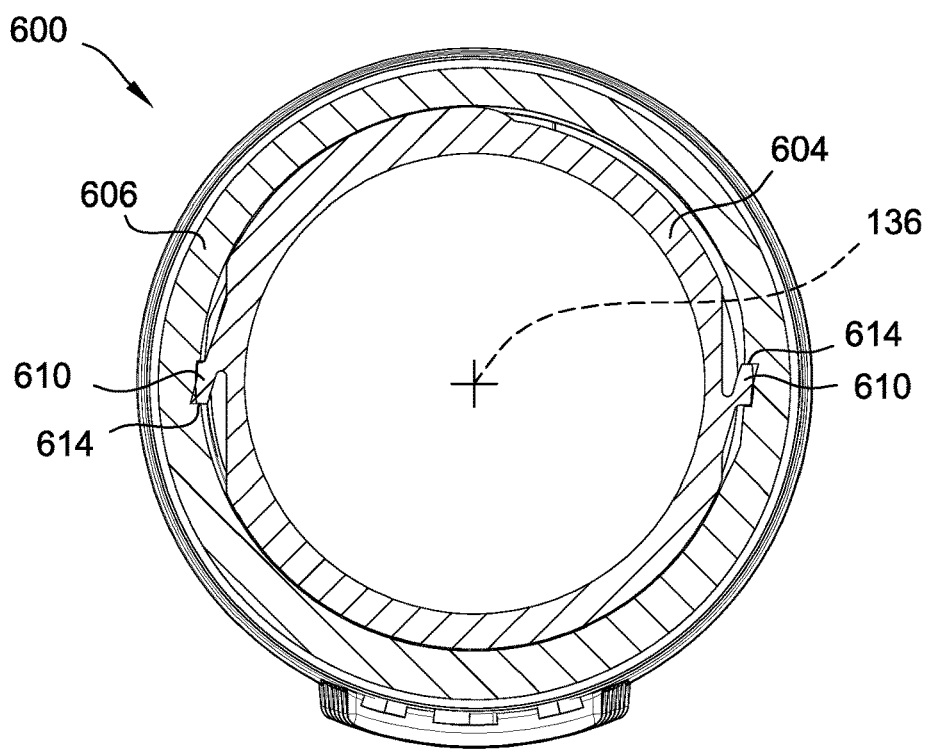
FIG. 24 is a sectional view of the attachment tool of FIG. 22, taken along line 24-24.

FIGS. 22 and 24 are perspective and rear views, respectively, of another example vacuum attachment tool 600 with another example vacuum conduit connector 635. FIG. 23 is sectional view of the attachment tool 600 of FIG. 22, taken along line 23-23. Although the vacuum conduit connector 635 is illustrated as part of attachment tool 600 in FIGS. 22-24, the vacuum conduit connector 635 may be implemented on other attachment tools including, for example and without limitation, the vacuum attachment tools shown and/or described herein.

The vacuum conduit connector 635 is similar to the vacuum conduit connector 135 described herein, except as otherwise described below. Components of the vacuum conduit connector 635 include identical numbering to similar components of the vacuum conduit connector 135, with different components (e.g., at least one thread 608 of the inner collar 604 and at least one thread 612 of the outer collar 606) including different reference numbers.

With reference to FIGS. 22-24, the vacuum conduit connector 635 includes an inner collar 604 and an outer collar 606. The inner collar 604 is similar to the inner collar 142, except the inner collar 604 does not include a plurality of ribs 170 on the outer surface 152, and includes at least one thread 608 positioned on the outer surface 152. Additionally, a pair of anti-unthreading components 610 extend from the outer surface 152.

The outer collar 606 is similar to the outer collar 144, except the outer collar 606 does not include a plurality of ribs 208 on the inner surface 194, and includes at least one thread 612 positioned on the inner surface 194. The outer collar 606 also includes a pair of anti-unthreading engagement edges 614 on the inner surface 194. As described further herein, the anti-unthreading components 610 of the inner collar 604 are operable to engage the anti-unthreading engagement edges 614 of the outer collar 606 to prevent unthreading of the outer collar 606 from the inner collar 604, or vice-versa.

The deflectable tab 162 of the inner collar 604 includes teeth 300 described herein. However, in other embodiments, the inner collar 604 may include teeth 146 described herein or any other suitable configuration of teeth that enables the attachment tool 600 to function as described herein.

The inner collar 604 and the outer collar 606 may also include inner surfaces 150 and 194 respectively, that are tapered. Specifically, the inner surface 150 of the inner collar 604 may include tapered portions 158 and taper transition portions 160 similar to inner collar 142, and the inner surface 194 of outer collar 606 may be tapered similar to outer collar 144.

The at least one thread 612 of the outer collar 606 is operable to engage the at least one thread 608 of the inner collar 604. The anti-unthreading components 610 are operable to engage the anti-unthreading engagement edges 614 after the outer collar 606 is coupled to the inner collar 604 to restrict unthreading of the outer collar 606 from the inner collar 604. In the illustrated embodiment, the at least one thread 608 includes one continuous thread, and the at least one thread 612 includes one continuous thread. However, in other embodiments, the inner collar 604 and the outer collar 606 may each include any suitable number of threads 608, 612 that enables the attachment tool 600 to function as described herein.

The outer collar 606 is coupled to the inner collar 604 via engagement of the at least one thread 612 of the outer collar 606 with the at least one thread 608 of the inner collar 604. That is, when coupling the outer collar 606 to the inner collar 604, the outer collar 606 is positioned around the inner collar 604, with the at least one thread 612 of the outer collar 606 positioned near or in engagement with the at least one thread 608 of the inner collar 604. The outer collar 606 is then threaded onto the inner collar 604 by rotating the outer collar 606 relative to the inner collar 604, such that the at least one thread 612 of the outer collar 606 engages the at least one thread 608 of the inner collar 604. The outer collar 606 continues to be threaded onto the inner collar 604, until the anti-unthreading components 610 engage the anti-unthreading engagement edges 614, as shown in FIG. 24, thereby securing the outer collar 606 to the inner collar 604. That is, the at least one threads 608, 612 are operable to couple the outer collar 606 to the inner collar 604. Engagement of the anti-unthreading components 610 with the anti-unthreading engagement edges 614 restricts unthreading of the outer collar 606 from the inner collar 604, and helps to secure the outer collar 606 to the inner collar 604.

Vacuum conduits and hoses are coupled to and removed from attachment tools (e.g., attachment tool 600) including the vacuum conduit connector 635 using the same or similar processes and similar connections described herein for attachment tools 111 including the vacuum conduit connector 135.

Figure 29:
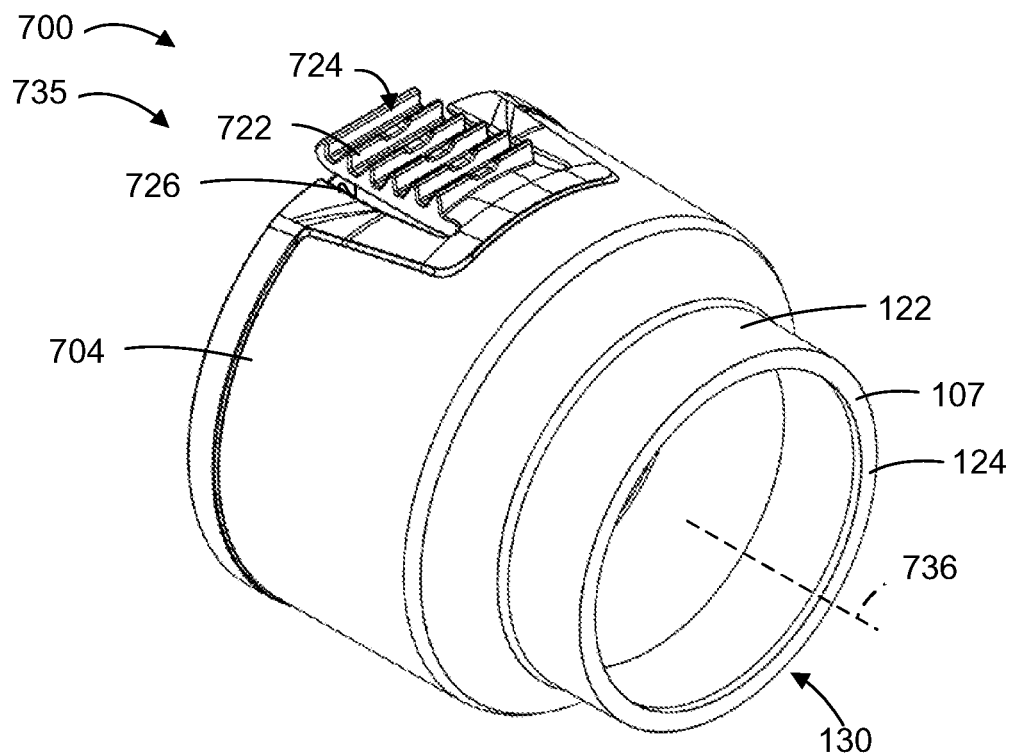
FIG. 29 is a perspective view of another example attachment tool that includes another example vacuum conduit connector.
Figure 30:
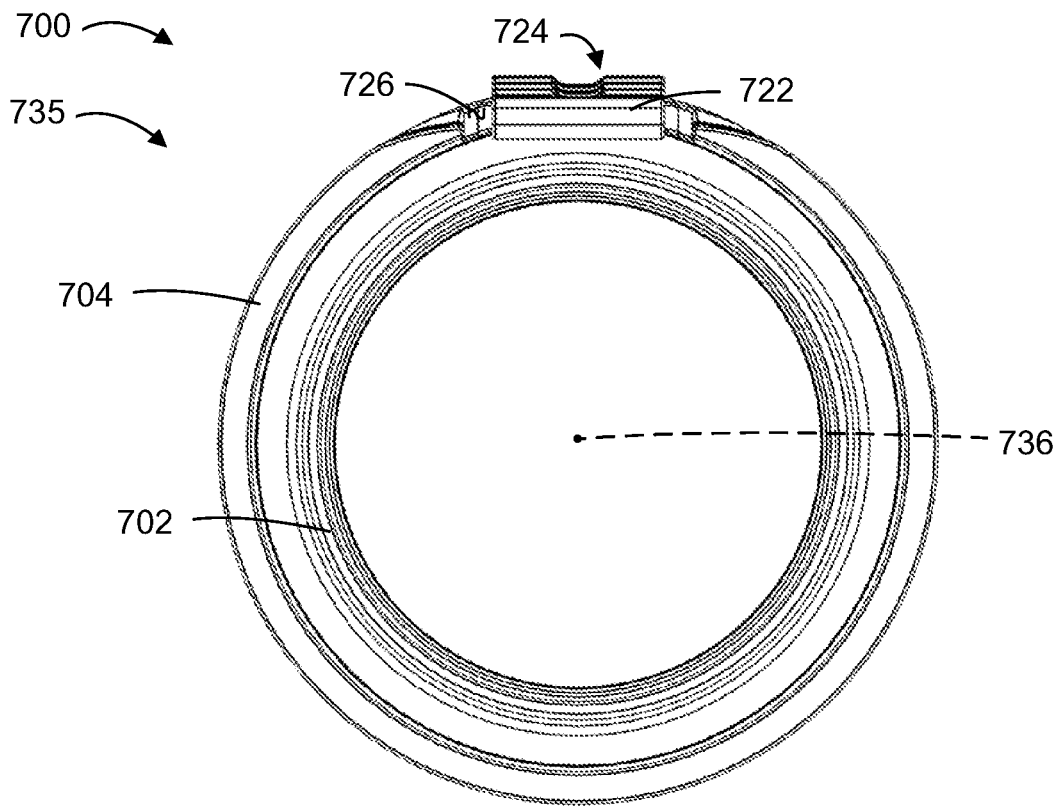
FIG. 30 is a front view of the attachment tool shown in FIG. 29.
Figure 31:
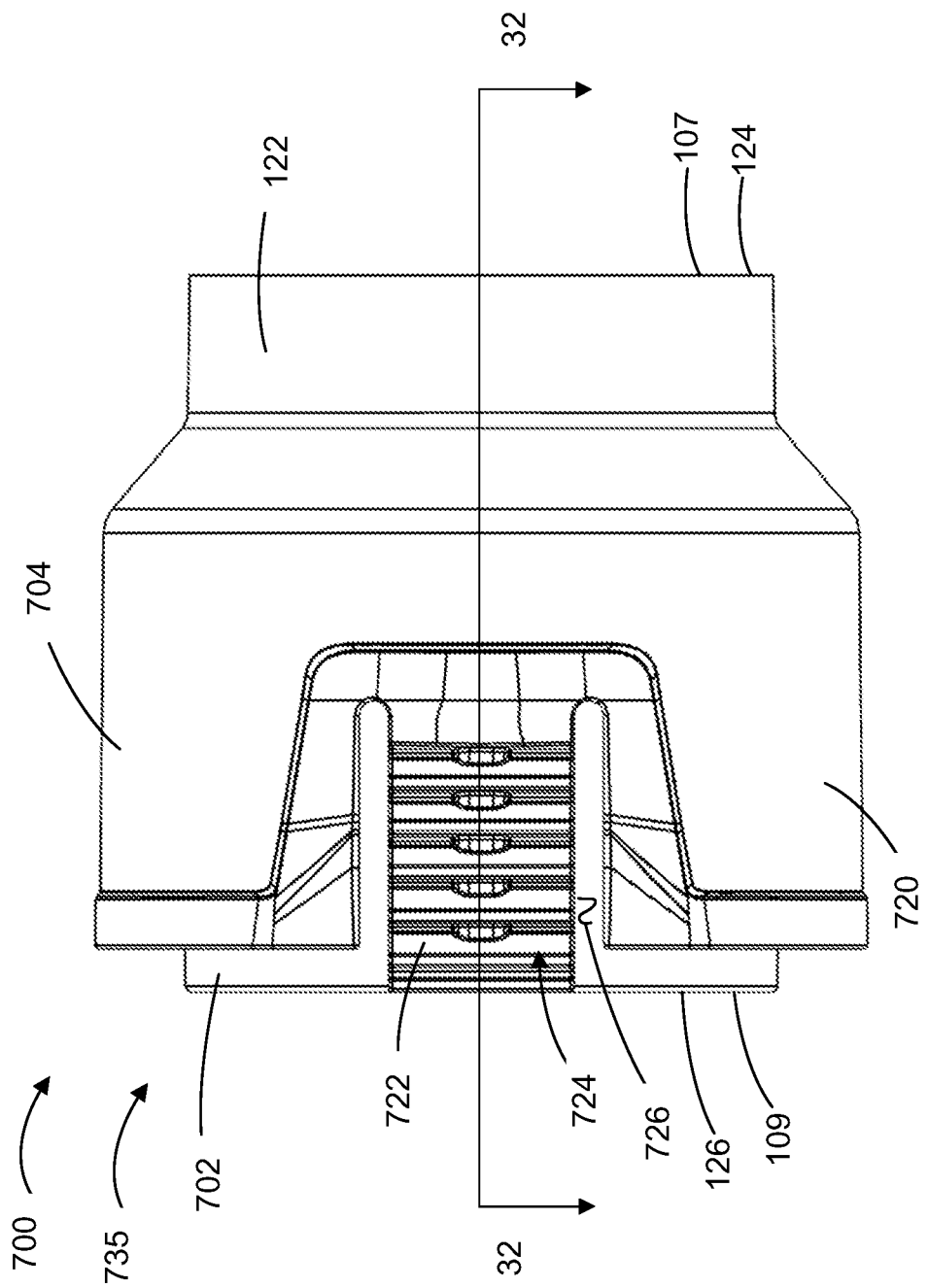
FIG. 31 is a top view of the attachment tool shown in FIG. 29.
Figure 32:
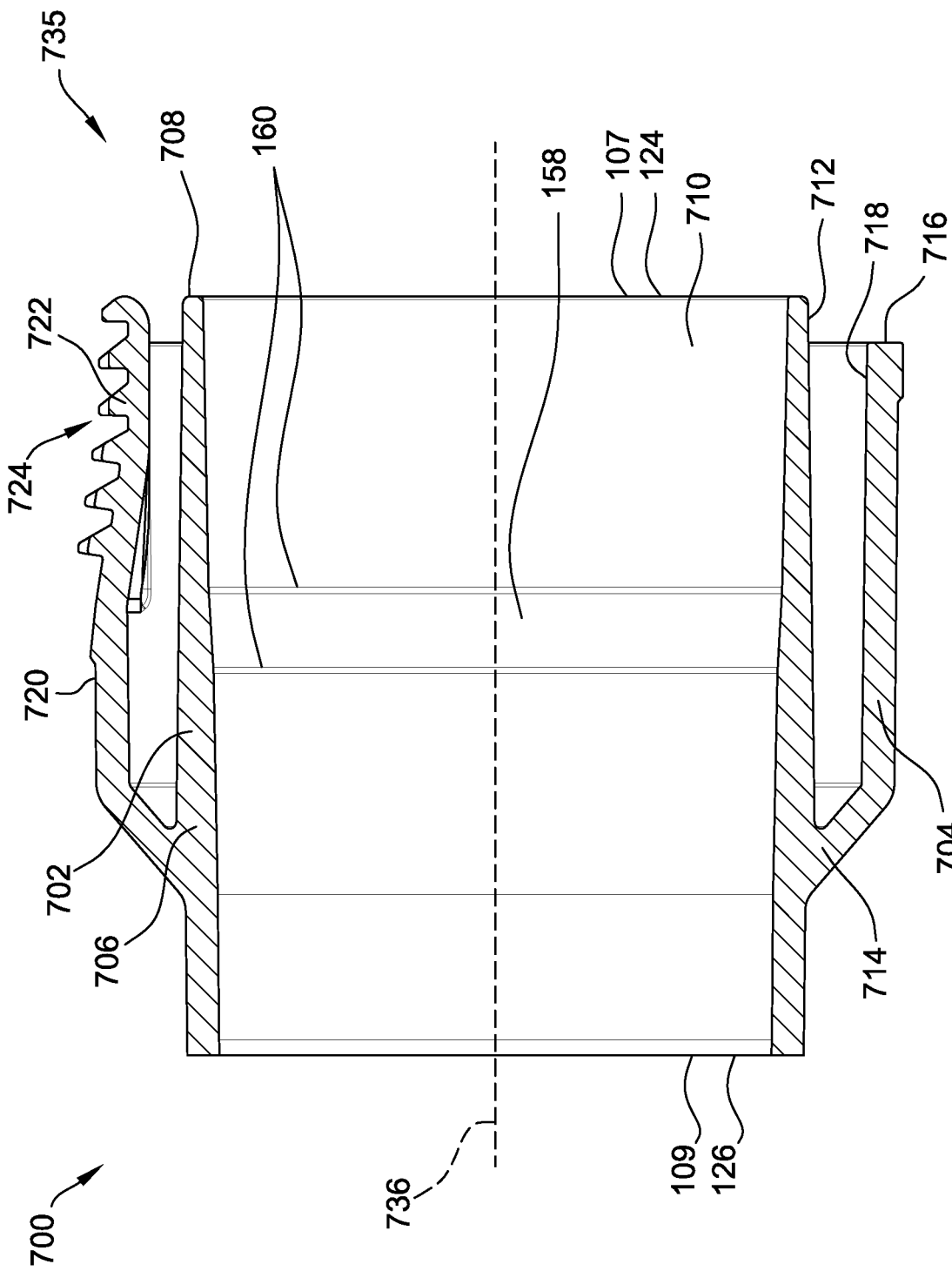
FIG. 32 is sectional view of the attachment tool of FIG. 31, taken along line 32-32.

FIGS. 29-31 illustrate perspective, front, and top views, respectively, of another example attachment tool 700 including another example conduit connector 735. FIG. 32 is sectional view of the attachment tool 700 of FIG. 31, taken along line 32-32.

The vacuum conduit connector 735 is similar to the vacuum conduit connector 135 described herein. Components of the vacuum conduit connector 735 include identical numbering to similar components of the vacuum conduit connector 135, with different components (e.g., deflectable tab 722) including different reference numbers.

With reference to FIGS. 29-32, the vacuum conduit connector 735 includes an inner collar 702 and an outer collar 704. In the illustrated embodiment, the inner collar 702 and the outer collar 704 are formed as one piece—i.e., unitarily or as a monolithic structure. In other embodiments, the inner collar 702 and the outer collar 704 may be formed separately and coupled together e.g., similar to inner collar 142 and outer collar 144. Inner collar 702 and outer collar 704 may be coupled together in any suitable manner (e.g., via a snap connection, a threaded connection, a spin weld connection, etc., as described herein) that enables the attachment tool 700 to function as described herein.

In the illustrated embodiment, the inner collar 702 is formed as part of the hollow body 122 and extends from a first end 706, coupled to the outer collar 704, to a second, free end 708. The inner collar 702 includes a radial inner surface 710 and a radial outer surface 712. Similarly, the outer collar 704 extends from a first end 714, coupled to the inner collar 702, to a second, free end 716, and includes a radial inner surface 718 and a radial outer surface 720. The inner collar 702 and the outer collar 704 extend along a common central axis 736.

The outer collar 704 includes a deflectable tab 722. The deflectable tab 722 includes a plurality of teeth 724 operable to engage a locking mechanism of a vacuum hose or conduit (e.g., the locking mechanisms 222, 228 of the vacuum hose or conduit 224, 226, respectively). In the illustrated embodiment, deflectable tab 722 includes five teeth 724. In other embodiments, the deflectable tab 722 may include any suitable number of teeth 724 having any suitable configuration that enables the attachment tool 700 to function as described herein.

The deflectable tab 722 is defined by two axially extending slots 726 that are positioned on circumferentially opposite sides of the tab 722. The slots 726 extend a suitable axial length from the second end 708 of the inner collar 702 to enable the deflectable tab 722 to deflect radially inward and outward.

The inner surfaces 710, 718 of the inner collar 702 and the outer collar 704, respectively, may be tapered. Specifically, the inner surface 710 of the inner collar 702 may include tapered portions 158 and taper transition portions 160 similar to inner collar 142, and the inner surface 718 of outer collar 704 may be tapered similar to the inner surface 194 of the outer collar 144.

In the illustrated embodiment, the diameter of the inner surface 718 of the outer collar 704 is sized to receive a vacuum hose or conduit with the second diameter (e.g., the diameter of the inner surface 718 is similar to the diameter ID2 of the inner surface 194 of the outer collar 144). Further, the diameter of the inner surface 710 of the inner collar 702 is sized to receive a vacuum hose or conduit with the first diameter (e.g., the diameter of the inner surface 710 is similar to the diameter ID1 of the inner surface 150 of the inner collar 142). In other embodiments, the diameter of the inner surfaces 710, 718 of the inner and outer collars 702, 704, respectively, may be any suitable diameter that enables the attachment tool 700 to function as described herein.

Vacuum conduits and hoses can be coupled to and removed from attachment tools 700 including the vacuum conduit connector 735 using similar processes described herein with respect to attachment tools 111 including the vacuum conduit connector 135, although the components forming the connections between the vacuum conduit connector 735 and vacuum hoses or conduits are different.

Figure 33:
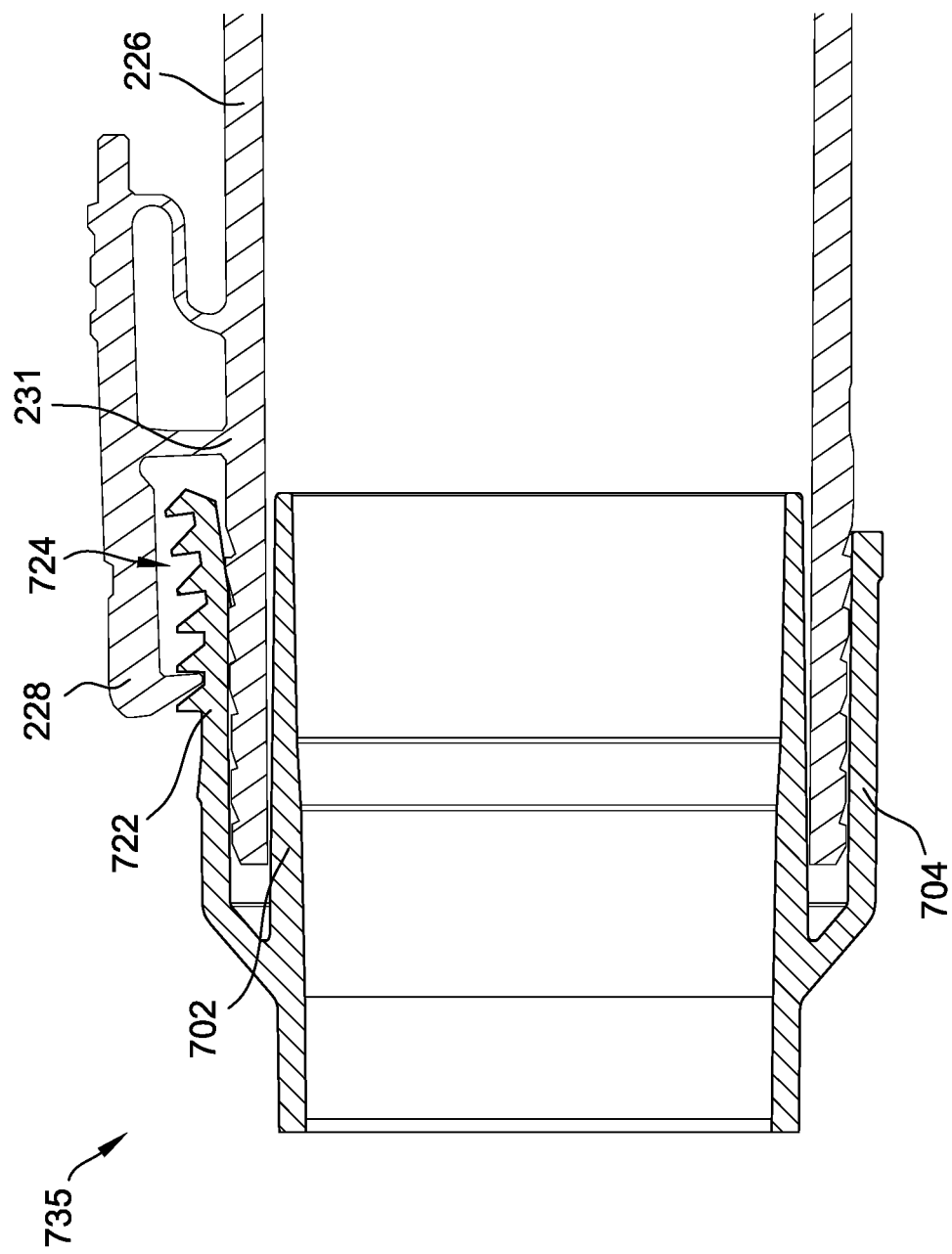
FIG. 33 is a sectional view of the attachment tool shown in FIG. 31, taken along line 32-32, illustrating an example of engagement of teeth of the outer collar with a locking mechanism of a vacuum hose or conduit.

FIG. 33 is a sectional view of the attachment tool 700 shown in FIG. 31, taken along line 31-31, illustrating an example of engagement of teeth 724 of the outer collar 704 with locking mechanism 228 of the vacuum hose or conduit 226. As shown in FIG. 33, when attaching the vacuum hose or conduit 226 to the vacuum conduit connector 735, the locking mechanism 228 engages the teeth 724 of the outer collar 704 to secure the vacuum hose or conduit 226 to the vacuum conduit connector 735 and to the attachment tool.

Figure 34:
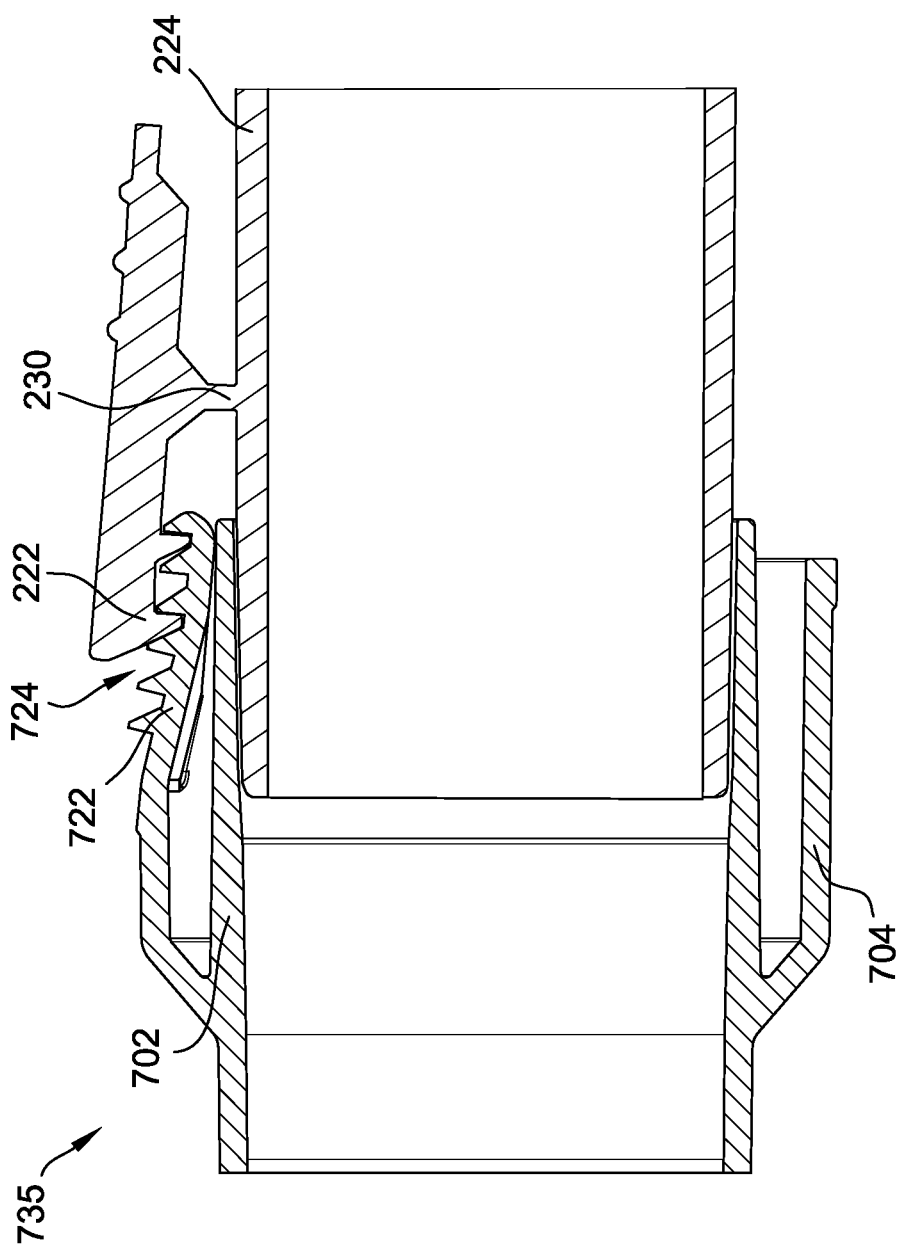
FIG. 34 is a sectional view of the attachment tool shown in FIG. 31, taken along line 32-32, illustrating another example of engagement of teeth of the outer collar with a locking mechanism of a vacuum hose or conduit.
Figure 35:
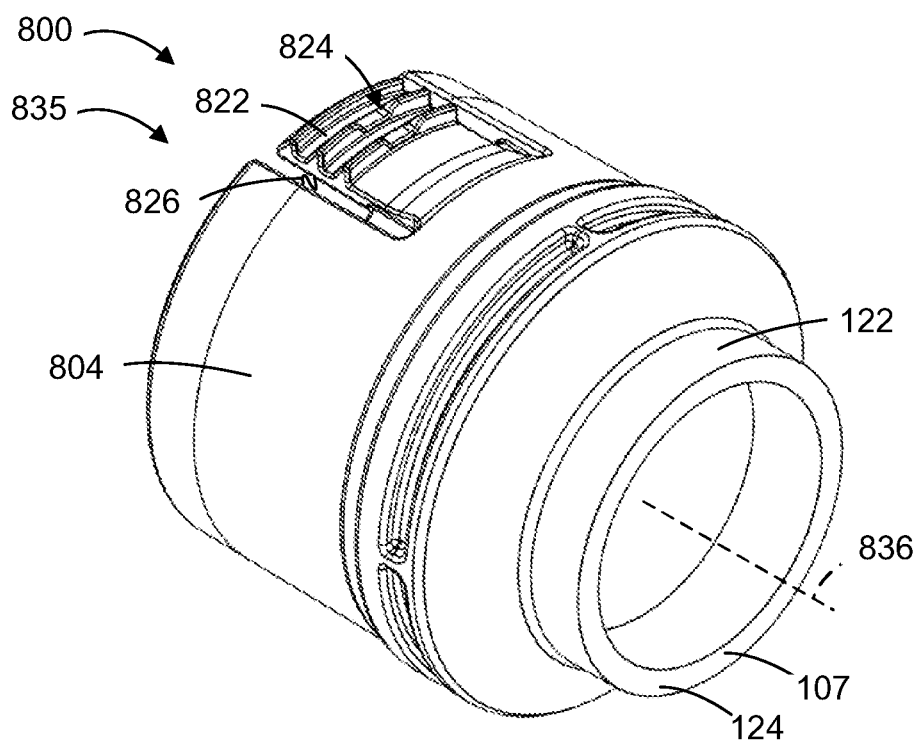
FIG. 35 is a front perspective view of another example attachment tool that includes another example vacuum conduit connector.
Figure 36:
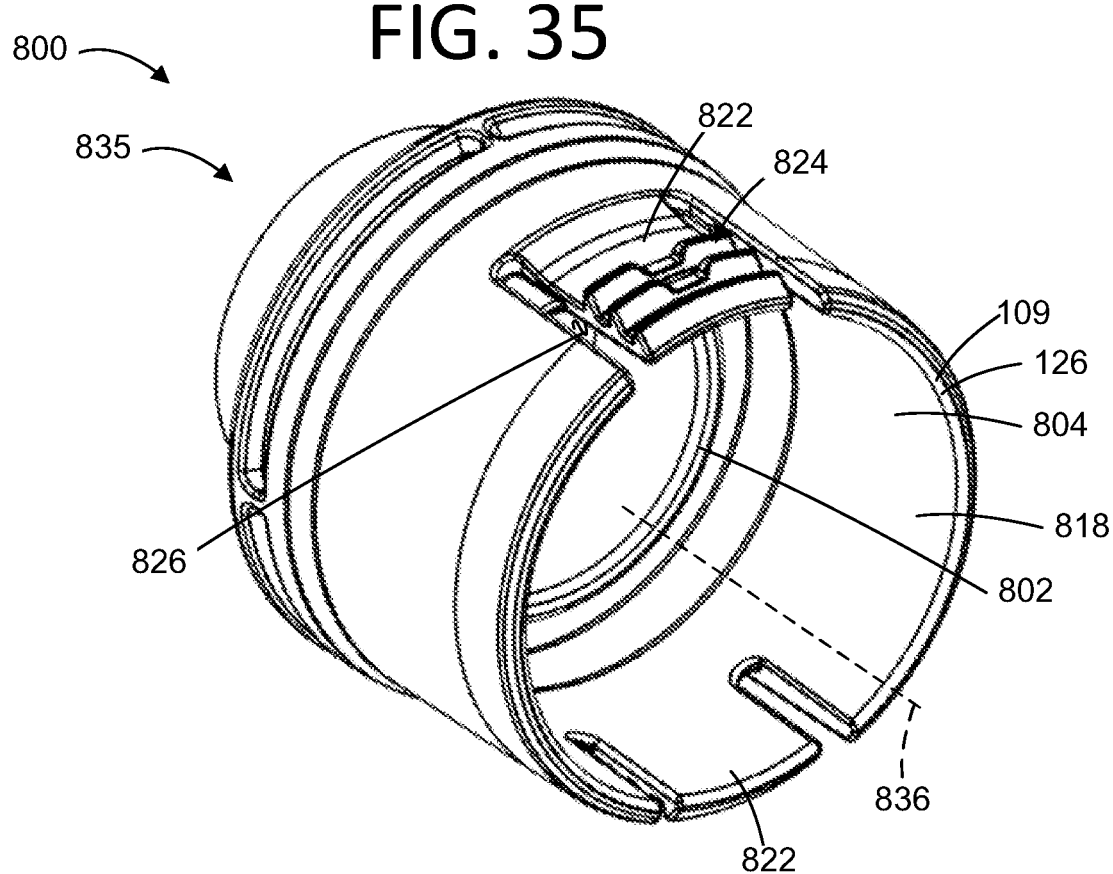
FIG. 36 is a rear perspective view of the attachment tool shown in FIG. 35.
Figure 37:
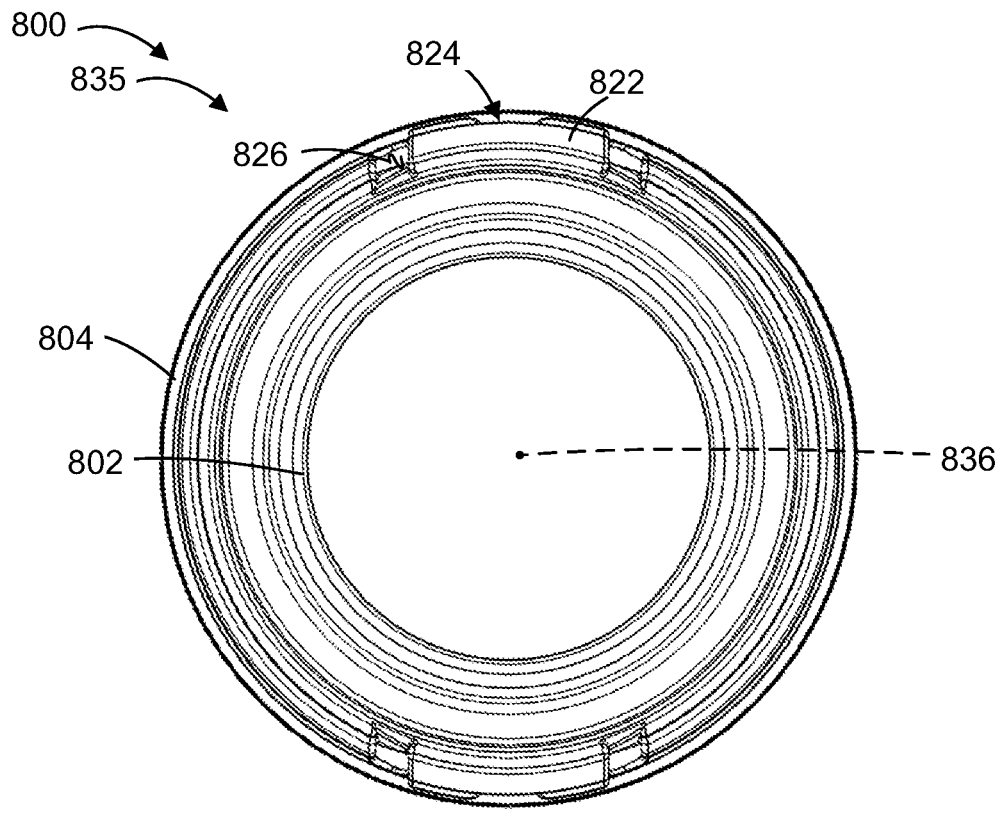
FIG. 37 is a front view of the attachment tool shown in FIG. 35.

FIG. 34 is a sectional view of the attachment tool 700 shown in FIG. 31, taken along line 31-31, illustrating another example of engagement of teeth 724 of the outer collar 704 with the locking mechanism 222 of the vacuum hose or conduit 224. As shown in FIG. 34, when attaching the vacuum hose or conduit 224 to the vacuum conduit connector 735, the locking mechanism 222 engages the teeth 724 of the outer collar 704 to secure the vacuum hose or conduit 224 to the vacuum conduit connector 735. That is, both the locking mechanism 222 of the vacuum hose or conduit 224 and the locking mechanism 228 of the vacuum hose or conduit 226 engage the same set of teeth 724 when securing the corresponding vacuum hose or conduit 224, 226 to the vacuum conduit connector 735.

As shown in FIGS. 33 and 34, The vacuum conduit connector 735 provides overlapping connection with the vacuum hose or conduit 224, 226 attached to the vacuum conduit connector 735 in order to help provide a secure connection between the vacuum conduit connector 735 and the vacuum hose or conduit 224, 226. For example, in the illustrated embodiments, the vacuum conduit connector 735 provides at least 1" of overlapping connection when the vacuum hose or conduit 224, 226 is coupled to the vacuum conduit connector 735, which helps to reduce leaks in the flow path.

The vacuum hoses or conduits 224, 226 may be removed from attachment tools (e.g., attachment tool 700) including the vacuum conduit connector 735 using a similar process described above to disengage teeth 146 or 198 from locking mechanisms 222 or 228, respectively, (e.g., by rotating the locking mechanisms 222, 228 about respective pivot points 230, 231 to disengage teeth 724, by rotating the vacuum hose or conduit 224, 226 relative to the vacuum conduit connector 735 such that locking mechanisms 222, 228, respectively, disengage teeth 724, etc.) and pulling the vacuum hose or conduit 224, 226 out of the vacuum conduit connector 735. In the illustrated embodiment, the deflectable tab 722 may also be moved (e.g., twisted) to facilitate disengagement of the teeth 724 from the locking mechanisms 222, 228 and removal of the vacuum hose or conduit 224, 226 from the vacuum conduit connector 735.

FIGS. 35-38 illustrate front perspective, rear perspective, front, and top views, respectively, of another example attachment tool 800 that includes another example vacuum conduit connector 835. FIG. 39 is sectional view of the attachment tool 800 of FIG. 38, taken along line 39-39.

The vacuum conduit connector 835 is similar to the vacuum conduit connector 735 described herein. Components of the vacuum conduit connector 835 include identical numbering to similar components of the vacuum conduit connector 735, with different components including different reference numbers.

With reference to FIGS. 35-39, the vacuum conduit connector 835 includes an inner collar 802 and an outer collar 804. In the illustrated embodiment, the inner collar 802 is formed as part of the hollow body 122 and extends from a first end 806, coupled to the outer collar 804, to a second, free end 808. The inner collar 802 includes a radial inner surface 810 and a radial outer surface 812. The outer collar 804 extends from a first end 814, coupled to the inner collar 802, to a second, free end 816, and includes a radial inner surface 818 and a radial outer surface 820. The inner collar 802 and the outer collar 804 extend along a common central axis 836.

In the illustrated embodiment, the inner collar 802 and the outer collar 804 are formed as one piece—i.e., unitarily or as a monolithic structure. In other embodiments, the inner collar 802 and the outer collar 804 may be formed separately and coupled together e.g., similar to inner collar 142 and outer collar 144. Inner collar 802 and outer collar 804 may be coupled together in any suitable manner (e.g., via a snap connection, a threaded connection, a spin weld connection, etc. as described herein) that enables the attachment tool 800 to function as described herein.

In this embodiment, the outer collar 804 includes two deflectable tabs 822 positioned diametrically opposite one another. In the illustrated embodiment, each of the deflectable tabs 822 is substantially the same as or similar to the deflectable tab 162 of the vacuum conduit connector 135, and each deflectable tab 822 includes teeth 824 similar to teeth 300 described herein. In other embodiments, the deflectable tabs 822 may have any suitable configuration that enables the attachment tool 800 to function as described herein.

The deflectable tab 822 is defined by two axially-extending slots 826 that are positioned on circumferentially opposite sides of the tab 822. The slots 826 extend a suitable axial length from the second end 156 of the inner collar 142 to enable the deflectable tab 162 to deflect radially inward and outward.

The inner surfaces 810, 818 of the inner collar 802 and the outer collar 804, respectively, may be tapered. Specifically, the inner surface 810 of the inner collar 802 may include tapered portions 158 and taper transition portions 160 similar to inner collar 142 of the vacuum conduit connector 135, and the inner surface 818 of outer collar 804 may be tapered similar to the inner surface 194 of outer collar 144 or the inner collar 142 of the vacuum conduit connector 135. That is, as shown in FIG. 39, the inner surface 818 of the outer collar 804 may include tapered portions 158 and taper transition portions 160 similar to inner collar 142 of the vacuum conduit connector 135. Taper (e.g., tapered portions 158 and taper transition portions 160) of the inner surfaces 810, 818 helps to facilitate press-fit connections with the radial outer surface of a vacuum hose or conduit (e.g., vacuum hose or conduit 224 and 226).

In the illustrated embodiment, the outer surface 820 of the outer collar 804 is also radially tapered. The outer surface 820 (e.g., outer diameter OD1 of the outer surface 820, shown in FIG. 38) tapers radially outward, away from the central axis 836, over at least one tapered portion 828 between the second end 816 of the outer collar 804 and the first end 814 of the outer collar 804.

The at least one tapered portion 828 of the outer surface 820 facilitates enhanced connection between a vacuum hose or conduit and the outer surface 820. That is, the diameter OD1 of the outer surface 820 increases between the second end 816 of the outer collar 804 and the first end 814 of the outer collar 804, which helps to ensure a snug press-fit connection between the vacuum hose or conduit and the outer surface 820. In some embodiments, the at least one tapered portion 828 enables the outer collar 804 to be inserted into vacuum hoses or conduits of different sized inner diameters. In the example embodiment, the at least one tapered portion 828 facilitates reception of the outer collar 804 within vacuum hoses or conduits having an outer or nominal diameter of about 2½". That is, the at least one tapered portion 828 accommodates variations in the inner diameters of vacuum hoses or conduits having an outer or nominal diameter of 2½".

Further, in the example embodiment, the outer surface 820 includes four tapered portions 828 that each include a different taper angle δ (or varying taper angle) of between 0 degrees and 10 degrees with respect to the central axis 836. As shown in FIG. 39, the taper angle δ is defined between the outer surface 820 and a direction (e.g., indicated by reference number 838) that is parallel to the central axis 836. However, in other embodiments, the outer surface 820 may include any suitable number of tapered portions 828 having any suitable configurations that enable the vacuum system 100 to function as described herein.

The outer surface 820 also includes at least one taper transition portion 830 that separates the tapered portions 828 from one another, or that separates the tapered portions 828 from a non-tapered portion (e.g., a portion with no radial taper relative to the central axis 836). The at least one taper transition portion 830 may provide a fillet or smooth transition between the tapered portions 828. In some embodiments, the at least one taper transition portion 830 functions as a tapered stopper that helps to inhibit insertion of the outer collar 804 into a vacuum hose or conduit beyond the location of the at least one shoulder 830, which prevents the outer collar 804 from being over inserted within the vacuum hose or conduit. In the illustrated embodiment, the outer surface 820 includes four taper transition portions 830. However, in other embodiments, the outer surface 820 may include any suitable number of taper transition portions 830 that enables the attachment tool 800 to function as described herein.

In the illustrated embodiment, the diameter of the inner surface 818 of the outer collar 804 is sized to receive a vacuum hose or conduit with the first diameter (e.g., the diameter of the inner surface 818 is similar to the diameter ID2 of the inner surface 194 of the outer collar 144), and the diameter OD2 of the outer surface 820 of the outer collar 804 is sized to be inserted into a vacuum hose or conduit with the second diameter. Further, the diameter of the inner surface 810 of the inner collar 802 is sized to receive a vacuum hose or conduit with the third diameter (e.g., the diameter of the inner surface 810 is similar to the diameter ID1 of the inner surface 150 of the inner collar 142). In other embodiments, the diameter of the inner surfaces 810, 818 of the inner and outer collars 802, 804, respectively, and the diameter OD1 of the outer surface 820 of the outer collar 804 may be any suitable diameter that enables the attachment tool 800 to function as described herein.

Vacuum conduits and hoses can be coupled to and removed from attachment tools 800 including the vacuum conduit connector 835 using similar processes described herein with respect to attachment tools 111 including the vacuum conduit connector 135, although the components forming the connections between the vacuum conduit connector 835 and vacuum hoses or conduits are different.

Figure 38:
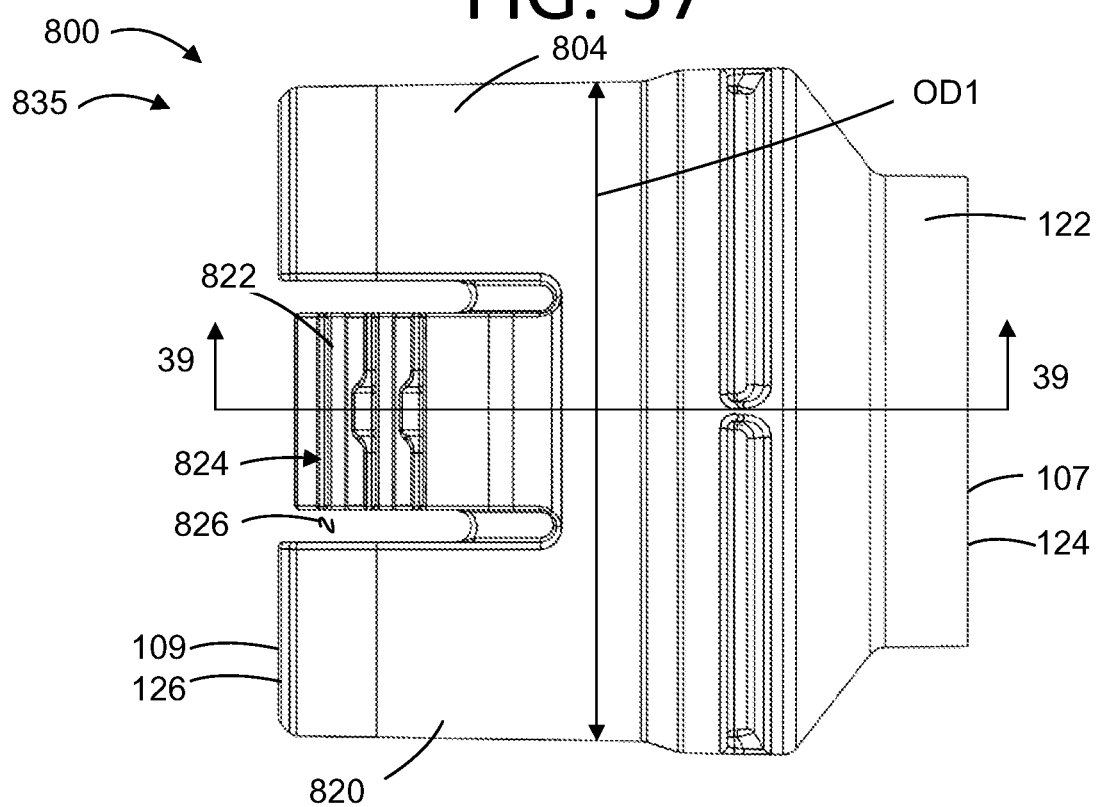
FIG. 38 is a top view of the attachment tool shown in FIG. 35.
Figure 39:
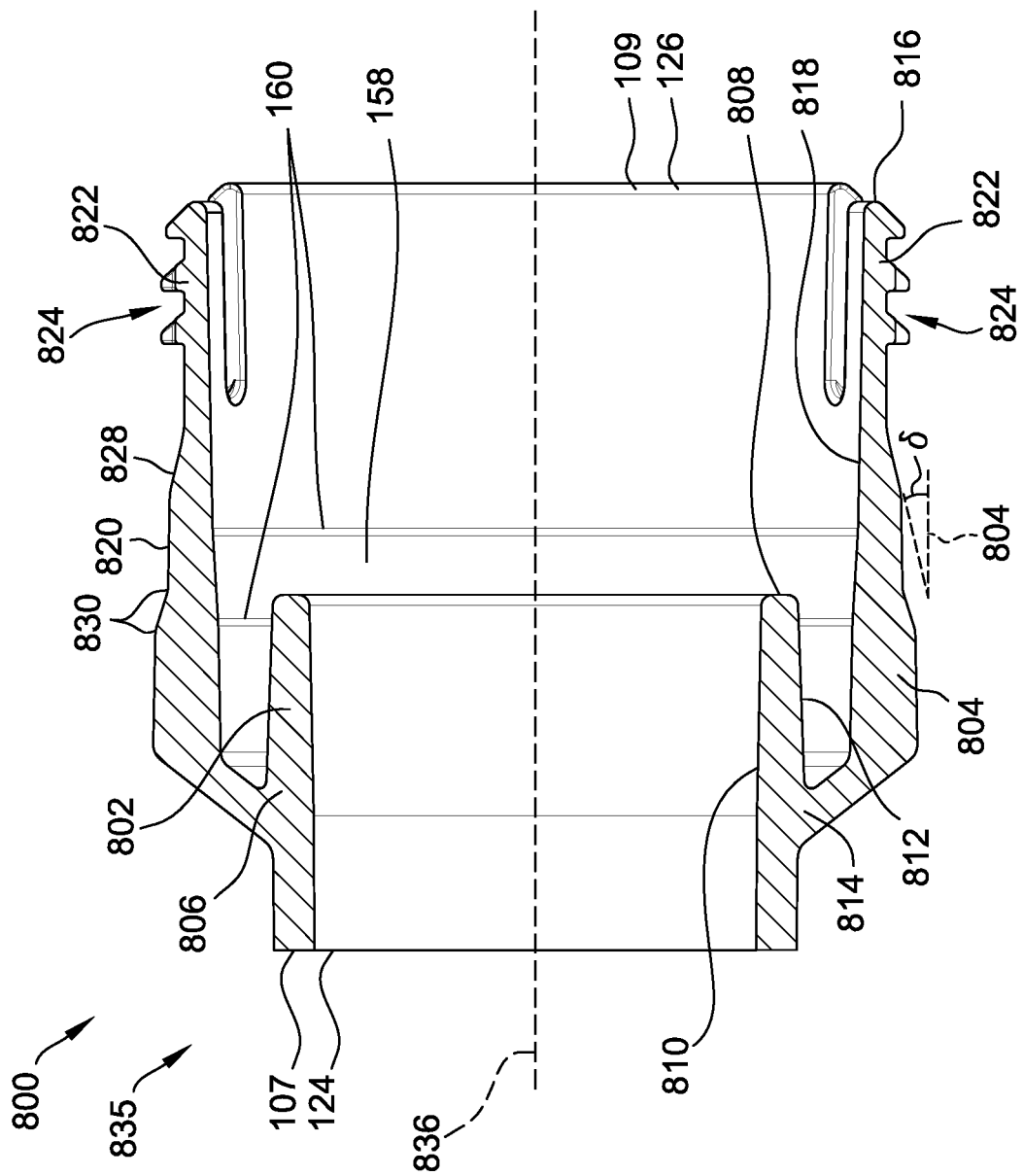
FIG. 39 is sectional view of the attachment tool of FIG. 38, taken along line 39-39.
Figure 40:
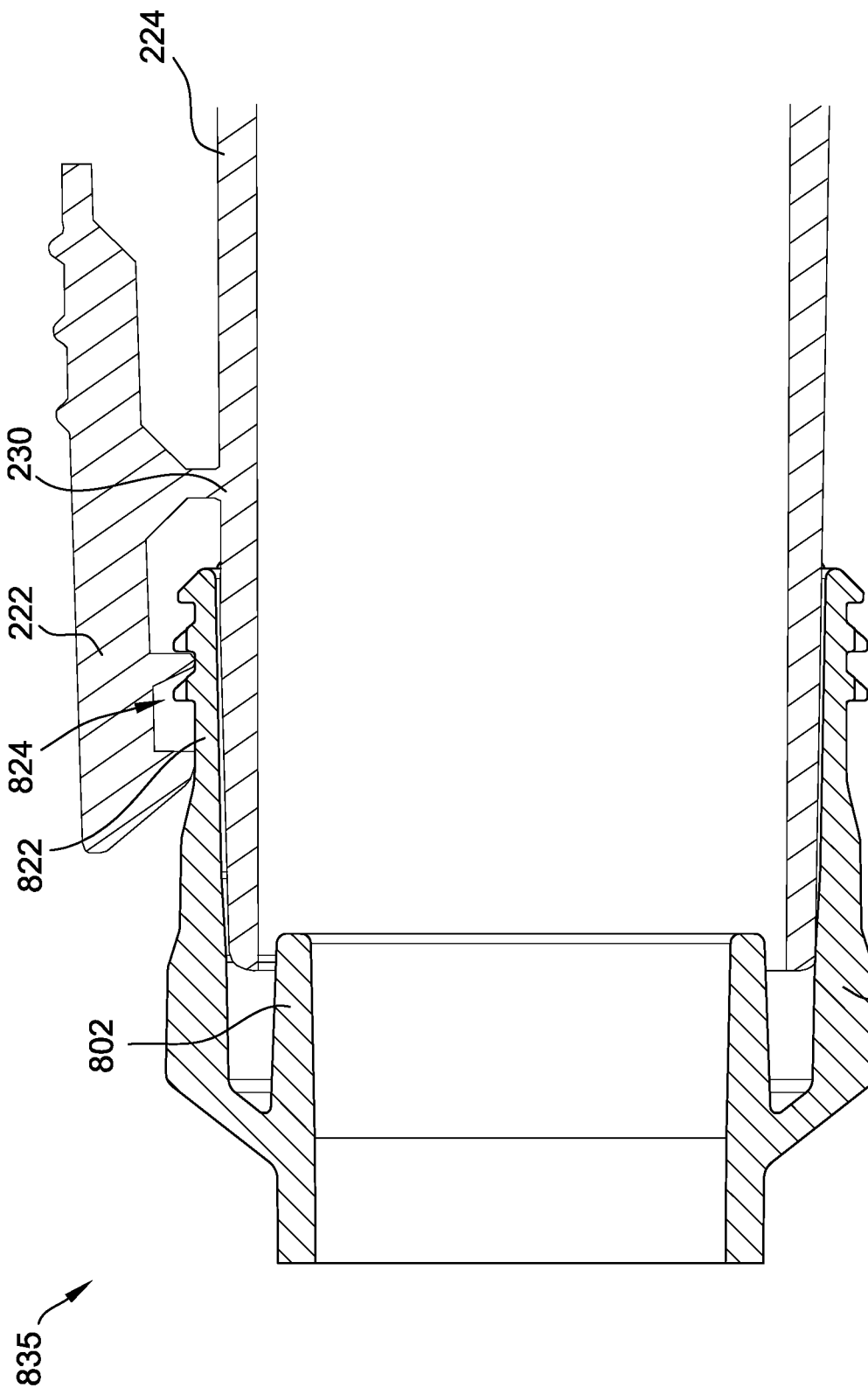
FIG. 40 is a sectional view of the attachment tool shown in FIG. 38, taken along line 39-39, illustrating an example of engagement of teeth of the outer collar with a locking mechanism of a vacuum hose or conduit.

FIG. 40 is a sectional view of the attachment tool 800 shown in FIG. 38, taken along line 39-39, illustrating an example of engagement of teeth 824 of the outer collar 804 with locking mechanism 222 of the vacuum hose or conduit 224 (e.g., the vacuum hose or conduit having the first diameter). As shown in FIG. 40, when attaching the vacuum hose or conduit 224 to the vacuum conduit connector 835, the locking mechanism 222 engages the teeth 824 on one deflectable tab 822 of the outer collar 804 to secure the vacuum hose or conduit 224 to the vacuum conduit connector 735.

Figure 41:
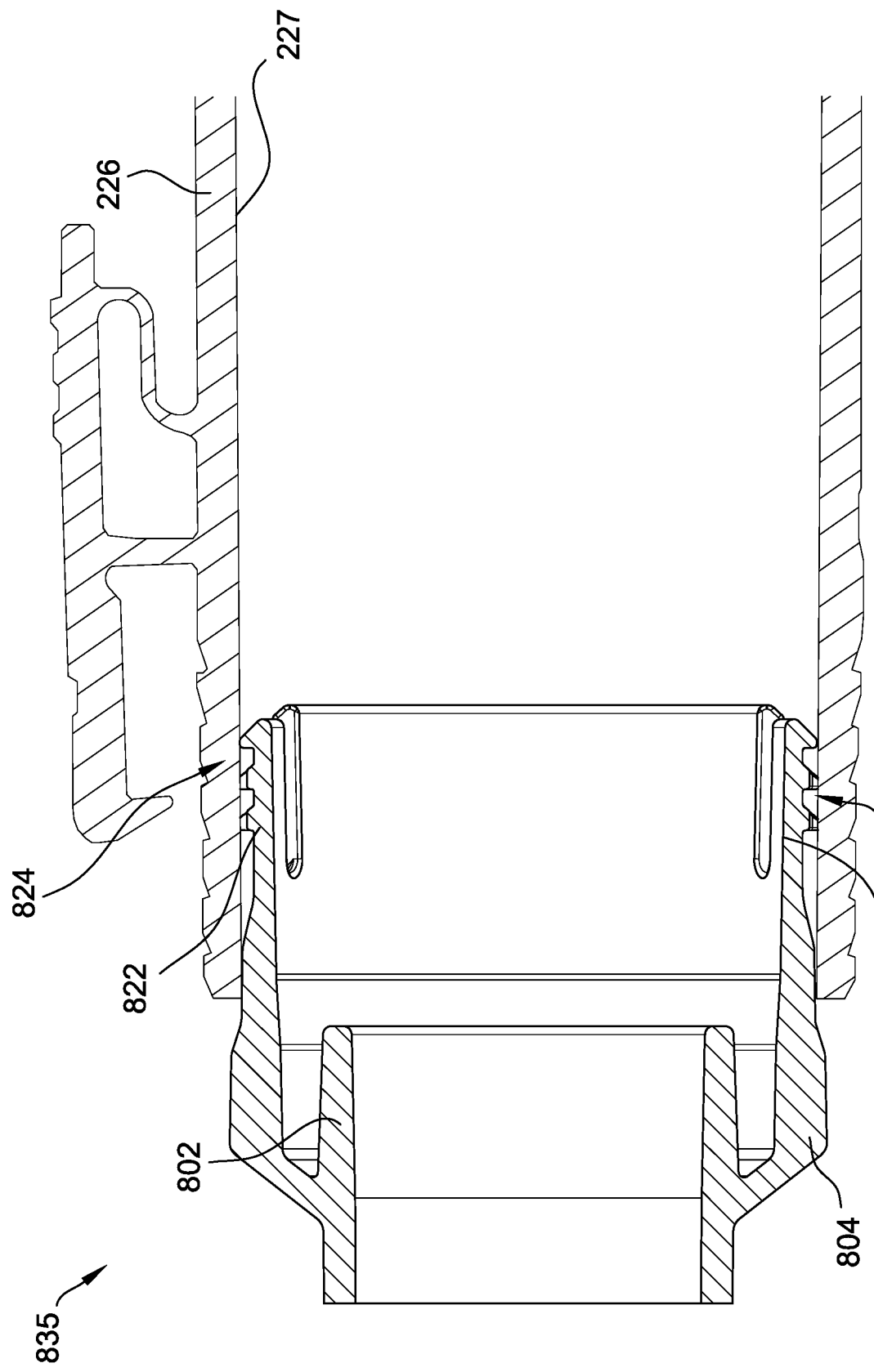
FIG. 41 is a sectional view of the attachment tool shown in FIG. 38, taken along line 39-39, illustrating an example of engagement of teeth of the outer collar with a vacuum hose or conduit.

FIG. 41 is a sectional view of the attachment tool 800 shown in FIG. 38, taken along line 39-39, illustrating engagement of the outer collar 804 with a vacuum hose or conduit 226 (e.g., the vacuum hose or conduit having the second diameter). As shown in FIG. 41, when attaching the vacuum hose or conduit 226 to the vacuum conduit connector 835, the outer collar 804 is inserted into the vacuum hose or conduit 226, and a radial inner surface 227 of the vacuum hose or conduit 226 engages the outer surface 820 of the outer collar 804 to form a press-fit or friction-fit interface therewith and secure the vacuum hose or conduit 226 to the vacuum conduit connector 835.

The vacuum hose or conduit 424 (e.g., the vacuum hose or conduit having the third diameter) may be coupled to the inner collar 802 by inserting the vacuum hose or conduit 424 within the inner collar 802 to form a press-fit or friction-fit interface between the vacuum hose or conduit 424 and the inner surface 810 of the inner collar 802 (e.g., similar to the configuration shown in FIG. 27).

The vacuum hose or conduit 224 may be removed from attachment tools (e.g., attachment tool 800) including the vacuum conduit connector 835 using the same or similar processes described above to disengage teeth 146 from locking mechanism 222 and pulling the vacuum hose or conduit 224 out of the vacuum conduit connector 835. The vacuum hose or conduit 226 is removed from attachment tools including the vacuum conduit connector 835 by pulling the vacuum hose or conduit 226 away from the vacuum conduit connector 835 and release the press-fit or friction-fit connection therewith. The vacuum hose or conduit 424 may be removed from attachment tools including the vacuum conduit connector 835 using a similar process described above (e.g., pulling the vacuum hose or conduit 424 out of the inner collar 802).

Figure 42:
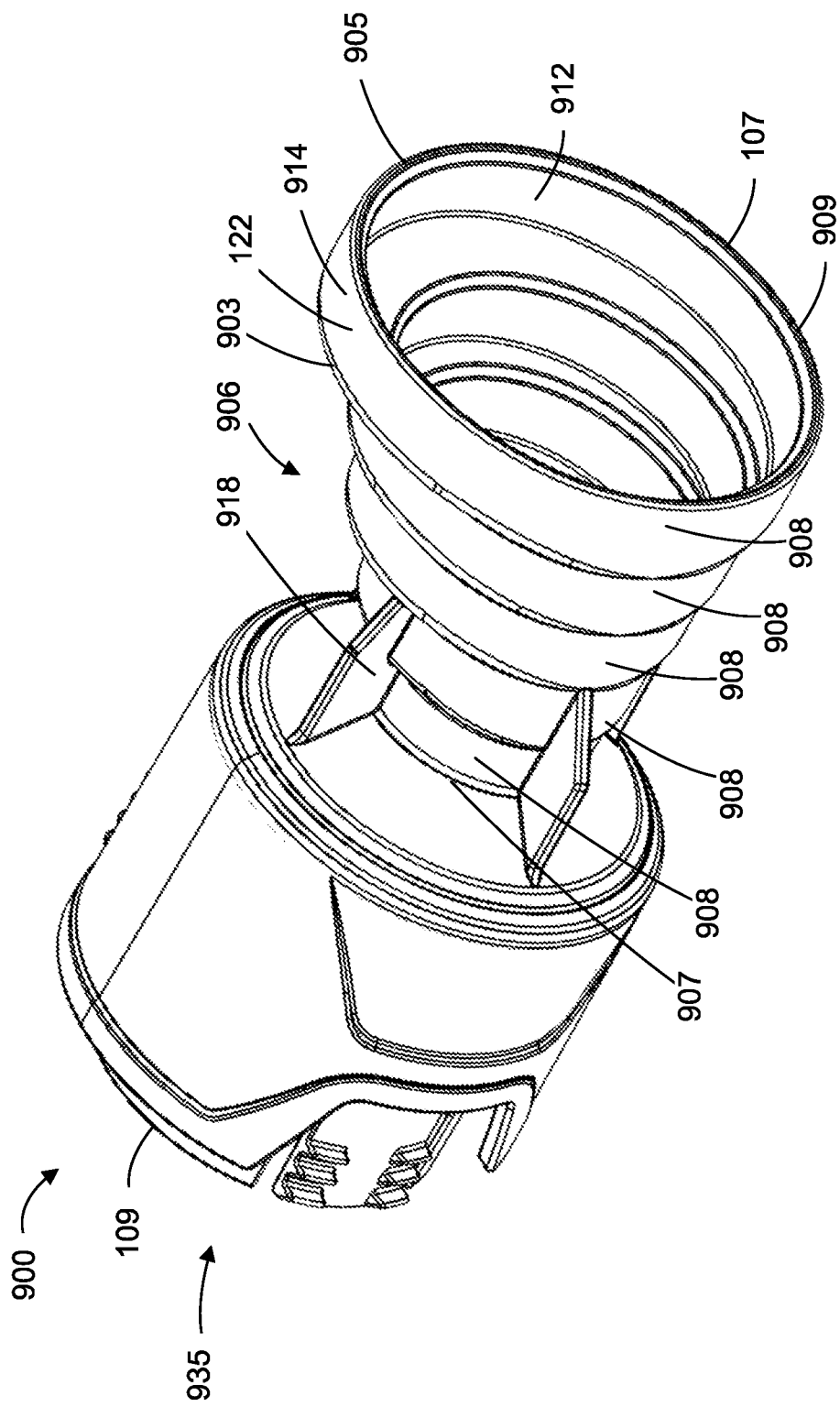
FIG. 42 is a perspective view of an example vacuum conduit pipe adapter for a vacuum cleaner.
Figure 43:
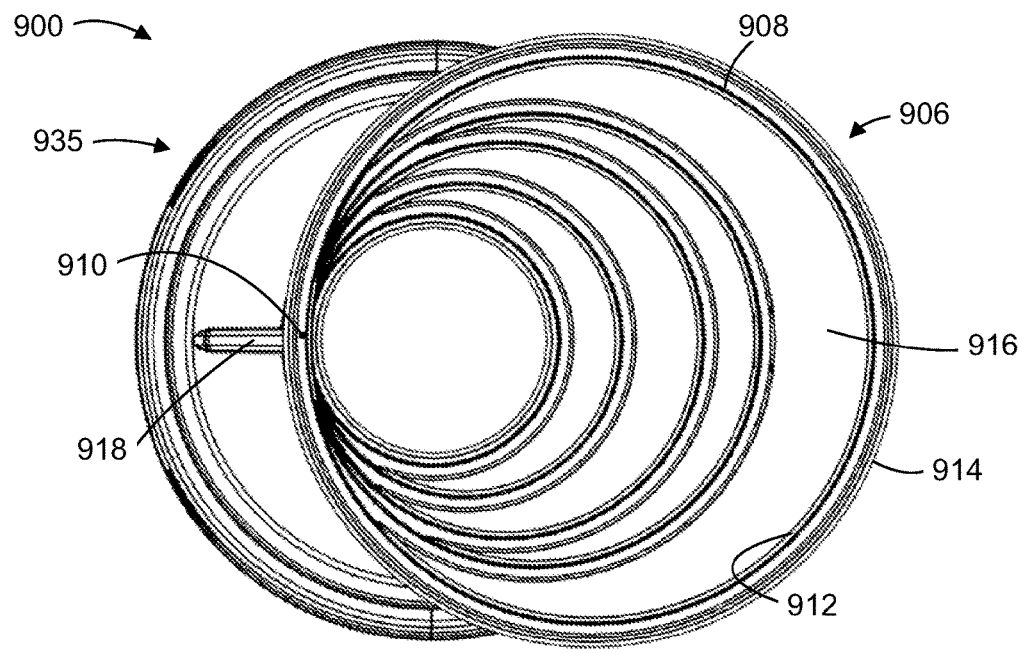
FIG. 43 is a front view of the vacuum conduit pipe adapter shown in FIG. 42.
Figure 44:
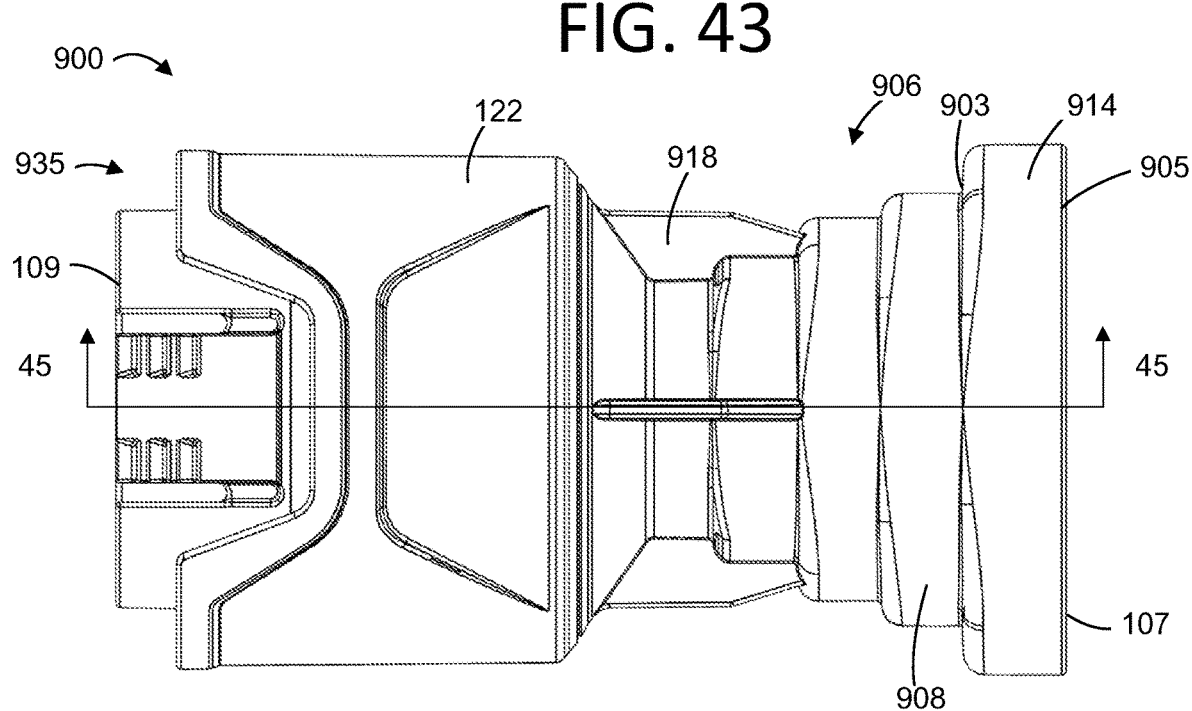
FIG. 44 is a top view of the vacuum conduit pipe adapter shown in FIG. 42.
Figure 45:
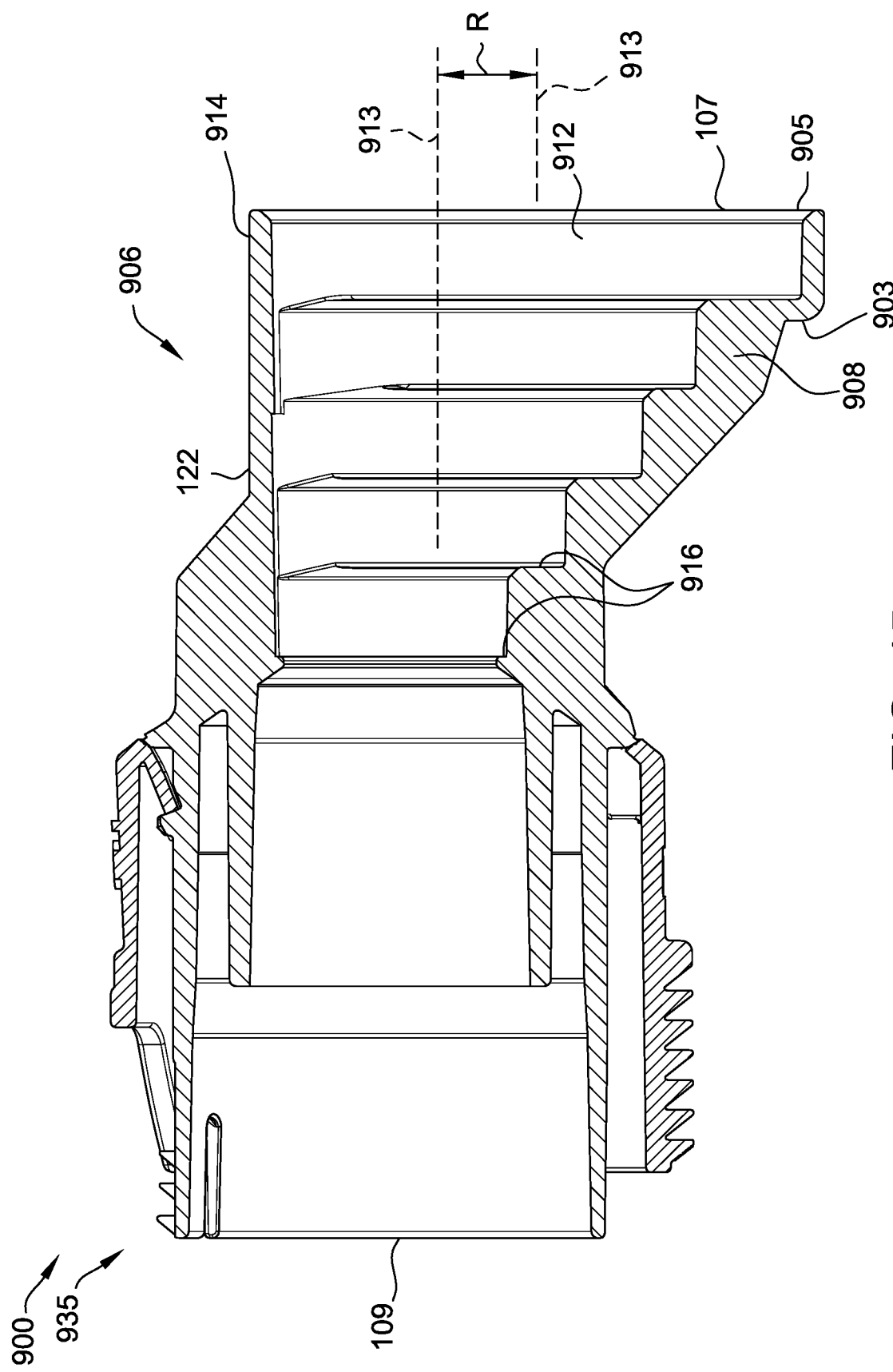
FIG. 45 is sectional view of the vacuum conduit pipe adapter of FIG. 44, taken along line 45-45.

FIGS. 42-44 illustrate perspective, front, and top views, respectively, of an example vacuum conduit pipe adapter 900, and FIG. 45 is sectional view of the vacuum conduit pipe adapter 900 of FIG. 44, taken along line 45-45. The vacuum conduit pipe adapter 900 provides an interface between a vacuum system (e.g., vacuum system 100) and an external fluid system (e.g., pipes used in air handling systems, air conditioning systems, plumbing systems).

The vacuum conduit pipe adapter 900 includes a hollow body 122 that extends from a first end 107 to a second end 109 and defines a flow path. The vacuum conduit pipe adapter 900 also includes a pipe connector 906 disposed at the first end 107 and a vacuum conduit connector 935 disposed at the second end 109. The pipe connector 906 and the vacuum conduit connector 935 are coupled together at approximately a midpoint of the vacuum conduit pipe adapter 900 between the first end 107 and the second end 109. The vacuum conduit connector 935 is operable to connect the vacuum conduit pipe adapter 900 to a vacuum system (e.g., vacuum system 100). In the illustrated embodiment, the vacuum conduit connector 935 is identical to the vacuum conduit connector 135 described herein with reference to FIGS. 3-13. In other embodiments, the vacuum conduit connector 935 may be any other suitable vacuum conduit connector that enables the vacuum conduit pipe adapter 900 to function as described herein, including for example and without limitation, the vacuum conduit connectors 435, 535, 635, 735, and 835.

The pipe connector 906 extends from a first end 907 joined to the vacuum conduit connector 935 to a second, free end 909 (i.e., to the first end 107 of the hollow body 122). The pipe connector 906 includes a plurality of fitments 908 that are operable to receive pipes or hoses of different diameters therein. In the illustrated embodiment, the pipe connector 906 includes five fitments 908, and the five fitments 908 are operable to engage pipes or hoses having different diameters (e.g., inner or outer diameters) of, for example, ¾", 1", 1¼", 1½" and 2", respectively, which are generally nominal industry diameters. That is, the pipe connector 906 includes a plurality of fitments 908 each formed circumferentially about a respective central axis 913 (the central axes 913 of the second smallest fitment 908 and the largest fitment 908 are illustrated in FIG. 45).

Each fitment 908 extends from a first end 903 to a second end 905 and includes a radial inner surface 912 and a radial outer surface 914. The inner surface 912 of each fitment 908 has an inner diameter sized to receive a pipe or hose therein. Each inner surface 912 includes a different inner diameter such that each fitment 908 is sized to receive a pipe or hose having a different diameter. As shown in FIG. 45, the fitments 908 are generally arranged in a stepped configuration, with fitments 908 closer to the second end 909 of the pipe connector 906 having a larger diameter (both inner and outer diameter) than fitments 908 closer to the first end 907 of the pipe connector 906. Each fitment 908 also includes a corresponding stop surface 916 that extends radially inward from the inner surface 912 of the corresponding fitment 908 to the next, smallest fitment 908. The stop surface 916 is oriented perpendicular to the axial direction of the vacuum conduit pipe adapter 900 and prevents a pipe or hose from being inserted further into the pipe connector 906 and also engages an end of the pipe or the hose to at least partially seal a flow path between the vacuum conduit pipe adapter 900 and the pipe or hose.

Each fitment 908 is generally circular or cylindrical in shape, and is radially offset from the other fitments 908. That is, in the illustrated embodiment, the fitments 908 are arranged eccentrically, with the central axis 913 of each fitment 908 radially offset from the central axis 913 of the other fitments 908. For example, FIG. 45 illustrates the radial offset R between the central axis 913 of the largest fitment 908 and the central axis 913 of the fourth-largest (or second smallest) fitment 908.

The inner surface 912 of at least one fitment 908 tapers radially inward (i.e., is radially tapered), towards the respective central axis 913, over at least one tapered portion (e.g., similar to tapered portions 158) between the second end 905 of the respective fitment 908 and the first end 903 of the respective fitment 908. In some embodiments with multiple tapered portions, taper transition portions may provide a fillet or smooth transition between the tapered portions (e.g., similar to taper transition portions 160). The tapered inner surface 912 accommodates variations in diameters of pipes or hoses that are inserted into the pipe connector 906 such that a press-fit connection is formed between the inner surface 912 and the pipe or hose. For example, the tapered inner surface 912 accommodates pipes or hoses having diameters that vary from nominal industry diameters. In some embodiments, each fitment 908 may be radially tapered over one tapered portion. In other embodiments, any suitable number of fitments may be radially tapered over any suitable number of tapered portions that enable the vacuum conduit pipe adapter 900 to function as described herein.

The fitments 908 are also axially aligned along a common point or line 910 (FIG. 43) located on the circumference of each fitment 908 (specifically, the circumference of the inner surface 912 in the illustrated embodiment). In some embodiments, the common point or line 910 facilitates connection of a pipe or hose to the vacuum conduit pipe adapter 900. For example, when connecting a pipe or hose to the vacuum conduit pipe adapter 900, the radial outer surface of the pipe or hose can be engaged with or pressed against the common point or line 910 on the inner surface 912 of the largest fitment 908, and then inserted in the vacuum conduit pipe adapter 900. As the pipe or hose is inserted into the vacuum conduit pipe adapter 900 while pressed against the common point or line 910, the pipe or hose is received in the proper fitment 908 by engaging the corresponding stop surface 916, which prevents further insertion of the pipe or hose into the vacuum conduit pipe adapter 900. In other embodiments, the pipe connector 906 may include any suitable number of fitments 908 having any suitable configuration that enables the vacuum conduit pipe adapter 900 to function as described herein.

The vacuum conduit pipe adapter 900 also includes a plurality of reinforcement fins 918 coupled to the outer surface 914 of the fitments 908 and to the second end of the vacuum conduit connector 935. The plurality of reinforcement fins 918 enhances the structural integrity of the vacuum conduit pipe adapter 900 and helps to reduce bending of the vacuum conduit pipe adapter 900 during use. The illustrated embodiment includes four reinforcement fins 918 spaced circumferentially apart from one another by about 90°. Further, in the illustrated embodiment, 3 of the reinforcement fins 918 extend from the second end of the vacuum conduit connector 935 to the third or middle fitment 908 (specifically to the stop surface 916), and 1 of the reinforcement fins 918 extends from the second end of the vacuum conduit connector 935 to the largest fitment 908 (specifically, to the stop surface 916). In other embodiments, the vacuum conduit pipe adapter 900 may include any suitable number of reinforcement fins 918 arranged in any suitable configuration that enables the vacuum conduit pipe adapter 900 to function as described herein.

Figure 46:
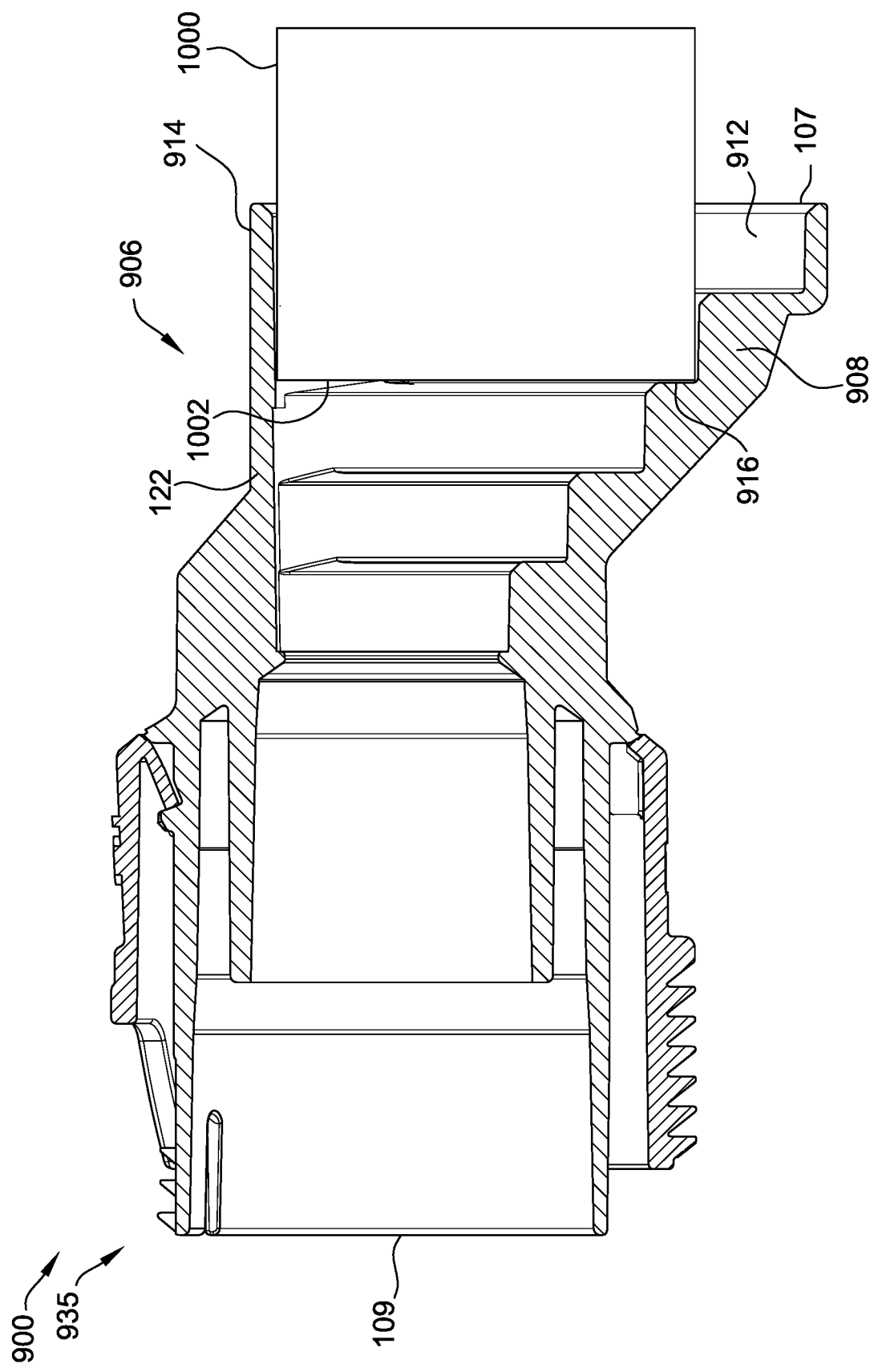
FIG. 46 is sectional view of the vacuum conduit pipe adapter of FIG. 44, taken along line 45-45, illustrating an example connection between a pipe or hose and the vacuum conduit pipe adapter.

FIG. 46 is sectional view of the vacuum conduit pipe adapter 900 of FIG. 44, taken along line 45-45, illustrating an example connection between a pipe or hose 1000 and the pipe connector 906 of the vacuum conduit pipe adapter 900. As shown in FIG. 46, the pipe or hose 1000 is connected to the second-largest fitment 908 of the pipe connector 906 via a press-fit (e.g., a friction fit) connection between (i) the radial outer surface of the pipe or hose and the inner surface 912 of the second-largest fitment 908 and (ii) an end 1002 of the pipe or hose 1000 and the corresponding stop surface 916 of the fitment 908.

In the illustrated embodiment, the pipe connector 906 is made from a flexible rubber material (e.g., a semi-rigid plastic, such as polypropylene, nylon, etc.). The flexible rubber material of the pipe connector 906 helps to facilitate the press-fit or friction fit connection between the pipe or hose (e.g., the pipe or hose 1000) and the pipe connector 906, and facilitates forming a seal between the pipe or hose and the vacuum conduit pipe adapter 900.

The vacuum conduit pipe adapter 900 provides overlapping connection with the pipe or hose attached to the pipe connector 906 in order to provide a secure connection between the pipe connector 906 and the pipe or hose, while still having a compact design. For example, in the illustrated embodiment, the vacuum conduit pipe adapter 900 provides about 0.4" of overlapping connection between the inner surface 912 of the corresponding fitment 908 and the radial outer surface of the pipe or hose when the pipe or hose is attached to the pipe connector 906, which helps to facilitate the press-fit or friction fit connection and helps to reduce leaks.

Embodiments of the attachment tools described herein provide several advantages over prior devices. For example, embodiments of the attachment tools described herein provide a two-piece attachment tool that is connectable to multiple different sizes of vacuum hoses or conduits without the need for separate vacuum accessories. The attachment tools of the present disclosure thereby reduce the total number of vacuum accessories needed for compatibility with different sizes of vacuum conduits. Embodiments of the attachment tools also provide aesthetic benefits to customers, by facilitating the construction of multi-colored attachment tools via the 2-piece design of the attachment tool, where each separate piece of the design may be a different color. Embodiments of the attachment tools also provide benefits to manufacturers by including alignment ribs to help align the 2-piece design prior to forming of the attachment tool.

Additionally, embodiments of the attachment tools facilitate maintaining a connection with vacuum hoses or conduits. In particular, embodiments of attachment tools include a vacuum conduit connector including teeth on an inner collar and/or teeth on an outer collar. Each set of teeth is operable to engage a locking mechanism of a vacuum hose or conduit, or the vacuum hose or conduit itself. When engaging a locking mechanism of a vacuum hose or conduit, the teeth help to prevent unwanted removal of the vacuum hose or conduit from the vacuum conduit connector of the attachment tool.

Further, embodiments, of the vacuum conduit pipe adapters described herein provide several advantages over prior devices. For example, embodiments of the vacuum conduit pipe adapters described herein are connectable to multiple sizes of pipes or hoses and to multiple sizes of vacuum hoses or conduits, without the need for separate vacuum accessories. Further, embodiments of the vacuum conduit pipe adapters described herein reduce the risk of leaks at the connection between the plumbing adapter and a pipe or hose via (i) overlap of the plumbing adapter with the pipe or hose when the pipe or hose is connected to the vacuum conduit pipe adapter, (ii) the flexibility of the pipe connector of the vacuum conduit pipe adapter, and (iii) the tapered inner surface of each fitment of the pipe connector of the vacuum conduit pipe adapter that each help to provide a seal between the vacuum conduit pipe adapter and the pipe or hose. Further, the tapered inner surface of each fitment of the pipe connector allows for the use of lower cost semi-rigid plastics or rubber materials for construction, while still enabling the fitments of the pipe connector to form press-fit connections with pipes and hoses of different diameters, including pipes and hoses that have diameters that vary from nominal industry diameters.

Example embodiments of attachment tools and corresponding vacuum conduit connector are described above in detail. The attachment tools and corresponding vacuum conduit connectors are not limited to the specific embodiments described herein, but rather, components of the attachment tools and the corresponding vacuum conduit connectors may be used independently and separately from other components described herein. For example, attachment tools and corresponding vacuum conduit connectors described herein may be used with vacuum cleaners other than wet/dry vacuum cleaners, including without limitation canister vacuum cleaners, upright vacuum cleaners, and backpack vacuum cleaners. As an additional example, the vacuum conduit attachment tools may be connected to the exhaust of a vacuum cleaner (via a suitable conduit, for example) or a blower and used to direct an outward airflow.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment (s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A vacuum conduit pipe adapter comprising:
  a hollow body extending from a first end to a second end and defining a flow path;
  a vacuum conduit connector positioned at the second end of the hollow body and operable to connect the vacuum conduit pipe adapter to a vacuum system; and
  a pipe connector positioned at the first end of the hollow body, wherein the pipe connector comprises a plurality of cylindrical fitments, wherein each fitment is formed circumferentially about a respective central axis and includes an inner surface having an inner diameter sized to receive a pipe having a different diameter than the other fitments, wherein the central axis of each fitment is radially offset from the central axis of each other fitment.

2. The vacuum conduit pipe adapter of claim 1, wherein each fitment includes a corresponding stop surface positioned to engage an end of a pipe to inhibit further insertion of the pipe into the pipe connector and to at least partially seal a flow path between the vacuum conduit pipe adapter and the pipe.

3. The vacuum conduit pipe adapter of claim 2, wherein each fitment extends from a first end to a second end, and wherein the stop surface of each fitment extends radially inward from the inner surface at the first end of the fitment, to the second end of an adjacent fitment.

4. The vacuum conduit pipe adapter of claim 3, wherein the stop surface is oriented perpendicular to the central axis of the corresponding fitment.

5. The vacuum conduit pipe adapter of claim 1, wherein the pipe connector includes at least three fitments.

6. The vacuum conduit pipe adapter of claim 5, wherein a first fitment of the plurality of cylindrical fitments is sized and shaped to receive a pipe diameter of about ¾ inches, wherein a second fitment of the plurality of cylindrical fitments is sized and shaped to receive a pipe diameter of about 1 inch, wherein a third fitment of the plurality of cylindrical fitments is sized and shaped to receive a pipe diameter of about 1¼ inches, wherein a fourth fitment of the plurality of cylindrical fitments is sized and shaped to receive a pipe diameter of about 1½ inches, and wherein a fifth fitment of the plurality of cylindrical fitments is sized and shaped to receive a pipe diameter of about 2 inches.

7. The vacuum conduit pipe adapter of claim 1, wherein each fitment extends from a first end to a second end, and wherein the inner surface of each fitment is radially tapered towards the respective central axis of the fitment, over at least one tapered portion between the second end of the respective fitment and the first end of the respective fitment.

8. The vacuum conduit pipe adapter of claim 1, further comprising a plurality of reinforcement fins connected to an outer surface of the fitments and to the second end of the vacuum conduit connector.

9. The vacuum conduit pipe adapter of claim 8, wherein the plurality of reinforcement fins includes four reinforcement fins spaced circumferentially apart from one another by 90°.

10. The vacuum conduit pipe adapter of claim 9, wherein at least three of the reinforcement fins extend from the second end of the vacuum conduit connector to a middle fitment of the plurality of fitments.

11. The vacuum conduit pipe adapter of claim 1, wherein the pipe connector and the vacuum conduit connector are connected together at approximately a midpoint of the vacuum conduit pipe adapter between the first end and the second end.

12. The vacuum conduit pipe adapter of claim 1, wherein the pipe connector extends from a first end joined to the vacuum conduit connector to a second, free end.

13. The vacuum conduit pipe adapter of claim 1, wherein the vacuum conduit pipe adapter is constructed from flexible rubber.

14. The vacuum conduit pipe adapter of claim 1, wherein the vacuum conduit connector comprises:
an inner collar having an inner diameter sized to receive a first vacuum conduit having a first diameter; and
an outer collar having an inner diameter sized to receive a second vacuum conduit having a second diameter greater than the first diameter, the outer collar formed separately from the inner collar and connected to the inner collar.

15. The vacuum conduit pipe adapter of claim 14, wherein the inner collar comprises a deflectable tab comprising a plurality of teeth operable to engage a locking mechanism of the first vacuum conduit.

16. A vacuum conduit pipe adapter comprising:
a hollow body extending from a first end to a second end and defining a flow path;
a vacuum conduit connector positioned at the second end of the hollow body, the vacuum conduit connector comprising:
an inner collar having an inner diameter sized to receive a first vacuum conduit having a first diameter; and
an outer collar having an inner diameter sized to receive a second vacuum conduit having a second diameter greater than the first diameter, the outer collar formed separately from the inner collar and connected to the inner collar; and
a pipe connector positioned at the first end of the hollow body, wherein the pipe connector comprises a plurality of cylindrical fitments arranged in a stepped, eccentric configuration, wherein each fitment is sized and shaped to receive a pipe having a different diameter than the other fitments.

17. The vacuum conduit pipe adapter of claim 16, wherein each fitment includes a corresponding stop surface positioned to engage an end of a pipe to inhibit further insertion of the pipe into the pipe connector and to at least partially seal a flow path between the vacuum conduit pipe adapter and the pipe.

18. The vacuum conduit pipe adapter of claim 16, wherein the pipe connector includes at least three fitments.

19. The vacuum conduit pipe adapter of claim 16, further comprising a plurality of reinforcement fins connected to an outer surface of the fitments and to the second end of the vacuum conduit connector.

20. The vacuum conduit pipe adapter of claim 19, wherein the plurality of reinforcement fins includes four reinforcement fins spaced circumferentially apart from one another by 90°.

* * * * *